(12) United States Patent
deGroeve et al.

(10) Patent No.: US 7,206,768 B1
(45) Date of Patent: Apr. 17, 2007

(54) ELECTRONIC MULTIPARTY ACCOUNTS RECEIVABLE AND ACCOUNTS PAYABLE SYSTEM

(75) Inventors: Bernard deGroeve, New York, NY (US); Jan Petroons, Alsemburg (BE); Christopher C. Hanan, New York, NY (US); A. Graham Bailey, Greenwich, CT (US); Shreyas D. Gupta, New York, NY (US); Kevin Lawrence Mellyn, New York, NY (US); Matthew Saal, Englewood, NJ (US); Morio Alexander, New York, NY (US); Craig Mondschein, New York, NY (US)

(73) Assignee: JPMorgan Chase Bank, N.A., New York, NY (US)

( * ) Notice: Subject to any disclaimer, the term of this patent is extended or adjusted under 35 U.S.C. 154(b) by 1182 days.

(21) Appl. No.: 09/638,560

(22) Filed: Aug. 14, 2000

(51) Int. Cl.
*G06Q 99/00* (2006.01)
(52) U.S. Cl. .................. 705/54; 705/30; 705/34; 705/39; 705/40
(58) Field of Classification Search .............. 705/54, 705/56, 62, 39, 40
See application file for complete search history.

(56) References Cited

U.S. PATENT DOCUMENTS

| | | |
|---|---|---|
| 3,653,480 A | 4/1972 | Yamamato et al. |
| 4,322,613 A | 3/1982 | Oldenkamp |
| 4,544,834 A | 10/1985 | Newport et al. |
| 4,649,563 A | 3/1987 | Riskin |
| 4,695,880 A | 9/1987 | Johnson et al. |
| 4,711,993 A | 12/1987 | Kosednar et al. |
| 4,713,761 A | 12/1987 | Sharpe et al. |
| 4,859,837 A | 8/1989 | Halpern |
| 4,870,260 A | 9/1989 | Niepolomski et al. |

(Continued)

FOREIGN PATENT DOCUMENTS

WO   WO 91/16691   10/1991

(Continued)

*Primary Examiner*—Firmin Backer
(74) *Attorney, Agent, or Firm*—Hunton & Williams, LLP

(57) ABSTRACT

The invention concerns a multiparty accounts receivable and accounts payable system that allows business trading partners to use a single, shared system for both accounts receivable and accounts payable management. The system of the invention forms an electronic "bridge" between a plurality of business trading partners for purposes of invoicing, dispute resolution, financing, and settlement of single and multiple currency debts. As the invoicing and settlement activities of the participants are funneled through a common system, the system allows a participant to aggregate all debts owed to other participants, aggregate all debts owed by the other participants, and net debts owed to other participants with debts owed by these participants. After aggregation and netting, the participant issues a single payment to settle numerous accounts payable items, and receives a single payment that settles numerous accounts receivable items. The system allows participants to use the substantial amount of financial and cash flow information captured by the system to borrow more efficiently by permitting lenders to view this information. Furthermore, the system provides a confirmation process to convert existing debt obligations into a new, independent payment obligation due on a date certain and free of any defenses to the underlying contract. The confirmed debt obligations provide a better source of working capital for the participants, or can be converted into electronic promissory notes. The system provides an electronic exchange for electronic promissory notes, allowing participants to raise working capital in various ways, for example, by selling them.

142 Claims, 19 Drawing Sheets

U.S. PATENT DOCUMENTS

| | | | |
|---|---|---|---|
| 4,947,028 A | 8/1990 | Gorog | |
| 4,992,646 A | 2/1991 | Collin | |
| 5,097,115 A | 3/1992 | Ogasawara et al. | |
| 5,121,945 A | 6/1992 | Thomson et al. | |
| 5,168,151 A | 12/1992 | Nara | |
| 5,179,584 A | 1/1993 | Tsumura | |
| 5,220,501 A | 6/1993 | Lawlor et al. | |
| 5,283,829 A | 2/1994 | Anderson | |
| 5,317,137 A | 5/1994 | Wilkins | |
| 5,326,959 A | 7/1994 | Perazza | |
| 5,383,113 A | 1/1995 | Kight et al. | |
| 5,465,206 A | 11/1995 | Hilt et al. | |
| 5,473,143 A | 12/1995 | Vak et al. | |
| 5,483,445 A | 1/1996 | Pickering | |
| 5,504,677 A | 4/1996 | Pollin | |
| 5,544,086 A | 8/1996 | Davis et al. | |
| 5,557,518 A | 9/1996 | Rosen | |
| 5,572,004 A | 11/1996 | Raimann | |
| 5,615,109 A | 3/1997 | Eder | |
| 5,642,419 A | 6/1997 | Rosen | |
| 5,652,786 A | 7/1997 | Rogers | |
| 5,666,493 A | 9/1997 | Wojcik et al. | |
| 5,671,285 A | 9/1997 | Newman | |
| 5,699,528 A | 12/1997 | Hogan | |
| 5,884,288 A | 3/1999 | Chang et al. | |
| 5,897,621 A | 4/1999 | Boesch et al. | |
| 5,910,896 A | 6/1999 | Hahn-Carlson | |
| 5,943,656 A | 8/1999 | Crooks et al. | |
| 5,949,117 A * | 9/1999 | Sandhu et al. | 257/410 |
| 5,956,700 A | 9/1999 | Landry | |
| 5,963,925 A | 10/1999 | Kolling et al. | |
| 5,978,780 A | 11/1999 | Watson | |
| 6,016,482 A | 1/2000 | Molinari et al. | |
| 6,032,133 A * | 2/2000 | Hilt et al. | 705/40 |
| 6,035,281 A | 3/2000 | Crosskey et al. | |
| 6,035,285 A | 3/2000 | Schlect et al. | |
| 6,035,287 A | 3/2000 | Stallaert et al. | |
| 6,041,312 A | 3/2000 | Bickerton et al. | |
| 6,044,362 A | 3/2000 | Neely | |
| 6,049,786 A * | 4/2000 | Smorodinsky | 705/40 |
| 6,052,671 A | 4/2000 | Crooks et al. | |
| 6,052,674 A | 4/2000 | Zervides et al. | |
| 6,058,380 A | 5/2000 | Anderson et al. | |
| 6,058,381 A | 5/2000 | Nelson | |
| 6,061,665 A | 5/2000 | Bahreman | |
| 6,070,150 A * | 5/2000 | Remington et al. | 705/34 |
| 6,070,798 A | 6/2000 | Nethery | |
| 6,073,104 A | 6/2000 | Field | |
| 6,073,113 A | 6/2000 | Guinan | |
| 6,076,072 A | 6/2000 | Libman | |
| 6,078,907 A | 6/2000 | Lamm | |
| 6,081,790 A | 6/2000 | Rosen | |
| 6,085,168 A | 7/2000 | Mori et al. | |
| 6,092,056 A | 7/2000 | Tull, Jr. et al. | |
| 6,108,639 A | 8/2000 | Walker et al. | |
| 6,115,690 A | 9/2000 | Wong | |
| 6,119,106 A | 9/2000 | Mersky et al. | |
| 6,119,107 A | 9/2000 | Polk | |
| 6,128,602 A | 10/2000 | Northington et al. | |
| 6,138,118 A | 10/2000 | Koppstein et al. | |
| 6,144,946 A | 11/2000 | Iwamura | |
| 6,151,588 A | 11/2000 | Tozzoli et al. | |
| 6,173,272 B1 * | 1/2001 | Thomas et al. | 705/42 |
| 6,292,789 B1 * | 9/2001 | Schutzer | 705/40 |
| 6,317,745 B1 * | 11/2001 | Thomas et al. | 707/100 |
| 6,385,595 B1 * | 5/2002 | Kolling et al. | 705/40 |
| 6,460,020 B1 | 10/2002 | Pool et al. | |
| 6,493,685 B1 * | 12/2002 | Ensel et al. | 705/40 |
| 6,578,015 B1 * | 6/2003 | Haseltine et al. | 705/34 |
| 6,594,647 B1 * | 7/2003 | Randle et al. | 705/77 |
| 2001/0051918 A1 * | 12/2001 | Mason | 705/40 |
| 2005/0033690 A1 * | 2/2005 | Antognini et al. | 705/40 |

FOREIGN PATENT DOCUMENTS

| | | |
|---|---|---|
| WO | WO 93/08545 | 4/1993 |
| WO | WO 96/08783 | 3/1996 |

* cited by examiner

ROLE DEFINITIONS

| Role Name | Tasks | | | | |
|---|---|---|---|---|---|
| | Invoice Creation | Invoice Approval | Dispute Resolution | Payment Authorization | Automatic Action |
| AR Specialist | Yes | No | No | No | No |
| AR Manager | Yes | No | Yes | No | No |
| AP Specialist | No | Yes | No | No | No |
| AP Manager | No | Yes | Yes | Yes | No |
| AP Auto Approval | No | Yes | No | No | Yes |
| ... | | | | | |

USER DEFINITIONS

| User Name | Role | Threshold | | |
|---|---|---|---|---|
| | | $ Amount | Specific Creditor/Debtor | Other Characteristic |
| Joe Smith | AP Specialist | Unlimited | Company X | None |
| Jane Doe | AP Manager | Unlimited | All | Euro |
| Adam Blue | AP Specialist | Unlimited | Company G, K | None |
| Brett Jones | AP Manager | $5,000 | All | None |
| Auto $1000 | AP Auto Approval | $1,000 | All | Non-DR |
| ... | | | | |

ELECTRONIC MULTIPARTY ACCOUNTS RECEIVABLE AND ACCOUNTS PAYABLE SYSTEM

FIELD OF THE INVENTION

The invention relates to a multiparty accounts receivable and accounts payable system that allows creditors and debtors to exchange information and settle their respective debts electronically. In addition, the invention allows participants to borrow more efficiently and to create and sell independent payment obligations to third parties using a new type of financial instrument.

BACKGROUND OF THE INVENTION

The sale and purchase of goods and services between businesses results in the creation of accounts receivable and accounts payable for the creditor ("seller") and the debtor ("buyer"), respectively. Traditionally, these accounts are maintained separately by the creditor and debtor, and are settled by payment of the outstanding obligation from debtor to creditor using checks, cash, clearing house transfers or wire transfers.

Usually, any information exchange between two commercial parties, such as the presentment of an invoice or the provision of remittance data, is paper-based, and requires manual processing even when one or both parties use electronic data processing systems. Relevant information, such as invoices and remittance data, is sometimes exchanged between the commercial parties electronically, via EDI ("Electronic Data Interchange") or other communication means. This requires translation from one party's paper or electronic system to the rigid EDI format, transmission through a privately maintained network, receipt, and translation back to electronic or paper records suitable for the counterparty's system. Because EDI is difficult and expensive to implement, maintain, and use, it has not been widely adopted.

Even when both parties use similar internal systems, such as ERP ("Enterprise Resource Planning") systems, there is virtually no interoperability between business partners, since such systems are designed for intra-company processing and workflows and not for communication between such systems. Thus, the exchange of information, at best, requires multiple conversions to different types of electronic systems, which may vary across a firm's trading partners. More typically, the exchange of information involves multiple transitions from electronic systems to paper and then back to electronic systems. If one of the trading partners does not agree to an element of an invoice (e.g., because goods arrived damaged), the process of resolving the matter can involve multiple interactions through mail, fax, and phone. Therefore, a system that creates an electronic linkage between trading partners for management of information, exchange of information, and resolution of disputes is desired. Such a system will alleviate the burden to businesses of limited interoperability and paper processing, reduce the cost of processing, and improve the efficiency of trade.

Businesses typically apply various internal rules in all their business processes, including the processing of accounts receivable and accounts payable. Such rules are intended to provide appropriate oversight and control over financial transactions. For example, only certain persons may be permitted to approve invoice amounts, a manager who has ordered the goods and services may be required to verify that the bill is in order before it is paid, and an officer may be required to authorize payments in excess of a certain amount. These rules are referred to as "workflow rules" (i.e., they determine how work flows through an organization). These workflow rules often require paper or electronic documents to be transmitted around an organization for approval, and it is not uncommon for documents to be delayed or lost in the process. An electronic system to handle accounts receivable and accounts payable must permit businesses to exercise a similar level of control. Thus, a system that makes documents accessible to any authorized users without physical transfers; incorporates role-based workflow management to allow businesses to increase the efficiency of processing accounts receivable and accounts payable; increases efficiency while maintaining financial and managerial control; and allows the automation of activities and approvals based on user-defined criteria, is desired.

Systems and methods currently available for facilitating settlement of transactions are also beset with many limitations. While small debts may be settled in cash, the actual settlement of payments for goods and services is usually conducted by the banking system using instruments such as checks, clearing house (ACH) or wire transfers. These instruments can be quite costly, particularly for international payments. In addition, these instruments result in an exchange of cash or bank balances between the commercial parties that is separate from the exchange of information relevant to the transaction (e.g., remittance information). This is because only limited information can be transmitted through the US and global banking systems' clearing processes. As a result, creditors prefer to receive a separate payment for each obligation. When debtors group payments (e.g., issue one check for several invoices) or net any deductions or credits from payments due, creditors have difficulty reconciling the payment and closing the accounts receivable due to the limited information available through the bank settlement systems. Thus, an information-rich settlement system that allows participants to achieve network economies and reduce payment costs through aggregating and netting payments, while providing access to detailed information required to track and reconcile such payments, is desired.

Because the current practices of accounts receivable and accounts payable management are undertaken by each party in isolation, potentially valuable information remains hidden until final settlement. For example, a debtor's intention to pay an amount due with respect to a particular invoice is not evident to the creditor until a check is received, deposited and cleared. Furthermore, disputes that may arise with respect to an invoice or other claim may not be apparent to the creditor until a payment is received showing that a debtor took a deduction (i.e., remitted an amount less than the invoiced amount).

In addition to raising the cost of processing accounts receivable and accounts payable, the deficiencies in information management result in higher costs of financing and force businesses to maintain working capital balances in excess of what would be required if information on accounts receivable and accounts payable were more clear and readily available. The lack of information transparency contributes to the mispricing of credit, particularly for SMEs ("small- and mid-sized enterprises"), which routinely pay interest rates higher than their larger counterparties. It also leaves businesses with a limited set of options for financing receivables.

Most receivables are financed by creditors using working capital, often supported by general commercial and industrial loans at rates reflecting the largely unsecured status of such loans. Some companies are able to access capital markets for receivables financing through complicated conduit structures, while others may turn to factoring. Both these and other solutions currently available typically apply relatively high interest rates as well as a marked-down loan amount relative to the face value of the receivables. The high interest rates and low loan-to-value ratios are meant to compensate for dilution (adjustments to receivables after they are booked) risk, default risk, liquidity risk, and other risks. Improved information on accounts receivable would reduce these risks, and consequently the cost of funds.

Thus, a system that addresses the deficiencies of information management inherent in current processes to provide for more accurate risk assessment by lenders is desired. Through such a system, the exact profile of cash flows for accounts receivable and accounts payable can be captured, as well as information on the creditworthiness of specific debtors; this information can be made available to lenders for their risk assessment processes. By providing means for debtors and creditors to confirm the amounts to be paid (net of any adjustments) and the date on which payment will be made, such a system would facilitate a wide range of commercial arrangements for financing accounts receivable and accounts payable, including a new class of tradable electronic promissory notes.

In summary, a system that provides more efficient interaction between debtors and creditors and provides improved information flows is desired. Such a system would improve overall system efficiency by significantly reducing the costs of invoicing, reconciling accounts receivable and accounts payable, and settlement. The improved information gathering and transparency features would also reduce the cost of financing.

SUMMARY OF THE INVENTION

The problems encountered in the prior art associated with accounts receivable and accounts payable and in particular the excessive expenses encountered in processing and settling them (in both contested and uncontested situations) and their unavailability as sources of working capital for businesses have been solved in embodiments of the present invention by providing an accounts receivable and accounts payable system. The accounts receivable and accounts payable system of the current invention comprises an information "bridge" between trading partners, thereby creating an electronic information network that facilitates efficient communication between various accounts receivable systems and accounts payable systems of the trading partners. Information concerning transactions between trading partners (e.g., invoices, disputes, settlement, financing, etc.) funnels through a single system, thereby facilitating the collection and tracking of financial information to offer system participants many advantages over prior art. For example, a single debt obligation resident on the accounts receivable and accounts payable system of the current invention is both an accounts receivable item to a creditor participant and an accounts payable item to a debtor participant, rather than two separate records (one for accounts receivable, and another for accounts payable). This allows for the creditor participant and debtor participant to share a common view of the debt obligation, facilitating the entire process including general information exchange, invoicing, dispute resolution and settlement.

The accounts receivable and accounts payable system allows creditor participants (or third parties acting on behalf of the creditor participants) to both manually and automatically enter accounts receivable information into a data storage system; create electronic invoices; and present the electronic invoices to the debtors for authorization or rejection. The system allows debtor participants to create electronic responses that either authorize or reject the presented electronic invoices; and present electronically all such authorizations or rejections. In the system, authorization, when used in conjunction with electronic invoices, signifies that the debtor participant has authorized the invoice and agreed to a sum and date ("value date") on which payment will be made to settle the debt obligation.

A first alternate embodiment of the invention comprises confirmation means for allowing a creditor participant and a debtor participant to a transaction to confirm an electronic invoice, whereby confirmation signifies that the debt has become an independent payment obligation due on a date certain and free of any defenses to the underlying contract. Confirmed electronic invoices can be used by system participants for better cash flow forecasting, obtaining better lending rates from financial institutions, or access to other financing alternatives including the creation of electronic promissory notes, electronic bills of exchange, or electronic drafts.

A second alternate embodiment comprises an approval means for invoices. The approval means allows a debtor participant to designate that an invoice has been reviewed and has been found either (1) to be accurate when reconciled with the debtor participant's own records, or (2) will be accepted as accurate by the debtor participant. Accordingly, "approval" as used herein in conjunction with electronic invoices means that the debtor participant accepts the factual information reflected in the invoice as accurate. The approval feature can be implemented as a step prior to authorization, or may occur concurrently with authorization. A system made in accordance with the present invention may be implemented with, or without, a separate approval step. The second alternative embodiment also provides a selective designation means that allows a system participant to designate particular electronic invoices in various ways. For example, a debtor participant can use the selective designation means to indicate that a particular invoice has been approved, or a creditor participant can use the selective designation means to indicate that a particular invoice has been reconciled with respects to payments received for the particular invoice.

A third alternate embodiment of the invention comprises an electronic workflow management means for allowing creditor and debtor participants to institute workflow management strategies for all aspects of invoicing, settlement, information management and financing, including creation and presentation of electronic invoices, approval, authorization and confirmation of invoices, dispute resolution, payment authorization, payment execution, settlement tracking, and financing options. This is accomplished by the electronic workflow management means which allows participants to customize, based on various characteristics and rules, task assignments and transaction flows to specific authorized users within the participant's company at various stages of invoicing, settlement, and financing. Some of the characteristics that can be used to specify workflow rules include the specific creditor (or debtor) name, invoice amount, currency, a flag indicating the invoice has been amended through a dispute resolution process, and any other information associated with the transaction and/or the parties involved in the transaction. For example, a debtor participant may institute a workflow management strategy that automatically channels invoices with amounts greater than $25,000 to a specific employee for review, and subsequently automatically channels these invoices to a specific manager for payment authorization, execution and tracking. The workflow functionality also allows a user to manually channel transactions to specific users. For example, a user can manually 'forward' and assign an invoice, which was originally channeled to him or her, to another user.

In addition to allowing participants to institute existing company workflow strategies, this variant of the present invention provides additional functionality by allowing participants to institute workflow rules that permit the system to automate many tasks that normally require manual actions by the participant (e.g., viewing, approving and confirming an invoice, authorizing payment, etc.). For example, using an automatic workflow allocation means of the present invention, a debtor participant can institute a workflow management strategy that automatically approves invoices for amounts less than $100. This additional functionality can be incorporated into traditional workflow strategies to further improve efficiency. For example, one such strategy would have small-value transactions automatically authorized; mid-value transactions channeled to employees with moderate levels of responsibility for approval; and mid-value and large-value transactions channeled to high-level employees or officers for authorization and payment execution.

A fourth alternate embodiment of the present invention provides a data-rich environment so that participants can use the data entry means and the electronic data storage means of the system to store a wide range of commercial information. Once stored, participants can access this commercial information and include it in electronic invoices. For example, this variant allows a participant to supplement basic accounts receivable information with other information such as a description of the underlying contract (e.g., tax information required by the jurisdiction in which the contract was transacted); information related to individual transactions (e.g., bill of lading, purchase orders, advanced shipping notice, etc.); information concerning the source of the information (e.g., from ERP system transmitted through EDI, from Company X accounting software transmitted through Internet flat file upload, etc.); or information concerning the debtor or creditor participant (e.g., change of address, change of terms, marketing and advertising, etc.). This variant of the present invention also allows participants to attach the above-mentioned information to electronic invoices, responses and any new or amended electronic documents.

A fifth alternate embodiment of the present invention provides an invoice dispute initiation, resolution and amendment feature that allows participants to initiate and engage in negotiations concerning rejected and amended invoices. The dispute initiation, resolution, and amendment feature comprises an electronic rejection means; an amendment proposal means; an amended invoice creation means, and a credit note creation means. The electronic rejection means of this variant allows a debtor participant to create an electronic response setting forth the basis on which the debt or information reflected in the electronic invoice is contested. The amendment proposal means of this variant allows the debtor participant to propose a new payment date, payment amount or other changes and indicate reasons for the dispute. The creditor participant can respond with an acceptance or amendment of the proposal. This negotiation process can involve many responses by both sides until an agreement is reached between the creditor participant and debtor participant. The agreed-to electronic invoice then becomes the system invoice of record. Alternatively, this variant allows a creditor participant to amend an existing electronic invoice, setting forth the basis on which the debt or information reflected in the electronic invoice is subject to authorization or confirmation by the debtor participant. The debtor participant can authorize or confirm the amended invoice or reject the amended invoice. In situations where the debtor participant rejects an invoice, the rejected invoice enters into the same dispute resolution process as if the debtor participant had initiated the dispute resolution process (as described above). In either instance, authorization of the electronic invoice signifies that the debtor participant has agreed to a value date on which payment will be made to settle the debt obligation. Additionally, confirmation of the electronic invoice signifies that the debt has become an independent payment obligation due on a date certain and free of any defenses to the underlying contract. This variant also allows a debtor participant to unilaterally submit a payment after an amendment proposal but before the creditor participant has agreed to the proposal, allowing the debtor participant to submit an amount believed to be correct without prior agreement of the amount from the creditor.

The credit note creation means of the fifth alternate embodiment also allows a creditor participant to create and present a credit note to the debtor participant, setting forth the basis on which the credit reflected in the credit note is subject to approval by the debtor participant. The credit note would be issued during a dispute resolution process and would be associated with the electronic invoice under dispute. Alternatively, the credit note can be issued outside of the dispute resolution process. If the credit note is associated with an electronic invoice, the debtor participant may authorize or confirm the credit note along with the associated electronic invoice. If the credit note is not associated with an electronic invoice, it is essentially treated the same as an electronic invoice. In addition, a debtor participant can create a credit note to keep an internal general ledger synchronized with the information stored on the system of current invention. For example, the debtor participant can create a credit note to apply to an invoice after payment or rejection of the invoice to reduce the unpaid balance (e.g., when paid amount is less than the invoice amount) on the invoice to zero.

A sixth alternate embodiment of the present invention comprises an information access control means that allows a participant to institute various opacity features to shield selected information from other participants. This feature offers great flexibility in allowing a participant to control the amount of sensitive information to be made available for viewing by other system participants or third parties. For example, a debtor participant can allow a select group of confirmed invoices from a particular creditor to be viewable to three selected financial institutions, and only for five days from today.

This variant allows the participant to specify various characteristics and criteria to control what information is viewable, who may view the information, and when the information may be viewed. For example, in selecting the information to be made viewable, the participant can specify that all accounts receivable be viewable, or that only specific invoices (e.g., only those that are confirmed) be viewable, or that only specific line items be viewable, or that any other specific information be viewable. In selecting who may view the information, the participant can specify individual participants of the system, or individual third parties, a group of third parties meeting certain criteria such as assets under management or geography (e.g., a group of financial institutions in the US with assets under management greater than $5 billion). In selecting when the information may be viewed, the participant can specify a particular date or a group of dates (e.g., three days, a week, a month) either independent or dependent on other information (e.g., value date, first date of electronic promissory note sale availability).

A seventh alternate embodiment of the present invention provides a financial data reporting means that allows a participant to organize and analyze information, including cash flow information, maintained on the system. The financial data reporting means also provides reporting tools for creating reports that memorialize this information. For example, a creditor participant can use this feature to view all confirmed invoices or all unconfirmed invoices, or view all invoices organized alphabetically by debtor name or by debtor credit rating, or view invoices owed only by selected debtors. The creditor participant can view invoices by settlement date (e.g., where the invoices are organized by a specific date, specific group of dates, weekly, monthly, etc.), or by any other characteristics of the information that can be used as a basis for specifying or grouping. Alternately, the debtor participant can view accounts payable information in a similar manner.

A financial information viewing means of the seventh alternate embodiment also allows a participant to permit financial institutions or any third party who are interested in lending funds to the participant to view certain accounts receivable and accounts payable information as a basis for reaching a lending decision, and for monitoring borrowers' cash flows.

An eighth alternate embodiment of the present invention comprises two alternate systems that allow creditor participants to sell independent payment obligations that are created by the confirmation process to third parties.

The first system of the eighth alternate embodiment comprises an independent payment obligation sale authorization means that allows a debtor participant to permit a creditor participant to sell to third parties independent payment obligations created by the confirmation process. The independent payment obligation sale authorization means facilitates many commercial arrangements between the creditor participant and debtor participant; for example, the debtor participant can permit the creditor participant to sell the independent payment obligations to a specific third party; to a predetermined group of third parties; or to any third party. This variant also comprises a third party preference specification means that permits third parties to specify their purchase preferences (e.g., a third party desires to purchase independent payment obligations owed by a debtor participant having an acceptable credit rating).

The second system of the eighth alternate embodiment comprises an electronic promissory note designation means that allows participants to designate as electronic promissory notes confirmed electronic invoices that have become independent payment obligations due on a date certain and free of any underlying contract defenses. The system provides several modes of operation for participants. For example, a creditor participant on an electronic invoice can specify that confirmation causes the invoice to become automatically an electronic promissory note; a creditor participant and a debtor participant on an electronic invoice can agree that confirmation causes an electronic invoice to become automatically an electronic promissory note; or a debtor participant and a creditor participant can agree that after confirmation the electronic invoice remains a bilateral contract pursuant to which an electronic promissory note can be issued only after the debtor participant gives an additional consent.

The creditor participant holding electronic promissory notes can make them available for discounting or other financing transactions (e.g., secured lending) by third parties (e.g., banks, financial institutions, corporations), or can use them to settle other debt obligations to creditors. The system provides a sale availability designation means which allows creditor participants to designate certain electronic promissory notes as available for discounting. An electronic promissory note sale availability identification means identifies all electronic promissory notes that have been identified as available for sale, and creates an electronic record that lists all electronic promissory notes so designated. The listed notes can be posted electronically for review by third parties interested in purchasing them. Alternatively, a system made in accordance with the present invention may include an electronic promissory note bid solicitation means for electronically soliciting bids from third parties, including other system participants. As yet another alternative, a system may include an electronic promissory note sale availability notification means for advising third parties of the electronic promissory notes available for sale.

The system provides an electronic promissory note bid means for allowing third parties to construct and submit electronic bids to the creditor participants holding the electronic promissory notes. The system also facilitates a negotiation process which allows creditor participants and third parties to negotiate over the purchase amount. Once the creditor participants and third parties have agreed on a purchase amount, this variant of the present invention allows third parties to provide settlement information through a third party settlement information collection means. Once collected, a third party settlement information advice means advises debtor participants, who owe the debts reflected in the purchased electronic promissory notes, of the new settlement information.

This second system of the eighth alternate embodiment also comprises a third party preference specification means that provides several discounting options to third parties. For instance, if the third party is interested in purchasing a certain amount of electronic promissory notes, the system can bundle a collection of electronic promissory notes equal to the monetary value sought by the third party. Alternatively, if the third party is interested in purchasing some or all electronic promissory notes reflecting debts owed by a particular debtor, the system can identify all such electronic promissory notes held by participants and designated for sale. Further, if the third party is interested in purchasing electronic promissory notes reflecting debts owed by debtors having a certain credit rating acceptable to the third party, the system can identify all such electronic promissory notes that have been designated as available for sale to the third party and thereby make them available for purchase. These represent only a few of the many selection criteria and bundling options available for identifying specific electronic promissory notes.

This variant also facilitates financing transactions involving electronic promissory notes other than discounting transactions. For example, the system allows creditor participants to use electronic promissory notes as collateral for secured lending, as the basis for unsecured lending or for related capital market financing transactions.

A ninth alternate embodiment of the present invention comprises a payment issuance currency designation means that allows a debtor participant to specify a desired currency for a payment to be issued by the debtor participant. The ninth alternate embodiment also comprises a payment receipt currency designation means that allows a creditor participant to specify a desired currency for a payment to be received by the creditor participant, both irrespective of the currency indicated on the invoice. This variant accommodates situations where the participants may wish to submit or receive payment for a given invoice in a currency different from the currency indicated on the invoice.

A tenth alternate embodiment of the present invention comprises an accounts receivable and accounts payable aggregation means that aggregates accounts receivable and accounts payable information by value date and currency. Using this feature, a debtor participant knows in real-time exactly what it owes to its trading partners, and a creditor participant knows in real-time exactly what is owed by such trading partners. This feature allows a debtor participant to settle a plurality of debt obligations for a given value date and currency using a single payment. This feature also reduces for a creditor participant a plurality of payments for a given value date and currency to a single payment. Furthermore, as the participants may specify the currency in which to issue or receive a payment irrespective of the currency specified on the invoice, the aggregation feature may be applied to the invoice currency, debtor participant-specified currency or creditor participant-specified currency.

An eleventh alternate embodiment of the present invention provides a netting feature. The netting feature allows participants to net accounts receivable and accounts payable for a given value date and currency. Netting can be done on a bilateral basis (between two trading partners), with permission, or on a multilateral basis (between a group of trading partners), with permission. Bilateral netting nets, for a participant, the amounts owed to another participant by the amounts owed by that participant for a given value date and currency. Multilateral netting nets, for a participant, the amounts owed to all of the other participants of the multilateral netting group by amounts owed by all the participants of the group for a given value date and currency. As the participants may specify the currency in which to issue or receive a payment irrespective of the currency specified on the invoice, the netting feature may be applied to the invoice currency, debtor participant-specified currency or creditor participant-specified currency.

A twelfth alternate embodiment of the present invention allows debtor participants and creditor participants to settle their debts electronically using an indirect settlement method and to track the progress of the settlement process. The indirect settlement method uses an agent bank, or other financial institution, for settlement of debts between participants. In the indirect method, funds are first transferred from a debtor's bank to an agent bank, and then transferred from the agent bank to a creditor's bank. The system determines the payment that need be made by a debtor participant on authorized or confirmed electronic invoices. This variant informs the debtor participant a number of days before debts become due that the debtor participant needs to make payment on the debt. This feature advises the debtor participant to make payment in the amount due to a system trust account at an agent bank, or a third party financial institution, on the agreed-to date and in the agreed-to currency. Alternately, through an "auto-debit" feature, a debtor participant can authorize the system to issue on behalf of the debtor participant a payment instruction to the debtor participant's bank to initiate the transfer of funds from the debtor participant's bank to a system trust account at the agent bank.

The settlement feature of the twelfth alternate embodiment comprises settlement determination means, debtor and creditor participant settlement information notification means, settlement verification means, automatic debit permission means, and payment exception processing means. The settlement determination means of this variant determines the payment that need be made by a debtor participant on authorized or confirmed electronic invoices. The debtor participant settlement information notification means informs the debtor participant a number of days before payment obligations become due (e.g., on authorized or confirmed electronic invoices) that the debtor participant needs to make payment on the debt. The notification period may be predetermined by the system or specified by the participant. The creditor participant settlement information notification means informs the creditor participant that payment should be expected from a debtor participant. The settlement verification means advises the creditor participant and debtor participant in general terms of the completion or failure of payments due from the debtor participant. The settlement verification update means updates settlement information stored in the electronic data storage system with information concerning the completion or failure of payments due from the debtor participant. The automatic debit permission means allows a debtor participant to permit the system to automatically create and issue payment instructions on behalf of the debtor participant to the debtor participant's bank. The payment exception processing means processes payment failures encountered during the settlement process.

At each step of the indirect settlement process, the settlement tracking feature of the twelfth alternate embodiment allows the acting participant to advise the other participants of the progress of settlement. For example, after payment has been received by the agent bank of the system, verification information is generated to inform the participants of the payment receipt and appropriate account updates are made on the system. This variant allows the participants to track the settlement process and to be informed of significant changes in the status of specific invoices and debt obligations. This is accomplished through the communication network between the system, agent bank(s), the participants, the banks of the creditors and debtors, and any third party connected to the system communication network.

The settlement information tracking feature of the twelfth alternate embodiment comprises debtor participant payment remittance verification means, debtor participant payment remittance presentment means, debtor participant payment remittance update means, trust account payment receipt verification means, trust account payment receipt presentment means, trust account payment receipt update means, trust account payment remittance verification means, trust account payment remittance presentment means, creditor participant payment receipt verification means, creditor participant payment receipt presentment means and creditor participant payment receipt update means.

The participants would use the various settlement tracking means in the following manner. After the debtor participant has made payment to the trust account at the agent bank, the debtor participant or the system would use the debtor participant verification means to create an electronic remittance confirmation document, and use the debtor participant payment remittance presentment means to present the document to the creditor participant and the trustee of the trust account at the agent bank. The document advises them that payment has been made by the debtor system participant.

The system would record this information using the debtor participant payment remittance update means.

The trustee of the trust account at the agent bank would use the trust account payment receipt verification means and the trust account payment receipt presentment means to advise the creditor participant and debtor participant that the trustee verifies that the debtor participant has made payment into the trust account at the agent bank in the amount due on the agreed-to date and in the agreed-to currency. The trust account payment receipt update means records this receipt information. When the trustee of the trust account transfers an amount equal to the amount received from the debtor participant into an account of the creditor participant at the creditor participant's bank, the trustee of the trust account uses the trust account payment remittance means to create a trustee account payment remittance and trust account payment remittance presentment means advise the creditor and debtor participants that an amount equal to the amount paid by the debtor participant has been transferred into an account of the creditor system participant. A trust account payment remittance update means then updates the data stored on the system with the trustee remittance information.

The creditor participant, or the system on behalf of the creditor participant, uses the creditor participant payment receipt verification means and the creditor participant payment receipt presentment means for advising the debtor participant and trustee of the trust account that the creditor participant acknowledges the payment made by the trustee into the creditor participant's bank account.

A thirteenth alternate embodiment of the present invention allows debtor participants and creditor participants to settle their debts electronically using a direct settlement method, and to track the progress of the settlement process. The direct settlement method uses a direct fund transfer from a debtor's bank to a creditor's bank for settlement of debts between participants. This variant informs the debtor participant a number of days before debts become due that the debtor participant should make payment on the debt. The notification period may be predetermined by the system or specified by the participant. This feature advises the debtor participant to make payment in the amount due to the creditor account at the creditor's bank on the agreed-to date and in the agreed-to currency. Alternately, through an "auto-debit" feature, a debtor participant can authorize the system to issue on behalf of the debtor participant a payment instruction to the debtor participant's bank to initiate the transfer of funds from the debtor participant's bank to the creditor's bank. After payment has been received by the creditor's bank, verification information is generated to inform the participants of the payment receipt and appropriate account updates are made on the system.

This variant allows participants to track the settlement process and be informed of significant changes in the status of specific invoices and debt obligations. This is accomplished through the communication network between the system, the participants, the banks of the creditors and debtors, and any third party connected to the system communication network. The system supports the receipt and submission of verification information and settlement instructions with the interested parties at various steps of the settlement process, thereby facilitating the entire settlement, tracking and notification process. The participants therefore need only access the system to monitor the progress of the entire settlement process.

The settlement information tracking feature of the thirteenth alternate embodiment comprises debtor participant payment remittance verification means, debtor participant payment remittance presentment means, debtor participant payment remittance update means, creditor participant payment receipt verification means, creditor participant payment receipt presentment means and creditor participant payment receipt update means.

A fourteenth alternate embodiment of the present invention allows a debtor participant to use the data entry means and the electronic data storage means to enter and store accounts payable information concerning debts owed to both creditor participants and creditor non-participants. This variant thus accommodates situations where (1) a debtor participant receives an invoice from a creditor participant who has not chosen to use the system of the present invention to invoice the debtor participant (e.g., the invoice was paper-based and mailed to the debtor participant), or (2) a debtor participant owes a debt to a creditor, but the creditor is not a participant on the system of the present invention. In either case, the debtor participant can "self-invoice" to create an invoice reflecting a debt owed to another party.

Once the accounts payable information is entered into the system, the information is treated in the same manner as if the information had been entered (and invoiced) by a creditor participant. As such, this accounts payable information may be accessed using any functionality offered by the system of the present invention, including the settlement and tracking functionality. Thus, this variant allows the participant to funnel all of its invoice payment activity through a single system, regardless of whether or not a particular creditor is a participant on the system. For example, this variant allows debtor participants to use the same settlement process for both debts that have been invoiced offline (e.g., paper invoice via mail) by a creditor, and debts that have been invoiced on the system by a creditor participant.

A fifteenth alternate embodiment of the present invention comprises a participant foreign exchange transaction means that calculates and monitors participant foreign exchange requirements by value date and currency pair, and advises participants of foreign exchange transactions needed. The system allows for foreign exchange transactions through the system, agent bank networks, financial institutions, or third party foreign exchange providers who execute payments in multiple currencies.

A sixteenth alternate embodiment of the present invention comprises a foreign exchange pooling means for use in the settlement of payment obligations. The foreign exchange pooling means calculates and monitors system foreign exchange requirements by value date and currency pair, and executes system foreign exchange transactions to hedge against volatility and relative price movements in the currency markets. For determining foreign exchange requirements, the system calculates the minimum foreign exchange transactions required for all the amounts in all the currencies involved for a given value date. Numerous methods for calculating the required minimum foreign exchange transactions exist. For example, a method aggregates and nets all inbound and outbound amounts for each currency, followed by multilateral netting between the different currencies given a snapshot of the exchange rates. The netting serves to reduce the value-at-risk of multi-currency debt obligations and the size of foreign exchange transactions required for settlement for a given value date.

This variant also allows for foreign exchange transactions through the system, agent bank networks, financial institutions, or third party foreign exchange providers who execute payments in multiple currencies. The foreign exchange transactions (e.g., purchase of foreign exchange forwards)

allow the system to hedge against volatility and relative price movements in the currency markets by locking in ahead of time a foreign exchange rate (e.g., through purchase of foreign exchange forwards).

One of ordinary skill in the art will understand that each of the alternate embodiments can be practiced in combination with other accounts receivable and accounts payable invoicing systems. In addition, one of ordinary skill in the art will understand that the preceding alternate embodiments can be combined in various ways to accomplish different system objectives. Further, one of ordinary skill in the art will understand that the means of accomplishing the functionality described herein can be distributed in various ways, e.g., combined into a single stand-alone system or distributed among a plurality of separate, but interconnected and communicating, systems. All of these variants are within the scope of the present invention.

Thus it is seen that the accounts receivable and accounts payable system of the present invention overcomes the limitations of the prior art. For example, the present invention provides an efficient, inexpensive and comprehensive system for processing and settling accounts receivable and accounts payable, provides a bridge between accounts receivable and accounts payable systems for efficient information exchange, and improves financial management through lower working capital requirements, improved financing terms and additional options for financing receivables.

The present invention significantly reduces the amount of inefficient processing associated with invoicing and settlement. Manual and paper-intensive processes are significantly reduced through electronic data entry, invoicing, dispute resolution, settlement and payment reconciliation. In addition, the automatic workflow functionality can significantly reduce the number of transactions requiring human processing. Finally, the present invention provides a single platform and standard for bridging the accounts receivable and payable systems of the participants, thereby facilitating efficient exchange of information without the need for numerous translations. This efficient exchange of information also serves to facilitate and improve the business relationships between trading partners.

The present invention allows participants to institute workflow management strategies that significantly improve upon workflow processes that currently exist at companies. The system allows information and documents to be accessible or channeled to authorized users without physical transfer, incorporates role-based workflow management functionality to allow businesses to increase the efficiency of processing accounts receivable and accounts payable, increases the level of financial and managerial control, and allows the automation of tasks (e.g., approval, authorization, confirmation, etc.) based on participant-defined criteria. The system achieves these improvements through a simple interface that allows detailed and customizable rules to be instituted, governing essentially every step of the invoicing, approval, authorization, confirmation, dispute resolution, settlement and financing processes.

As the bridge, or network, between accounts receivable and accounts payables systems of participants, the present invention allows participants to achieve network economies and reduce the number and amount of payments, and hence the cost of payments, through the aggregation and netting functionality. Aggregation can significantly reduce the number of payments to be issued by the debtor participant and received by the creditor participant, and netting can reduce the amount, and to a lesser degree the number, of payments to be issued or received. Importantly, the system achieves these reductions without loss of the detailed information required to track and reconcile payments. The system allows the participants to monitor each stage of the settlement process, from the debtor participant's creation of a payment instruction to the creditor's payment receipt confirmation, and any exceptions and fails that may occur during the settlement process. In addition, the aggregation and netting features can be used for forecasting purposes in advance of value dates. Participants can use these features to monitor expected incoming and outgoing cash flows on a real-time basis.

The current invention addresses the deficiencies of information management inherent in existing processes and significantly improves the transparency and clarity of accounts receivable and accounts payable information, providing participants the means for improved financial management. This enhanced information can be used by participants to obtain better lending rates, or to have access to alternate means for financing. Accurate accounts receivable and accounts payable cash flow profiles and information regarding creditworthiness of specific debtors can be made available to lenders, who can use the information to facilitate risk assessment and lending decision. Further, through the creation of electronic promissory notes from confirmed accounts receivable and accounts payable, the system facilitates a wide range of new commercial arrangements for financing, including a new class of tradable electronic promissory notes. Thus, the present invention provides participants access to lower costs of borrowing and new sources of working capital.

In summary, the present invention provides significantly improved interaction and exchange of information among the participants. These result in a more efficient and less costly processing of accounts receivable and accounts payable, reduced costs of settlement, and improved financing terms and options.

BRIEF DESCRIPTION OF THE DRAWINGS

The above and other objects and advantages of this invention will be apparent upon consideration of the following detailed description, taken in conjunction with the accompanying drawings in which like characters refer to like elements throughout and in which:

FIGS. 15A–B depicts computer screen user interfaces associated with the workflow management features of the present invention;

DETAILED DESCRIPTION OF THE PREFERRED EMBODIMENTS

A. Background

In the following description, it is to be understood that following terms have the specific meaning as used herein: the term "participant" as used herein refers to a company using the present invention, while the term "user" refers to an employee (or an automatic system) of such company; the present invention allows for a participant to use both the accounts receivable features and accounts payable features simultaneously, corresponding to the selling and buying activities of the participant company, respectively. Therefore, the terms "debtor participant" and "creditor participant" as used herein are used instead of the equivalent "buyer" and "seller" to refer to the side of the transaction a participant has taken, rather than an absolute classification of the participant. Furthermore, since the present invention allows for one of the two companies of a transaction to not be a system participant of the present invention, the terms "debtor" and "creditor" as used herein refer to both the system participants of the present invention and the companies that are not system participants of the present invention; and, the term "contract" refers to any agreement (express or implied) concerning a transaction where there is an exchange of value between separate parties and encompasses without limitation written contracts, oral contracts, lease and rental transactions, and any other transaction where money is exchanged for goods or services. The term "contracted" refers to the fact that two parties have agreed to such an exchange of value, e.g., money for goods or services. The term "debt" refers to any and all payment obligations that arise from such agreements.

Furthermore, where there are references to "authorized or confirmed", it is to be understood that "authorized or confirmed" is meant to be inclusive, so that the described functionality of the system referring to "authorized or confirmed" can be implemented to work with authorized invoices only, confirmed invoices only, or both authorized and confirmed invoices together. For example, the aggregation means of the present invention may work with authorized invoices only, confirmed invoices only, or both authorized and confirmed invoices together (and further regarded by the system, for the purpose of a particular functionality, as either homogeneous set of invoices or heterogeneous sets of invoices).

Figure 1:
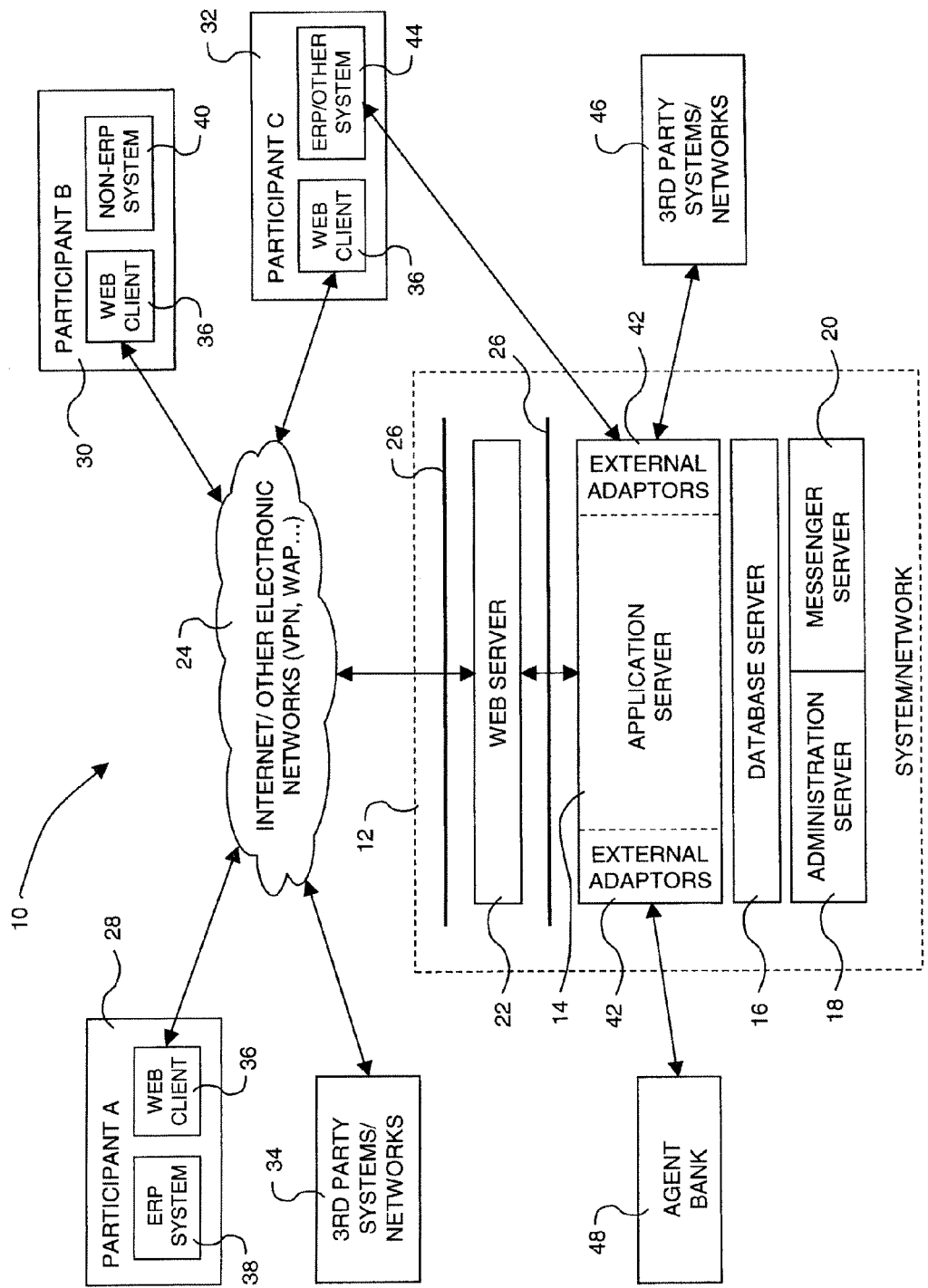
FIG. 1 is a block diagram showing the system architecture of the accounts receivable and accounts payable system of the present invention.

The present invention concerns a business-to-business information service and network implemented on the Internet as depicted in FIG. 1, and which is widely applicable and can be adapted to the structures and prevailing commercial practices of many countries and industry sectors. In a preferred embodiment 10 as depicted in FIG. 1, system participants A, B and C, shown here as 28, 30, and 32, communicate over the Internet 24 with the accounts receivable and accounts payable system 12. While the preferred embodiment 10 shows an implementation using the Internet 24, other networks such as Virtual Private Networks ("VPN"), wireless or other electronic communication networks may be used. The accounts receivable and accounts payable system of the preferred embodiment also will be accessed by third parties 34 and 46, and by agent bank 48. For example, included among the third parties who may use the system are financial institutions, insurance companies, freight/shipping companies, electronic commerce exchanges and marketplaces, securities exchanges, credit verification companies, and any other online or offline businesses.

In the preferred embodiment as depicted in FIG. 1, the accounts receivable and accounts payable system 12 comprises an application server 14 with external adapters 42; a database server 16; an administration server 18; a messenger server 20; and a web server 22 with firewalls 26. Application server 14 hosts the computer programs that provide much of the functionality of the present invention. External adapters 42 allow the application server to communicate with external systems 46 or 48 via an electronic network or a direct electronic connection, providing secure exchange of information and conversion of data formats for data transmitted between the systems. Secure exchange of information may be accomplished by any of the many conventional encryption techniques (e.g., DES, PKI, Certification Agencies, cookies, etc.) available through software packages, security service providers, and custom programs, or any combination thereof. Data conversion may similarly be accomplished by any of the many conventional techniques available through software packages, data conversion service providers, and custom programs, or any combination thereof. Database server 16 stores information pertaining to the system operations and information concerning the system participants, including transaction information between the system participants. Administration server allows a system administrator of the system 12 to monitor and maintain system operations, provide system upgrades and fixes, handle exceptions, and perform other tasks necessary in maintaining the system. Web server 22 performs the function of making information available to system participants, third parties systems 34, and any devices used for accessing information through the Internet. Firewalls 26 provide protection against unauthorized attempts by outside parties to access information stored systems through the network to which the systems are connected.

The system 12 may be implemented by a wide range of systems, networks, programming languages and third party service providers. For example, all the components of system 12 may be implemented on a single server, or computer, (e.g., IBM servers), or individual components may reside on different servers interconnected to one another (e.g., the application server 14 on an IBM server and the database server 16 on an Oracle server). The system 12 may be connected to the Internet using network servers (e.g., Cisco servers and routers) and network service providers. Likewise, the firewalls may be implemented on separate servers, or a level of firewall protection may be provided by a third party network provider who provides Internet connection to the system 12. System 12 may also be hosted by an ASP ("Application Service Provider") who is responsible for providing the servers and networks on which the systems resides, and for operating and maintaining the systems and networks on behalf of the system owner. Furthermore, the system may be implemented using one of many computer languages and protocols available (e.g., Java Beans, XML, C, etc.).

The system participants A (28), B (30) and C (32) communicate with the system 12 over the Internet 24 using a web client 36 in order to access information maintained on the web server 22 and an application server 14. The web client 36 allows the system participants to access information available through the Internet using software packages (e.g., Microsoft Internet Explorer, Netscape Navigator, etc.) that present information graphically and collect information from the user. The system participants may also access information through any GUI ("graphical user interface") such as on a palm-held device over a wireless network. Instead of a web server 22, the system may employ other information communication methods to disseminate to and collect information from system participants. For example, system 12 may implement a wireless network server to allow system participants to access information over a wireless network using a wireless device with a GUI. Also, the system may disseminate information through a conventional phone system, where a system participant may have access to information aurally and perform some system functions. The system participants need to access information maintained on the web server 22 such as various system forms for use by system participants A, B and C. For example, prior to becoming system members, they would have accessed the membership information maintained in the application server and filled out application forms for applying to become a system participant. After being approved as system participants, A, B and C will use other forms and services maintained on, or provided by, the system 12.

For example, if system participant A wishes to create an electronic invoice for presentment to system participant B, the system 12 provides several alternative procedures. System participant A can manually enter invoice information by accessing the web page where blank forms for electronic invoices are maintained. System participant A as creditor participant would then complete the invoice by entering invoice information into the form on the web page. Once created, the electronic invoice would be presented to system participant B as debtor participant over the Internet. Alternatively, system participant A can automatically upload invoice information in real-time or in batches. This is usually the preferred method of entering invoice information, especially if there is a large amount of information to be entered. In this case, the invoice information would typically reside on the accounting system of system participants, such as on an ERP system 38 (e.g., ERP systems provided by Oracle, SAP, etc.), as shown for system participant A, or other non-ERP system 40, as shown for system participant B. Information stored on the participant system 44 can be electronically transmitted to the accounts receivable and accounts payable system 12 through means of external adaptors 42 or through means of a web client 36 and via the Internet 24. Once entered into the accounts receivable and accounts payable system 12, the invoice information can be presented to and be accessed by system participant B through the Internet.

Figure 2:
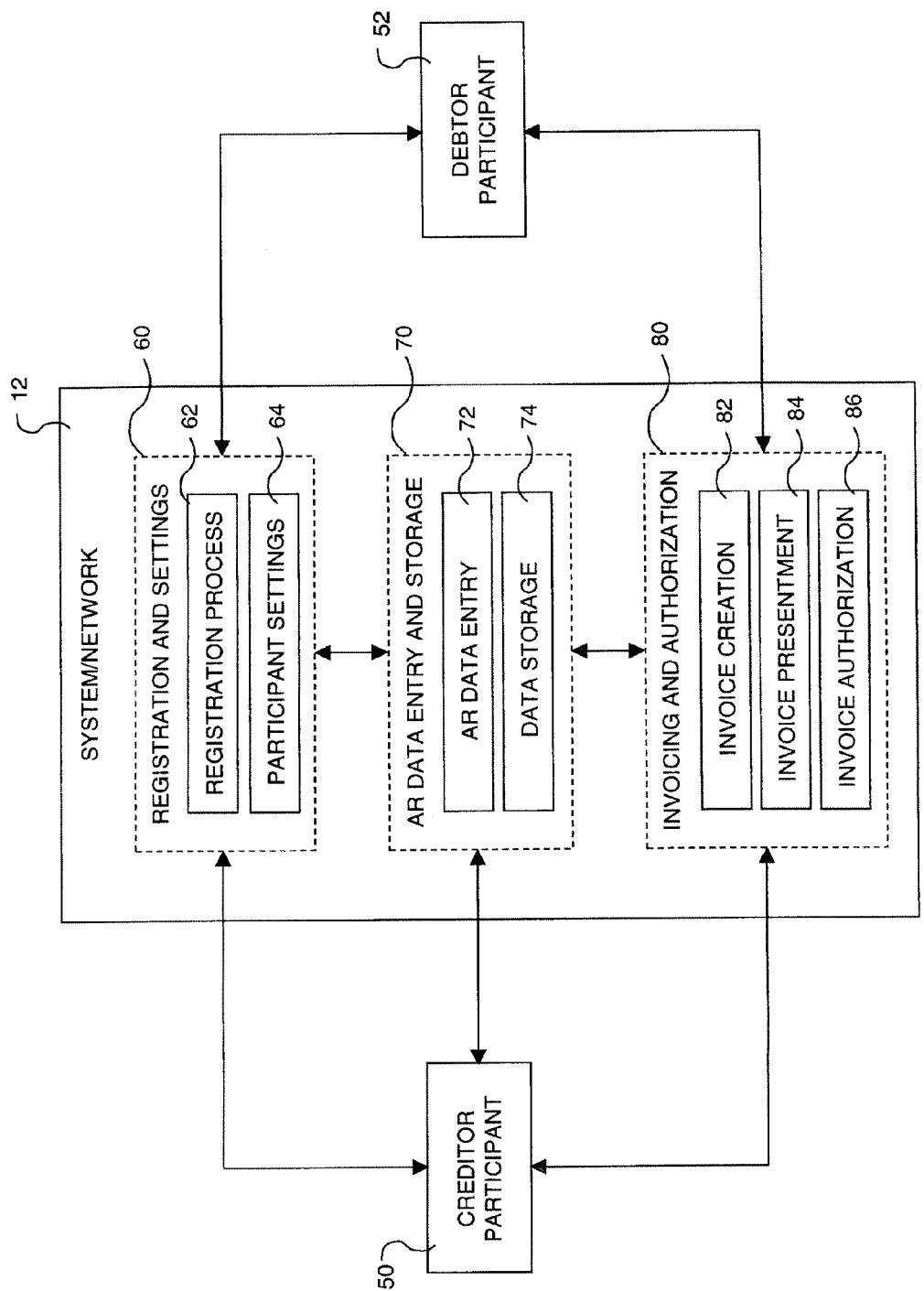
FIG. 2 is a block diagram showing the system components, interconnections and processes of the preferred embodiment of the present invention.

The system for executing these operations are shown in greater detail in FIG. 2. As shown in FIG. 2, the accounts receivable and accounts payable system 12 of the present invention implements numerous processes and is accessed by a creditor participant 50 and debtor participant 52. For example, the accounts receivable system and accounts payable system of the present invention provides an electronic registration and user settings system 60 for participant registration and subsequent initial customization of system participant settings. The registration process 62 allows a potential participant to apply to become a system participant. Assuming the applicant is accepted and becomes a participant, the participant settings process 64 allows a participant to customize participant and user system interfaces and preferences.

The accounts receivable and accounts payable system 12 of the present invention comprises an electronic data entry and storage system 70 for entering and storing information to be used by the system and participants. The accounts receivable data entry and storage system 70 comprises a data entry means 72 and an electronic data storage means 74. The data entry means 72 allows system participants to both manually enter and automatically upload accounts receivable information into the accounts receivable and accounts payable system 12. The data entry means 72 has the flexibility to allow system participants to enter accounts receivable information manually through the web pages, as well as automatically upload information through either the web pages or external adaptors. Once entered, the electronic data storage means 74 stores the accounts receivable information, as well as accounts payable and other information related to the system participants. The electronic data storage means may comprise any of the many conventional data storage methods available, such as database servers from Oracle or EMC, or any other available data storage devices incorporating various storage media (e.g., RAM and SRAM, magnetic tapes or hard drives, optical diskettes and drives, etc.).

The accounts receivable and accounts payable system 12 comprises an invoicing and authorization system 80. The invoicing and authorization system 80 further comprises an invoice creation means 82, an invoice presentment means 84, and an invoice authorization means 86. The invoice creation means 82 comprises a system of GUIs and protocols that allows a creditor participant or a debtor participant to create electronic invoices. In preferred embodiments, electronic invoices may be created manually or automatically, and in both instances, the system participant can customize the information and layout of the invoices through custom templates. In the manual case, the system participant would establish contact with the accounts receivable and accounts payable system 12 over the Internet and access the web page where standard and custom electronic invoice forms are maintained. After having accessed the appropriate web page, the system participant would then use data entry system 72 to enter accounts receivable information into blank electronic invoices. This information would include the identity of the creditor and debtor; the payment amount; the payment date; the payment currency; and any other information preferred by the system participant or required by applicable regulations (e.g., VAT, value-added, use, or sales tax). The electronic invoice also preferably contains information concerning the nature of the underlying transaction (e.g., detailed descriptions of goods or services sold). A debtor participant may create invoices for purposes of self-invoicing to record its debt obligations in the system. This allows the debtor participant to issue payments for invoices that were not received through the system (e.g., invoices from a system non-participant, or invoices from creditor participants who did not use the system for presenting the invoices to the debtor participant). The system may also be accessed by other means such as a wireless communication network. A wireless implementation would allow a participant to create and present invoices from a location with no access to a computer terminal. For example, a system participant may create an invoice through a wireless device while at a construction site that has no access to the Internet.

After having created the electronic invoice, the creditor participant would then use the electronic invoice presentment means 84 to present the electronic invoice to the debtor participant for authorization. Once presented, the electronic invoice would be accessible by the debtor participant every time and any time the debtor participant accesses the system. Alternatively, the electronic invoices could also be transmitted as an electronic document via the Internet or other electronic communication network. For example, the electronic invoice could be transmitted as an email attachment to the debtor participant.

The electronic invoice authorization means 86 allows the debtor participant to authorize the electronic invoice to signify that the debt reflected in the electronic invoice is not contested. Authorization of an electronic invoice signifies that the debtor participant has agreed to the amount, currency, and date of payment ("value date"). In alternate embodiments, the system allows for confirmation of electronic invoices. Confirmation as practiced in the system has special significance: through confirmation, the original debt in the electronic invoice becomes an independent payment obligation due on a date certain and free of defenses to the underlying contract. In other embodiments, the present invention provides an approval means that allows a debtor participant to designate that the factual information is accurate (or will be accepted as accurate, i.e., not disputed).

The present system allows a system participant to download its financial information from the system, thereby allowing the system participant to incorporate the information into its own accounts receivable system or accounts payable system. Furthermore, the downloaded information may be used for review of the financial information away from the system, allowing each participant to perform certain tasks offline or in a different system, such as reconciliation or performing cash flow analysis. Also, the participant may indicate that the status of specific invoices (e.g., approved status, etc.) be changed by adjusting certain data fields on the downloaded information. This adjusted information may then be uploaded to the system where appropriate updates are made by the system to individual records.

Figure 3:
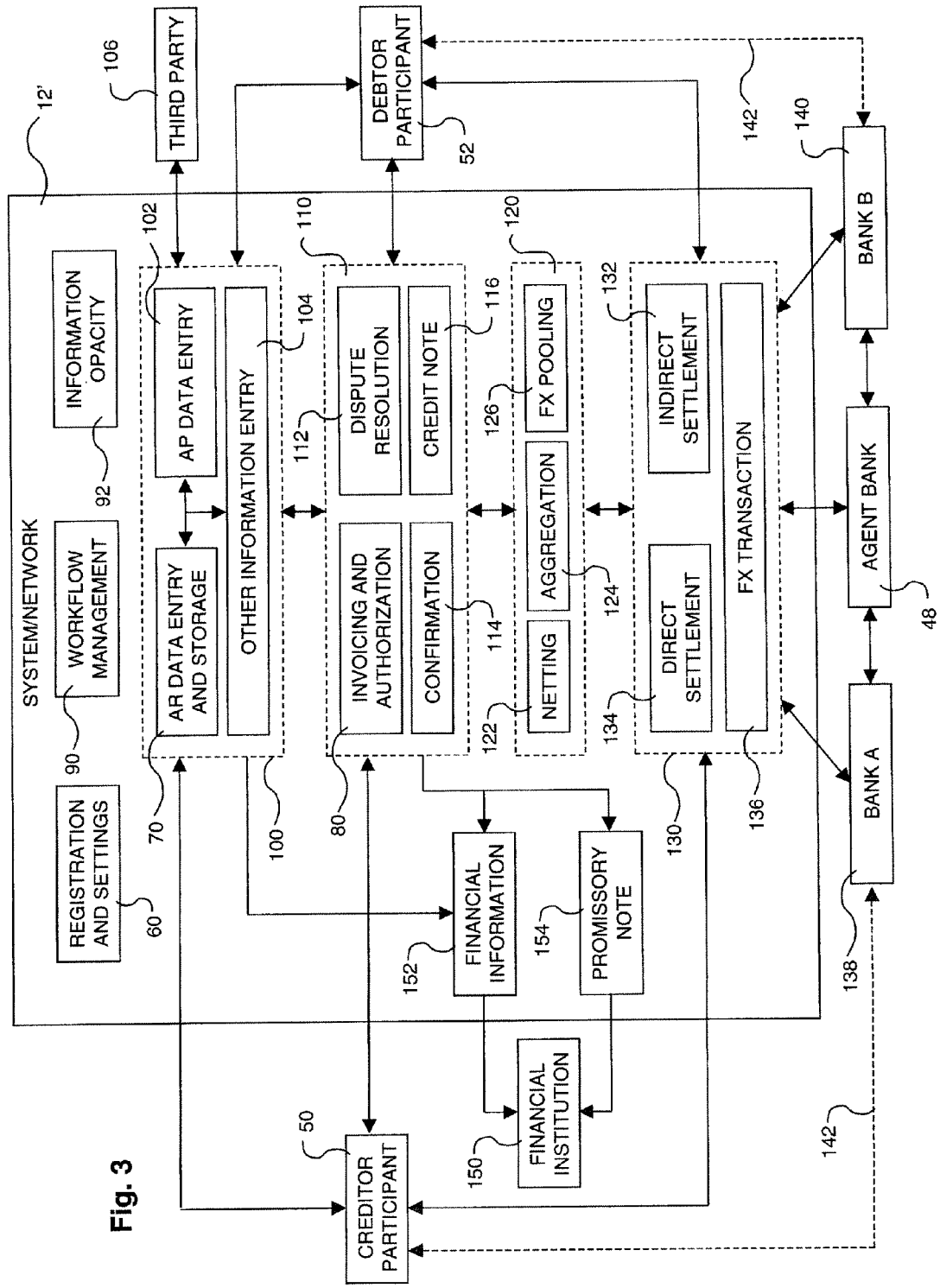
FIG. 3 is a block diagram showing an alternate embodiment of the present invention.

Alternate preferred configurations of the accounts receivable and accounts payable system of the present invention are depicted in FIG. 3. Alternate embodiment 12' comprises a registration and settings system 60, a workflow management means 90, and an information opacity means 92. The workflow management means 90 allows a participant to institute customized workflow management strategies that incorporate role-based financial and managerial controls that automatically allocate certain types of work (e.g., invoice review, approval, authorization, confirmation, etc.) to particular users or a group of users, and allows the participant to permit the system to automatically perform user tasks based on participant-defined criteria. The information opacity means 92 allows a participant to implement data privacy protocols that will selectively prevent other system participants from accessing and viewing specific financial data of the participant stored in the electronic data storage means.

The accounts receivable and accounts payable system 12' comprises a wider range of information entry through alternate configurations. The information entry system 100 comprises an accounts receivable data entry and storage system 70; an accounts payable data entry means 102, and other information data entry means 104 for entering other information related to the participants and their transactions into the electronic storage means 74.

The accounts receivable and accounts payable system 12' further comprises an invoicing, authorization, confirmation, dispute resolution and credit note system 110. The invoicing, authorization, confirmation, dispute resolution and credit note system 110 comprises invoicing and authorization system 80 of the preferred embodiment, invoice confirmation means 114, a dispute resolution means 112, and a credit note creation means 116. The dispute resolution means 112 includes an electronic invoice rejection process initiated by the debtor participant and an electronic invoice amendment proposal process initiated by the creditor participant.

The electronic invoice rejection and amendment processes allow the debtor participant to record and present the rejection of an electronic invoice and to propose a new payment amount, payment date, currency, or other changes to information reflected in the rejected invoice. The rejection means may be implemented in many ways. For example, preferably it may be implemented as a check-off box that appears on the electronic invoice itself when displayed on a web page; it may be reflected in an electronic record stored in the electronic data storage means 74; it may be electronically transmitted to the ERP system of the creditor participant; or it may comprise an e-mail transmitted to the creditor participant via the Internet. The amendment proposal means allows the creditor participant to propose different terms than those reflected in the electronic invoice previously presented by the creditor participant. For example, using the electronic invoice amendment proposal process, a creditor participant may propose a new payment amount, date, or currency.

The alternate accounts receivable and accounts payable system of FIG. 3 also includes a netting, aggregation and foreign exchange pooling system 120. The aggregation, netting and foreign exchange pooling system 120 further comprises an aggregation means 124, a netting means 122 and a foreign exchange pooling means 126. The aggregation means and netting means provide real-time data on expected incoming and outgoing cash flows by value date and currency that is useful for both cash flow forecasting and debt settlement process. Aggregation means 124 calculates for each participant the total gross amount expected to be paid on a given value date and the total gross amount expected to pay out on a given value date. For example, the aggregation means 124 aggregates for each creditor participant all the accounts receivable for a given currency and value date into a single received payment, and aggregates for each debtor participant accounts payable for a given currency and value date into a single payment. The aggregation means 124 can perform aggregation based on various characteristics of the financial information to be aggregated. For example, the aggregation means 124 can specify that only authorized invoices be aggregated, or that aggregation should exclude confirmed invoices that have been converted into electronic promissory notes. Thus, the aggregate information can be used by a participant for forecasting purposes to view gross cash flows for each value date, or cash flow information segregated by characteristics of the underlying debts. The aggregate information can also be used to advise a debtor participant of the payments that must be made for a given value date and currency.

The netting means 122 may operate independently or in conjunction with the aggregation means, and may be implemented on bilateral basis, multilateral basis, or both. Bilateral netting nets amounts owed to one another between two participants, while multilateral netting nets amounts owed to one another between a plurality of participants. Bilateral netting nets, for a participant the amounts owed to another participant by the amounts owed by that other participant for a given value date and currency. Multilateral netting nets, for a participant, the amounts owed to all of the other participants of the multilateral netting group by amounts owed by all the participants of the group to that participant for a given value date and currency. For example, if a participant owes $1,000 to a counterparty participant and the counterparty participant owes $600 to the first participant, bilateral netting would net the debts so that the first participant owes a net amount of $400 to the counterparty participant. The netted amounts are aggregated along with non-netted amounts by the aggregation means 124 to facilitate cash flow forecasting and debt settlement process.

The foreign exchange pooling means 126 allows the accounts receivable and accounts payable system 12' to determine the foreign exchange transactions needed by the system for each currency pair and value date. The foreign exchange pooling means 126 calculates and monitors risks to the system associated with volatility and relative price movements in the foreign exchange market.

The accounts receivable and accounts payable system 12' also includes a settlement system 130 for facilitating and monitoring settlement of debt obligations. The settlement system 130 comprises foreign exchange transaction means 136 and accommodates both indirect settlement method 132 and direct settlement method 134. Both auto-debit and manual-debit payment mechanisms are also supported by both direct and indirect settlement methods. For example, the debtor participant 52 would be advised by either settlement methods a predetermined number of days before the payment is due that a payment should be made to a creditor participant 50. The debtor participant 52 could settle this debt either through the indirect settlement method 132 or the direct settlement method 134. In the case of the indirect settlement method 132, the debtor participant 52 would authorize its bank 140 to make payment into the trust account of an agent bank 48. In the case of the direct settlement method 134, the debtor participant 52 would authorize its bank 140 to pay the amount due into an account of the creditor participant 50 at the creditor participant's bank 138. Furthermore, the debtor participant 52 could have permitted auto-debit, in which case the settlement system 130 would initiate the payment transfer from the debtor participant's bank 140. Finally, the foreign exchange transaction means 136 allows participants to execute foreign exchange transactions for cross-currency debt obligations and for generally hedging against volatility and relative price movement risks in the currency markets. The foreign exchange transaction means 136 also executes foreign exchange transactions based on needs determined by the foreign exchange pooling means 126.

The settlement system 130 includes various settlement notification and presentment processes for advising the participants of the progress of settlement. The system also includes payment exception processing means for resolution of the payment failures and exceptions.

The accounts receivable and accounts payable system 12' also includes an electronic promissory note designation means 154. The electronic promissory designation means 154 allows a creditor participant to designate as an electronic promissory note confirmed electronic invoices. These electronic promissory notes may then be discounted to other participants or third parties, or otherwise financed in order to provide a new source for working capital. For example, the system 12' allows authorized financial institutions 150 to view electronic promissory notes to be used for discounting or other financing transactions. Additionally, accounts receivable and accounts payable tracked by the system 12' may be used to obtain better lending rates. For example, the system 12' also allows creditor participants and debtor participants to authorize financial institutions 150 to view financial information 152 stored in the data storage means 74, in order to make lending decisions based on cash flows associated with accounts receivable and accounts payable.

The present system allows a system participant to download its financial information from the system, thereby allowing the system participant to incorporate the information into its own accounts payable system or accounts payable system. Furthermore, the downloaded information may be used for review of the financial information away from the system, allowing each participant to perform certain tasks offline or in a different system, such as reconciliation or performing cash flow analysis. Also, the participant may indicate that the status of specific invoices (e.g., approved status, authorized status, etc.) be changed by adjusting certain data fields on the downloaded information. This adjusted information may then be uploaded to the system where appropriate updates are made by the system to individual records.

B. Contracting with the System

The accounts receivable and accounts payable system of the present invention is intended to capitalize on recent innovations in the legal framework covering commercial transactions, particularly legislation governing electronic transactions. This is accomplished by requiring participants in the system to agree to a series of contracts and procedures that are designed to take full advantage of the most developed legislative framework for electronic commerce currently available. For example, one such developed legislative framework is the UETA ("Uniform Electronic Transactions Act") as in effect in the State of Pennsylvania.

In a preferred embodiment, the system requires that system participants (i) agree to be governed by a rulebook, which is a multilateral contract to which all participants are parties, setting forth the rights and obligations of each such party and, broadly, the procedures for operation of the system, (ii) execute a membership application and agreement, between a new participant and the entity responsible for administering the system (acting on its own behalf and on behalf of all present and future participants) by which the new participant joins the system and agrees to become a party to the system rulebook and related documents, and (iii) abide by a detailed operating manual, which sets forth detailed instructions on proper use of the accounts receivable and accounts payable system.

In preferred embodiments the system can be implemented either as a closed system or as an open system. A "closed system" is one in which all (both creditors and debtors) are required to become participants and thereby to agree to be bound by the terms of the rulebook. Conversely, an "open system" is one in which some of the users (either creditors or debtors) may utilize or benefit from the system without being required to become participants and not having agreed to be bound by the terms of the rulebook.

Figure 4:
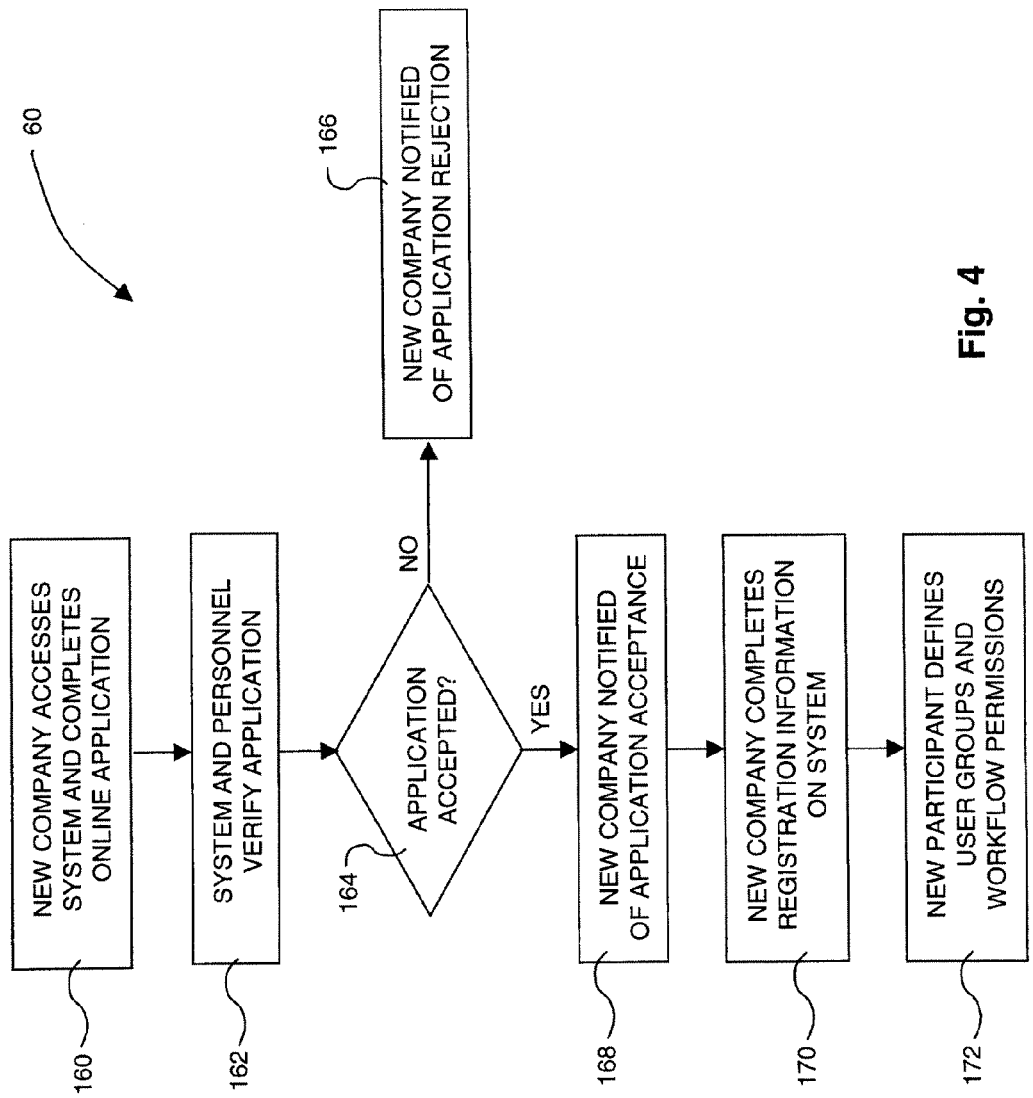
FIG. 4 is a flowchart of a process for participant registration and initial participant settings of the present invention.

The process for registration and settings system 60 is depicted in FIG. 4. Preferably, a prospective participant accesses the website of the accounts receivable and accounts payable system 12 or 12' of the present invention to access and complete the system participant membership application and agreement at step 160. The system can support electronic signatures when allowable by law, but the system may still require a paper-based and manually-signed membership application and agreement in jurisdictions where formalities of a written and signed document to create a binding contract is required.

Preferably, the application portion of the membership application and agreement requires prospective participants to provide information needed by the administrators of the accounts receivable and accounts payable system of the present invention to properly evaluate the applicant. For example, the applicant must show proof of corporate existence. Some of the basic information that would be required may include the company name, address, contact information, jurisdiction of incorporation, the names of its officers and directors, company history, credit information and proof of a valid bank account. The system may also require additional supporting documentation addressing commercial and financial issues. In further embodiments, the membership application process can be significantly streamlined.

Once the application and membership agreement is completed at step 160, the system and personnel then review the application at step 162. The reviewers of the participant application then make a decision at step 164 to accept or to reject the applicant. If the applicant is rejected, the accounts receivable and accounts payable system issues a notification at step 166. If the applicant is accepted, the system issues a notification and a startup package to the applicant as shown at step 168. The reviewers of the participant application evidence acceptance of the participant as a member and user of the system through the use of electronic signatures or by countersigning copies of the membership application and agreement, which in turn is received by the applicant.

After acceptance, the new system participant completes the registration process at step 170 by selecting various participant and administrator settings such as invoice templates, default terms, and address book. After the participant completes this step, the participant gains access and begins using the system. Finally, the new system participant can also institute and customize workflow management strategies at step 172 to allocate tasks and responsibilities such as invoice creation, approval, authorization, confirmation and settlement.

C. Invoice Template Creation, Data Entry and Storage

The accounts receivable and accounts payable system of the present invention provides means for specifying and customizing invoice and credit note templates for use by the system participants. The invoice creation means 82 allows a system participant to create a library of invoice and credit note templates by choosing existing industry-standard templates or creating new customized templates. This is preferably done through a GUI, an example of which is shown in FIG. 5.

Figure 5:
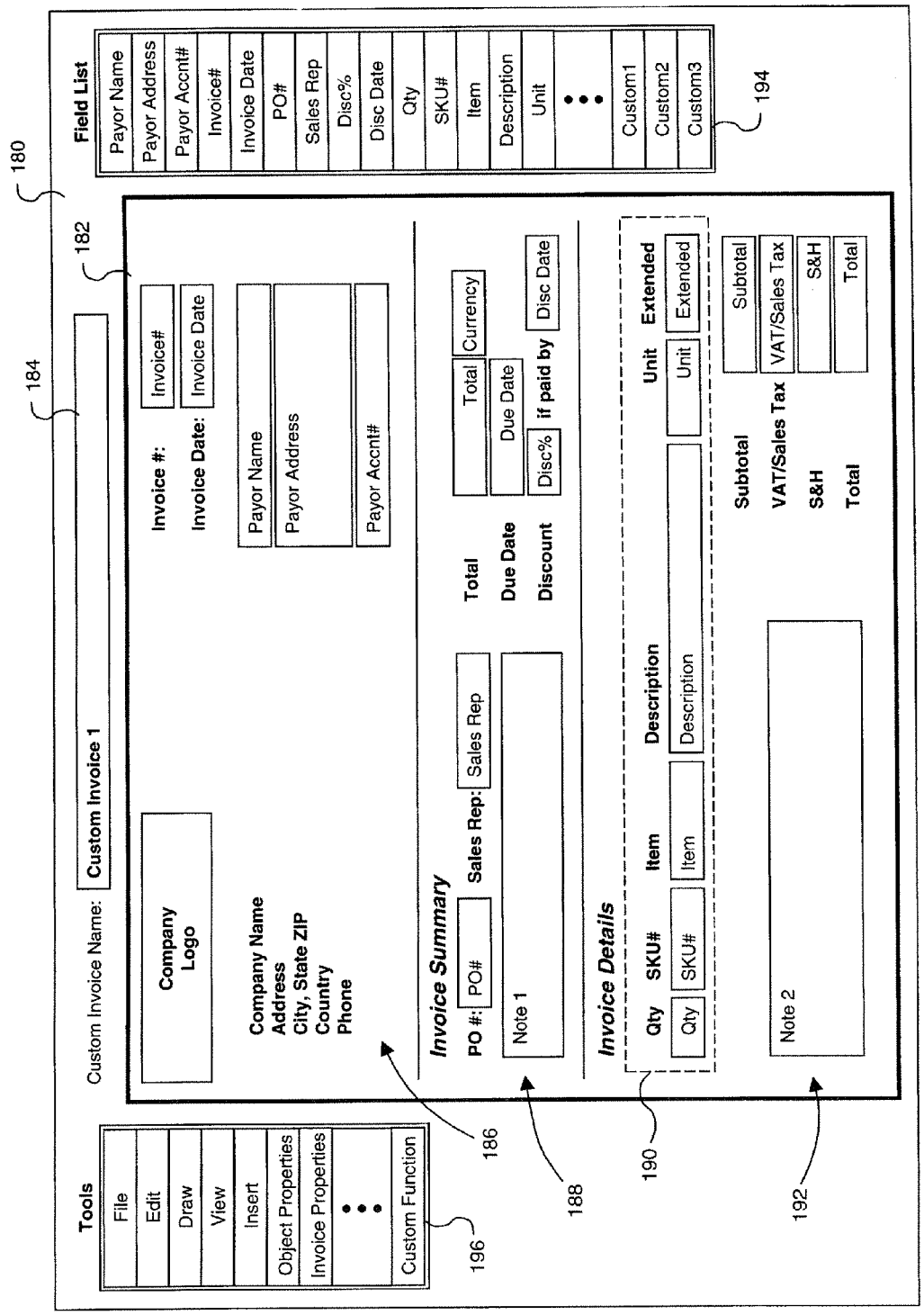
FIG. 5 depicts an user interface screen for creating customized invoice and credit note templates according to the present invention.

FIG. 5 shows a GUI illustrating one of many different views for customizing an invoice template. The display screen 180 includes areas for the template 182, name of the template 184 being customized, tools 196 for customizing the template and field list 194 for choosing data fields to include in the template. The system participant customizes templates using various tools 196 commonly used for performing graphic design (e.g., drawing lines and boxes, importing graphics, zooming in and out, etc.). The system may provide graphic design functionality through incorporating and customizing any of the many conventional graphic design software packages (e.g., Adobe Illustrator, Visio, etc.) or through a new program designed specifically for providing the graphic design functionality. The field list contains the list of available data fields to include on the template, including required elements such as debtor name, due date and amount. The invoice creation means 82 also allows the participant to define custom fields to include in the template.

The template 182 typically contains several major sections; creditor and debtor information section 186, summary section 188, detail section 190, and other information section 192. The creditor and debtor information section 186 would include such information as address of the creditor and debtor, including any custom graphics such as logo design. The summary section 188 would include such information as total due, due date, terms, invoice number and invoice date. Also, the electronic invoice may have a box indicating whether the invoice is eligible for bilateral or multilateral netting. Detail section 190 would include detail information such as the line item detail including the quantity, description, and unit amounts. The detail section 190 would be a special section that has the property of expanding or shrinking in size according to the amount of information included in the invoice. Finally, the other information section 192 would include information such as address change notices, or possibly marketing/advertising information. Overall, the design of the template is flexible to accommodate virtually any design, including combining debtor and creditor information 168 with summary section 188.

Once the template is completed, the system participant names and saves the template in the data storage means 74 along with other templates created by the participant, from which specific templates can be accessed and used to create invoices or credit notes.

The accounts receivable and accounts payable system of the present invention provides means for entering and storing accounts receivable, accounts payable, and other information related to the participants. This information stored in the electronic storage means 74 is used to populate invoice and credit note templates for presentment as electronic invoices or credit notes to specific participants.

Figure 6:
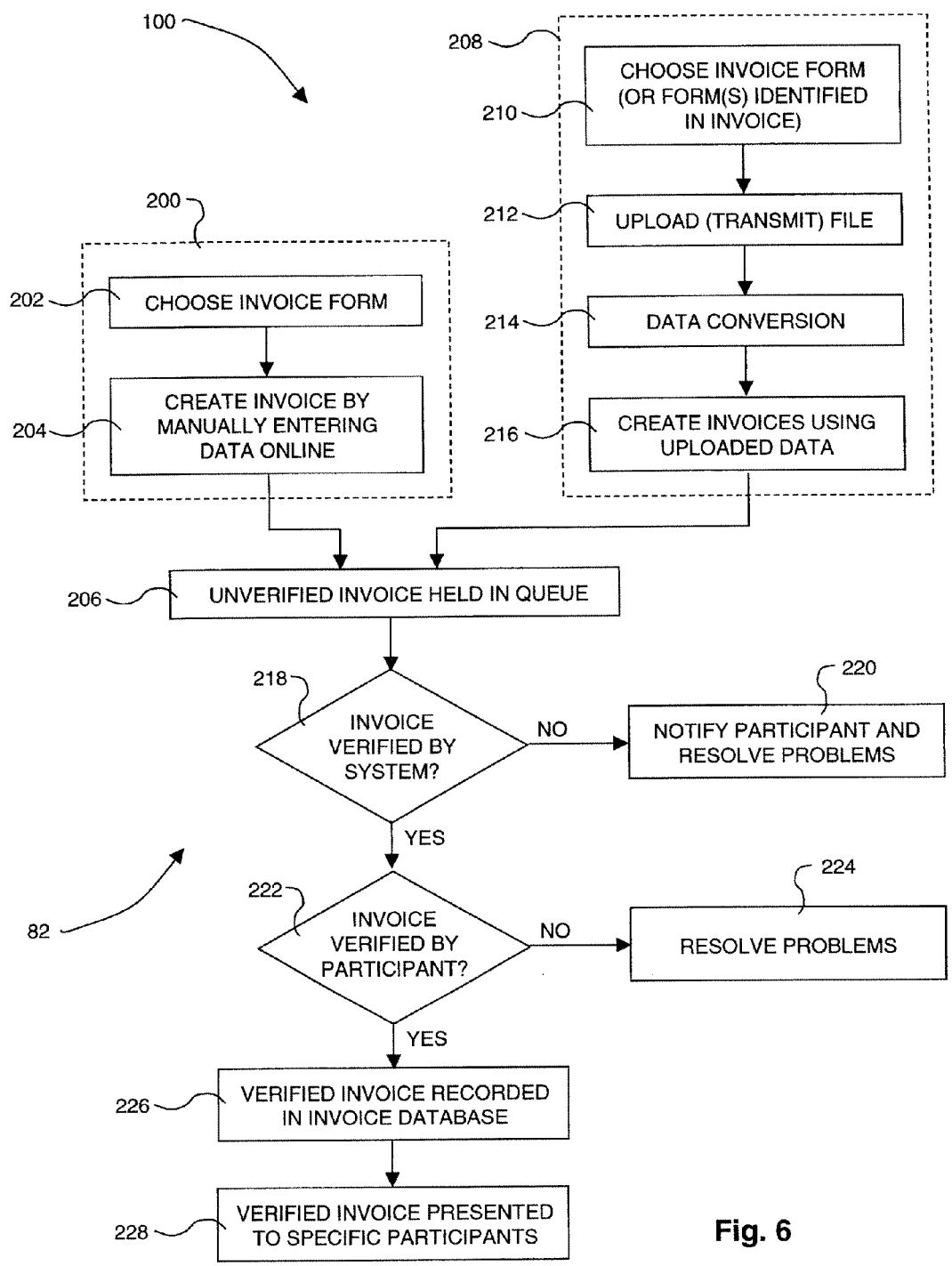
FIG. 6 is a flowchart of a process for data entry and invoice and credit note creation of the present invention.

A participant creates electronic invoices using the information system 100 and invoice creation means 82 of the accounts receivable and accounts payable system, as shown in FIG. 6. The data to be used for creating invoices or credit notes can be entered manually on the system or transmitted automatically through upload through external adaptors, the Internet, or other electronic communications networks such as wireless networks or VPNs. Manual data entry process 200 preferably comprises a GUI through an Internet connection to allow the system participant to select an invoice template at step 202 and enter data into the selected template at step 204. After the information is entered, the unverified invoice is held in a queue at step 206 for verification. Instead of manual data entry, preferably the system participant automatically uploads data to be used for invoice creation. Automatic data entry process 208 is accomplished either through electronic connection through external adaptors 42 of the current invention or through an Internet connection.

At step 210, the system participant specifies the template to use in creating the invoices or credit notes. This can be done through a GUI where the system participant specifies the template, or by including in the uploaded data the template identification to apply to the entire batch upload or individual invoice or credit note data in the upload. The system participant then uploads the data at step 212, after which the data is converted, if needed, at step 214. At step 216, the uploaded information is used to create invoices or credit notes by automatically populating the specified templates, after which they are held in a queue at step 206. Alternately, the financial information for creating invoices and credit notes can be transmitted by a third party on behalf of the system participant. A system participant may also enter information through a GUI using a wireless device over a wireless network. For example, the system participant may enter information for creating an invoice through a GUI on a wireless device while at a construction site that has no access to the Internet.

The unverified invoices and credit notes are held in a queue at step 206 until verified by the system, the creditor participant, or both. The system verifies whether each newly created invoice or credit note complies with data formats and other requirement (e.g., no text allowed in the amount field, name of debtor required, etc.), as shown at step 218. If the invoice does not meet verification standards, the system participant is notified at step 220, and preferably the system identifies, suggests and provides ways the deficiencies may be corrected. Alternatively, if the electronic invoice complies with the requirements, the system verified invoice is then verified by the creditor participant for information correctness or any other characteristics, as shown at step 222. If the invoice does not meet creditor participant standards and preferences, the system preferably provides ways to correct or adjust the electronic invoice, or to simply reject the invoice altogether, as shown at step 224.

After the electronic invoices and credit notes are verified, they are entered and stored in the electronic invoice database, as shown at step 226. Once entered, an electronic invoice can then be presented or submitted to the specific participant identified as the debtor on the electronic invoice for review using the electronic invoice presentment means, as shown at step 228. In addition to presentment through the Internet, a system participant may present invoices and interact with the system through a GUI using a wireless device over a wireless network. For example, a participant may access information and functions on the system through a GUI on a wireless device while at a construction site that has no access to the Internet.

D. Presentment, Approval, Authorization, Confirmation and Dispute Resolution

The common data storage capability and commonality of the accounts receivable and accounts payable system allows both parties to a transaction (or one system participant and one system non-participant) to store on the system information concerning debt obligations arising from the transaction. The creditor participant stores the transaction information as an accounts receivable item, and the debtor participant stores the transaction information as an accounts payable item. This allows for the creditor participant and debtor participant to share a common view of the debt obligation, and to significantly reduce the cost of invoicing, reconciliation, dispute resolution, and settlement. This also allows for enhanced financial clarity for use in obtaining better lending rates or other financing transactions. Preferably, each time the participant accesses the system, the accounts receivable and accounts payable system 12 or 12' of the present invention will generate for the participant a list of all accounts payable electronic invoices and credit notes (if the participant is accessing its accounts payable information), or all accounts receivable electronic invoices and credit notes (if the participant is accessing its accounts receivable information).

Figure 7:
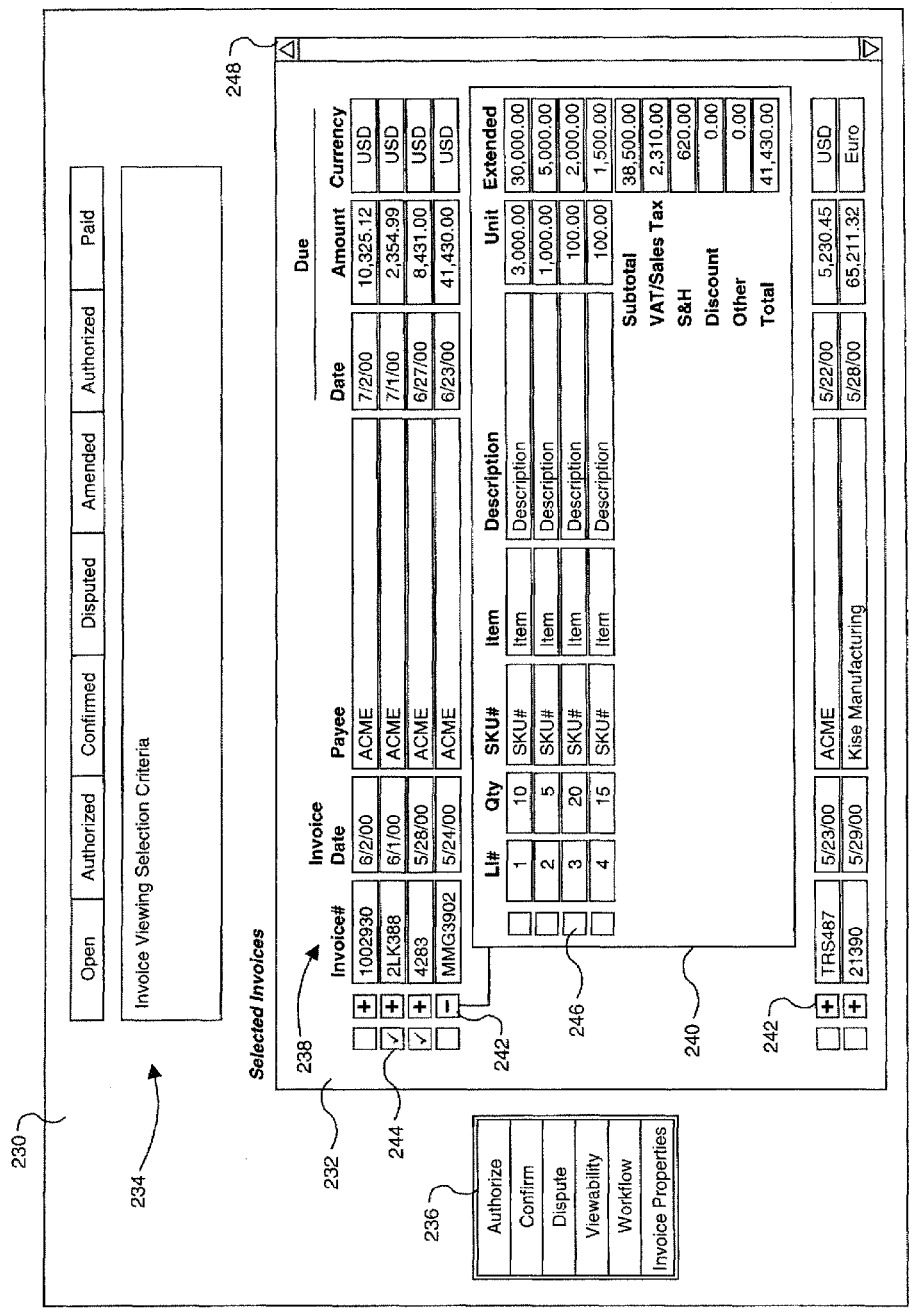
FIG. 7 depicts an user interface screen for invoice and credit note presentment and review according to the present invention.

FIG. 7 shows a GUI illustrating one of many different views a participant may have in reviewing accounts receivable and accounts payable information. The GUI may be presented on a web client over the Internet, on a wireless device over a wireless network, or any other graphical display device on an electronic communication network. A display screen 230 depicts a selection criteria 234 for invoices and credit notes to be viewed, a list of invoices and credit notes 232 meeting the specified selection criteria, and a commands list 236 to perform tasks such as confirmation. The selection criteria 234 allows invoices to be grouped or sorted by various status of invoices (e.g., open, authorized, confirmed, disputed, amended, paid, etc.) and further by other characteristics of invoices (e.g., value date, currency, amount, creditor name, etc.). The list of invoices and credit notes 232 meeting the selection criteria is made available for the participant to review. The participant may review the electronic invoices at a high level, where the invoices are grouped according to the participant-specified criteria, or the participant may review invoices in detail (e.g., at the level of individual line items on the invoices). The list of invoices and credit notes 232 has an invoice-level view 238 that lists each invoice as a one-line record. The participant can review each invoice in more detail by selecting the detail button 242, which toggles the particular record between invoice-level view 238 and line item-level view 240. The line item-level view 240 shows line item details of the invoice, including taxes and other amounts comprising the total invoice amount. If the list of invoices and credit notes 238 or line items 240 is longer than the screen will allow, a scroll bar 248 or similar means can be used to review the list.

The commands list 236 allows participants to perform certain tasks with particular invoices. Invoice selection boxes 244 and line item selection boxes 246 allow the participant to select individual invoices or line items to which the particular command is applied. Preferably, there will also be features to select and deselect all invoices, or to select a block of invoices without having to individually select each record. The commands list 236 allows a participant to perform tasks on the invoices and credit notes. In viewing accounts payable information, the participant may authorize invoices to signify agreement to the debt amounts reflected in the invoices, confirm invoices to signify that the debt reflected in the invoice has become an independent payment obligation, reject invoices thereby initiating a dispute resolution process, enter the dispute resolution process to deal with invoices under dispute, or simply perform no action at that particular time. In viewing accounts receivable information, the participant may amend previously presented invoices which initiate the dispute resolution process, enter dispute resolution process to deal with invoices under dispute, or simply perform no action at that particular time. Information regarding actions performed by the participant is recorded or used by the system to initiate certain actions. For example, the debtor participant confirming an invoice by selecting the confirmation button in the commands list 236 initiates the process of updating the electronic invoice information stored on the system to reflect that the debt reflected in the electronic invoice has become an independent payment obligation due on a date certain and free of defenses to the underlying contract. After confirmation, the participant may designate a confirmed invoice as an electronic promissory note.

Figure 8:
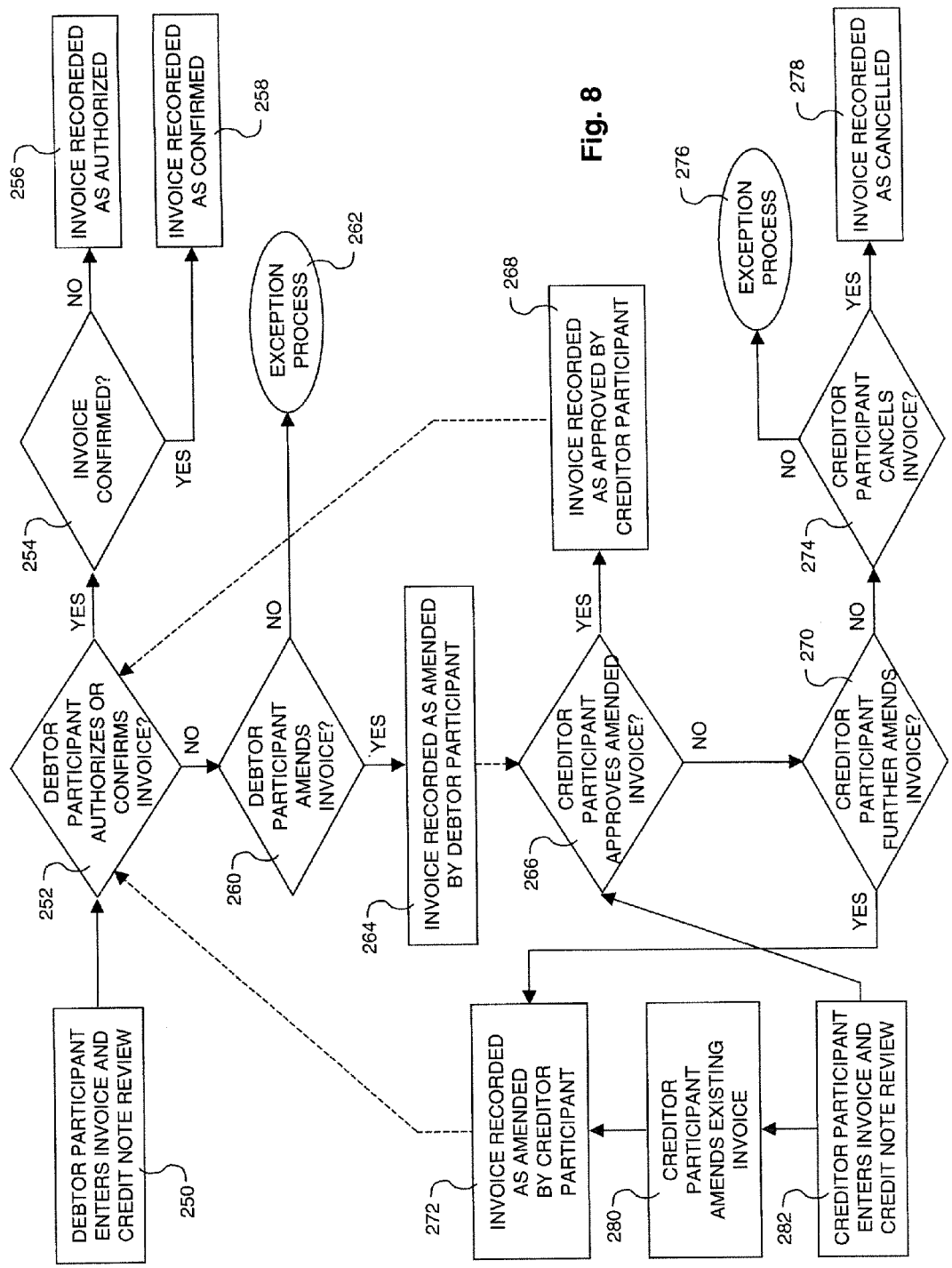
FIG. 8 is a flowchart of a process for invoice and credit note authorization, confirmation and dispute resolution of the present invention.

The steps performed by the invoice authorization means, invoice confirmation means and the dispute resolution means are generally shown in FIG. 8. The participant accesses the system website to review the list of electronic invoices and credit notes, either as a debtor participant or creditor participant. As a debtor participant, the accounts payable information is made available for review, as shown at step 250. At step 252, the debtor participant may authorize an invoice, confirm an invoice, amend an invoice, reject an invoice, or simply perform no action at that particular time. If the debtor participant decides to authorize or confirm an invoice, the system determines if the invoice is authorized or confirmed at step 254 and accordingly records the invoice as authorized at step 256 or as confirmed at step 258.

In alternate embodiments an approval means may be implemented. The approval means allows a debtor participant to designate that an invoice has been reviewed and has been found either (1) to be accurate when reconciled with the debtor participant's own records, or (2) will be accepted as accurate by the debtor participant. The approval feature can be implemented as a step prior to authorization, or may occur concurrently with authorization. The approval feature can be implemented with a selective designation means that allows a system participant to designate particular electronic invoices in various ways. For example, a debtor participant can use the selective designation means to indicate that a particular invoice has been approved, or a creditor participant can use the selective designation means to indicate that a particular invoice has been reconciled with respects to payments received for the particular invoice.

If the debtor participant chooses to contest an invoice, then the debtor participant uses the electronic rejection means to reject the invoice at step 260, and the invoice goes through an exception process 262 to resolve any outstanding issues. This exception may involve the system, or it may be resolved offline between the two parties. It is possible to have the system issue notifications through such means as email to advise the concerned parties of such rejections. Alternately, the debtor participant may decide to amend the invoice at step 260, and the amended invoice is recorded in the data storage means 74 at step 264. The amended invoice may include proposed changes by the debtor participant, such as a new payment amount or payment date. At a later time, the creditor participant enters the invoice and credit note review at step 282 and reviews the invoice amended by the debtor participant at step 266. If the proposed amendments to the invoice are acceptable, the creditor participant indicates that the amended invoice is accepted, and the amended invoice is recorded as accepted at step 268. The amended and accepted invoice can then be authorized or confirmed as before by the debtor participant at step 252, signifying that the parties have reached an agreement on an initially rejected invoice.

The rejection and amendment processes can be implemented in similar ways to the original invoicing process, e.g., through a GUI accessed over the Internet, a wireless network, or other electronic communication networks.

Alternately, the creditor participant may find the proposed amendments by the debtor participant unacceptable at step 266, in which case the creditor participant may further amend the amended invoice to propose another set of changes, reinstate the original invoice, or cancel the invoice. If the creditor participant decides to further amend the invoice, the invoice is recorded as amended by the creditor participant at step 272 and is made available to the debtor participant for review at step 252. The amended invoice by the creditor participant may be authorized, confirmed, rejected or further amended by the debtor participant. If the creditor participant decides to cancel the invoice at step 274, the invoice is recorded as canceled by the creditor participant at step 278. If the creditor participant does nothing, then either the invoice is paid by the debtor participant as proposed, or the invoice enters exception process 278.

The creditor participant may also decide to amend an existing invoice at step 280. The invoice is recorded as amended by the creditor participant at step 272 and is made available to the debtor participant for review at step 252. The invoice amended by the creditor participant may be authorized, confirmed, rejected or further amended by the debtor participant.

Finally, all the steps set forth previously may be repeated either until an agreement is reached between the participants, or the participants give up and use other means such as the exception process to resolve their dispute, or debtor participant unilaterally authorize payment of the amount believed by the debtor participant to be correct.

In some jurisdictions, VAT administrative requirements or commercial custom provide for the issuance of credit notes, rather than the amendment of rejected invoices. The accounts receivable and accounts payable system of the present invention will accommodate such practice, providing standard messages for creation of a credit note from one participant to another. In such circumstances, authorization or confirmation by the debtor participant would involve simultaneous authorization or confirmation of the original invoice and the related credit note.

Figure 9B:
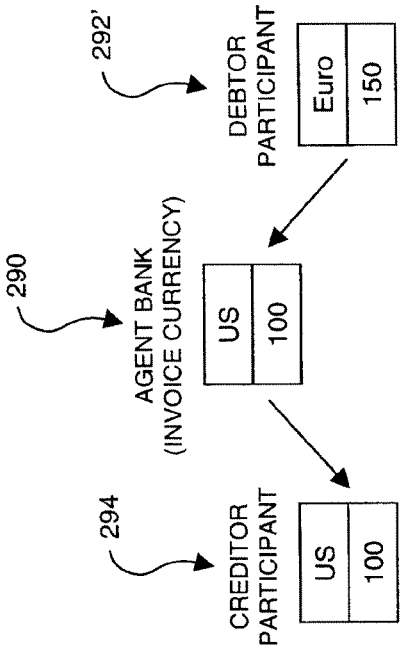
FIGS. 9A–D illustrate multi-currency functions through sample configurations of debtor, creditor and invoice currencies for invoices and credit notes according to the present invention.
Figure 9D:
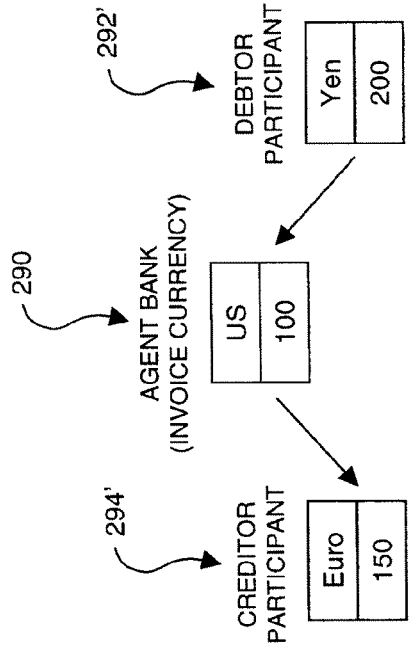
Figure 9A:
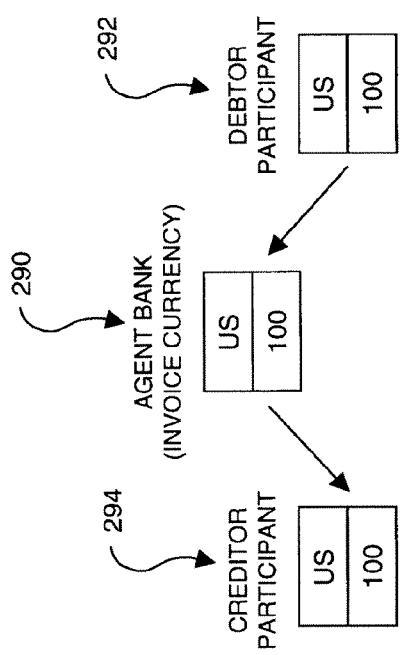
Figure 9C:
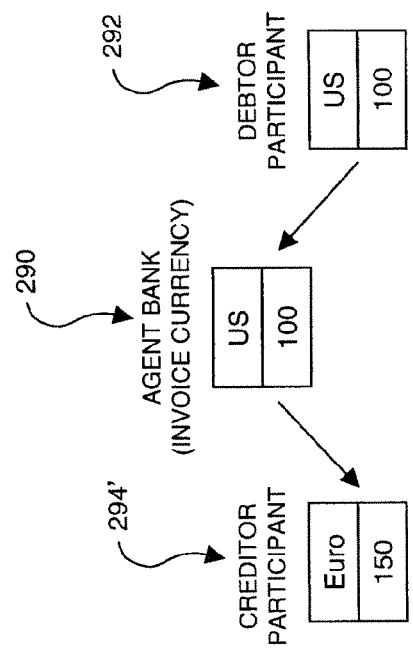

The participants may wish to submit or receive payment for a given invoice in a currency different from the currency indicated on the invoice. The accounts receivable and accounts payable system of the current invention comprises a payment issuance currency designation means that allows a debtor participant to specify a desired currency for a payment to be issued by the debtor participant, and a payment receipt currency designation means that allows a creditor participant to specify a desired currency for a payment to be received by the creditor participant, both irrespective of the currency indicated on the invoice. The specified currency can be changed until the settlement determination means calculates for a given value date final payment amounts in specific currencies that debtor participants must submit and expected payment amounts in specific currencies that creditor participants receive. This is accomplished by allowing the participant to select an invoice while reviewing the invoices on the system. The system then allows the participant to change on the selected invoice the currency in which to issue payment or receive as payment by selecting the appropriate feature or button on the GUI. The GUI would then allow the participant to select the new currency from the list of available currencies. FIG. 9A to FIG. 9D shows four different modes of currency specification using example currencies and exchange rates (while $US, Euro and Yen are used for these examples, actual currencies on the system can be any currency). FIG. 9A depicts the situation where both the creditor participant and debtor participant specify the same currency 292 and 294 as the invoice currency 290. FIG. 9B depicts the situation where the debtor participant has specified a different currency 292' from the invoice currency 290, while the creditor participant has specified the same currency 294 as the invoice currency 290. FIG. 9C depicts the situation where the creditor participant has specified a different currency 294' from the invoice currency 290, while the debtor participant has specified the same currency 292 as the invoice currency 290. FIG. 9D depicts the situation where both the creditor participant and debtor participant specify different currencies 292' and 294' from the invoice currency 290. The system facilitates all these modes of transactions for purposes of cash flow forecasting and settlement of debt obligations.

E. Invoice Aggregation and Netting

The present invention facilitates efficient forecasting of cash flow requirements for participants (e.g., from a debtor participant's perspective, payments that need to be made in the future) by providing accounts receivable and accounts payable aggregation and netting features. The system provides participants with accurate real-time information regarding expected future incoming and outgoing cash flows, including aggregate and netted accounts receivable and accounts payable information as well as the details comprising such information. The aggregation and netting features can be used both for informational purposes (i.e., to calculate gross or net incoming or outgoing cash flows) or for payment purposes (i.e., to calculate a payment to be made). When a new invoice or credit note is entered into the system, or an existing invoice or credit note is updated, this new information is immediately incorporated and reflected in the cash flow information provided to the participants. This allows the participant to have real-time information for use in financial management (e.g., the timing and amount of payments to be made).

Aggregation serves to reduce the number of payments submitted or received by the participants for settling debt obligations. The aggregation feature aggregates accounts receivable and accounts payable for each value date and currency (or other system specified characteristics), to allow a debtor participant to know in real-time exactly what is owed all of its trading partners whose invoices are in the system, and to allow a creditor participant to know in real-time exactly what is owed by all of its trading partners who use the system. By aggregating all outstanding debt obligations for a given value date and currency, the aggregation means allows a debtor participant to settle all debt obligations for a given value date and currency using a single payment, and allows a creditor participant to receive a single payment for a given value date and currency.

Netting serves to reduce both the number and size of payments submitted or received by the participants in settling debt obligations. The netting feature nets accounts receivable and accounts payable for each value date and currency (or other system specified characteristics). The netting can be done either on a bilateral (between two trading partners), a multilateral (between a group of trading partners) basis, or both, between consenting participants on accounts receivable and accounts payable specified (all or subset) by the participants. Bilateral netting nets, for a participant, the amounts owed to another participant by the amounts owed by that participant for a given value date and currency. Multilateral netting nets, for a participant, the amounts owed to all of the other participants of the multilateral netting group by amounts owed by all the participants of the group to that participant for a given value date and currency.

Figure 10:
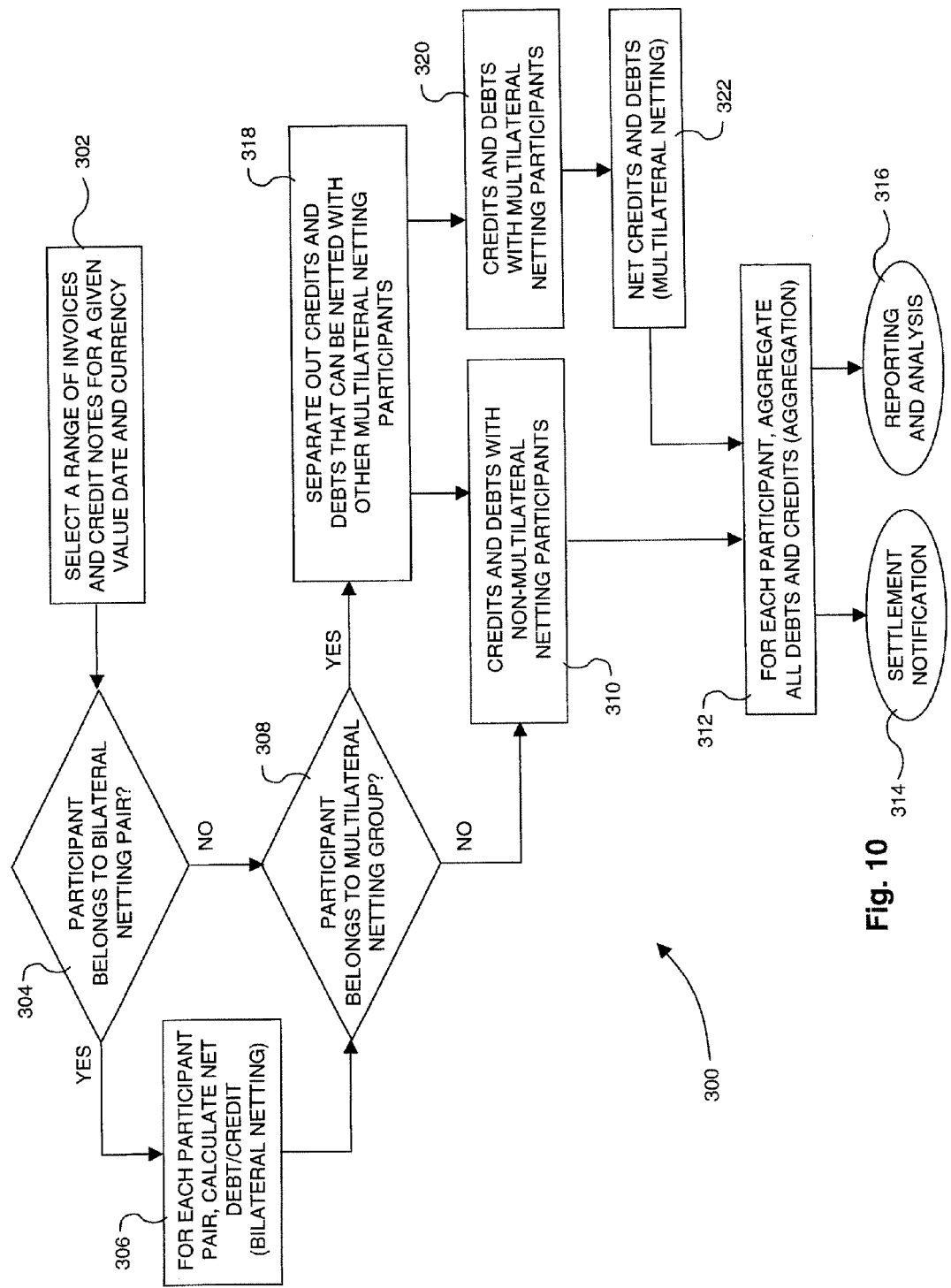
FIG. 10 is a flowchart of a process for aggregation and netting of the present invention.

The steps performed by the aggregation means and the netting means are depicted in FIG. 10 as the aggregation and netting process 300. At step 302, the system selects a range of invoices and credit notes for a given value date and currency from the electronic database. For participant aggregation and netting, the system typically selects authorized and confirmed invoices and credit notes for a given value date and currency specified on the invoice.

The system determines at step 304 whether a participant is a member of any bilateral netting pairs. If the participant belongs to a bilateral netting pair, the system at step 306 calculates, for each pair, the net debt or credit between the participant and that participant's counterparty for invoices and credit notes that are eligible for bilateral netting. If the participant does not belong to a bilateral netting group, or after bilateral netting of step 306, the system at step 308 determines whether the participant is a member of a multilateral netting group. If the participant belongs to a multilateral netting group, the system at step 318 separates out debts and credits that can be netted with other multilateral netting participants identified at step 320. At step 322, the multilateral debts and credits of step 320 are netted among all the participants of the multilateral netting group to determine net debts and credits for each participant of the multilateral netting group. At step 312, the multilaterally netted debts and credits of step 322 are aggregated together with non-multilaterally netted debts and credits of step 310 to determine aggregate netted debts and credits of the participant. The aggregation process aggregates all debts owed to creditors into a single payment to be issued for each currency, and aggregates all credits owed by debtors into a single payment to be received for each currency. The information regarding debts and credits of the participant is used for reporting and analysis process 316 (e.g., cash flow analysis for the participant), or used for settlement notification process 314 to notify participant of payment currency and amount due, where the resulting debts and credits for each value date and currency from the netting and aggregation process is set forth in a table ("final settlement table") for each participant.

F. Settlement

The present invention facilitates simplified and efficient settlement of accounts receivable and accounts payable. Instead of the present situation where a debtor must make a number of payments to each of his trading partners, a settlement method of the accounts receivable and accounts payable system of the present invention aggregates a number of outstanding debt obligations into a smaller number of payments (or into one payment), thereby significantly reducing the cost of settlement and improving the efficiency of the settlement process. The debtor participant settlement notification means automatically advises a debtor participant a predetermined number of days before payment is due of a payment in a given currency due to all trading partners whose invoices are in the system. In addition, the present invention also provides the useful function of advising the parties to settlement of the progress of settlement.

Preferred embodiments of the current invention can facilitate indirect or direct settlement of debt obligations, In the "indirect settlement method" of the present invention, the system administrators enter into an arrangement with a major money center bank (or series of money center banks) to act as payment agents ("agent bank") for the accounts receivable and accounts payable system. A trust account ("trust account") is established at the agent bank for receiving payments from debtor participants' banks and issuing payments to creditors' banks, for settlement of accounts payable amounts due in any currency on any value date as set forth in the final settlement table.

In the "direct settlement method" of the present invention, payments are issued and received directly between the participants' financial institutions, without an intermediary agent bank as in the indirect settlement method, for settlement of accounts payable amounts due in any currency on any value date as set forth in the final settlement table.

The system is also designed to accommodate both "auto-debit" and "manual-debit" mechanisms of settlement and to accommodate participants' relationships with their customary banks. Each participant can independently specify which of the two mechanisms to use for settlement. In the manual-debit mechanism, each debtor participant is responsible for instructing its customary bank to make payment to the trust account (for indirect settlement method) or to the creditor bank account (for direct settlement method) on the relevant value date. In the auto-debit mechanism (also known as "direct-debit"), the system as agent for a debtor participant is responsible for instructing the debtor participant's customary bank (pursuant to pre-arranged authorizations established at the time of such participant's initial membership) to make payment to the trust account (for indirect settlement method) or to the creditor bank account (for direct settlement method) on the relevant value date. For both manual-debit and auto-debit mechanisms, the indirect settlement method will have the system instruct the agent bank, following receipt by the agent bank of the relevant accounts payable amount from the participants, to pay to designated creditors from the trust accounts designated amounts (the accounts receivable amounts due to each creditor from the debtor participants whose payments have been received) on the value date. Also, the invoicing and settlement features of the present invention can be implemented in a system used by a single debtor for debt settlement purposes.

Figure 11:
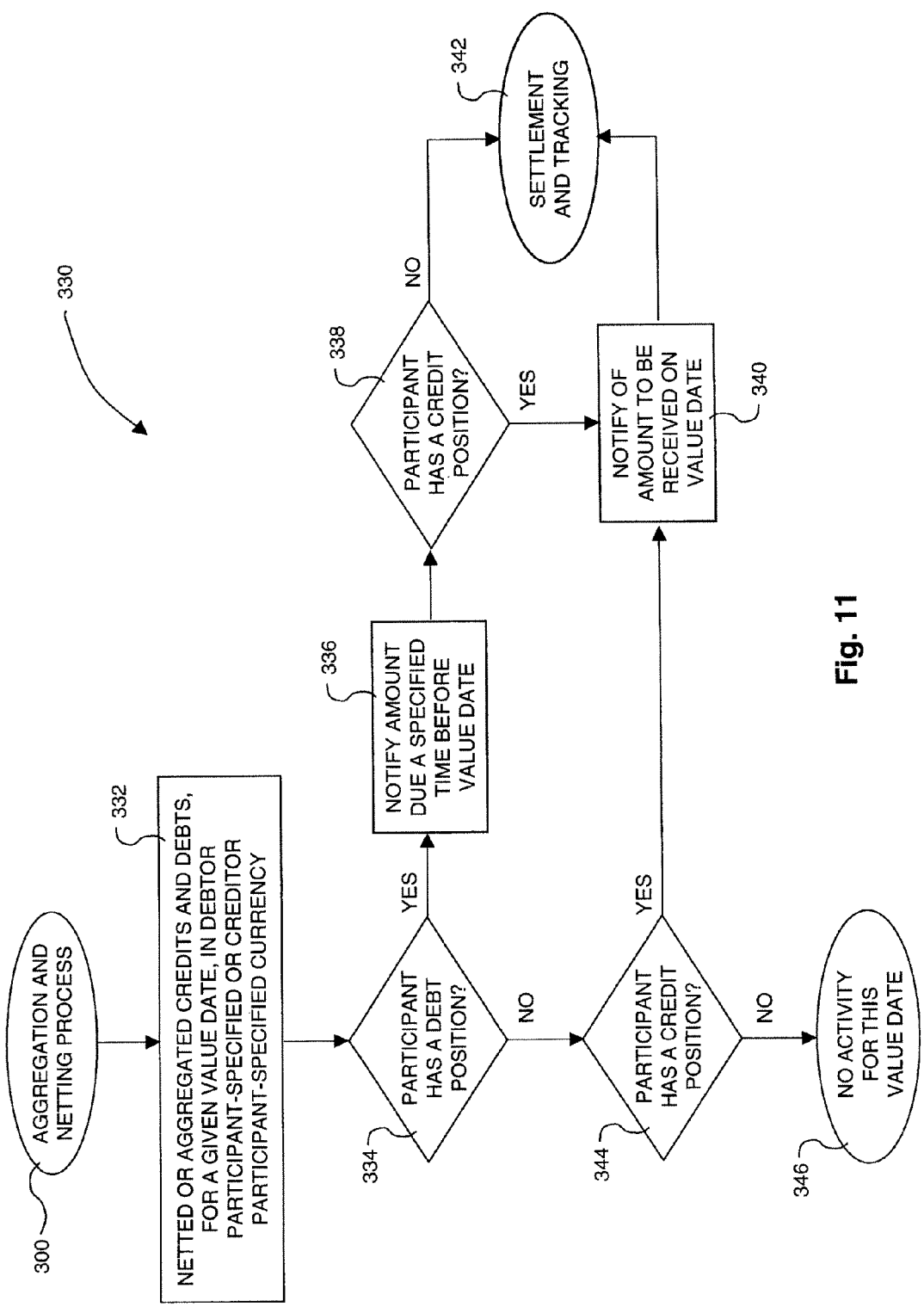
FIG. 11 is a flowchart of a process for settlement notification of the present invention.
Figure 12A:
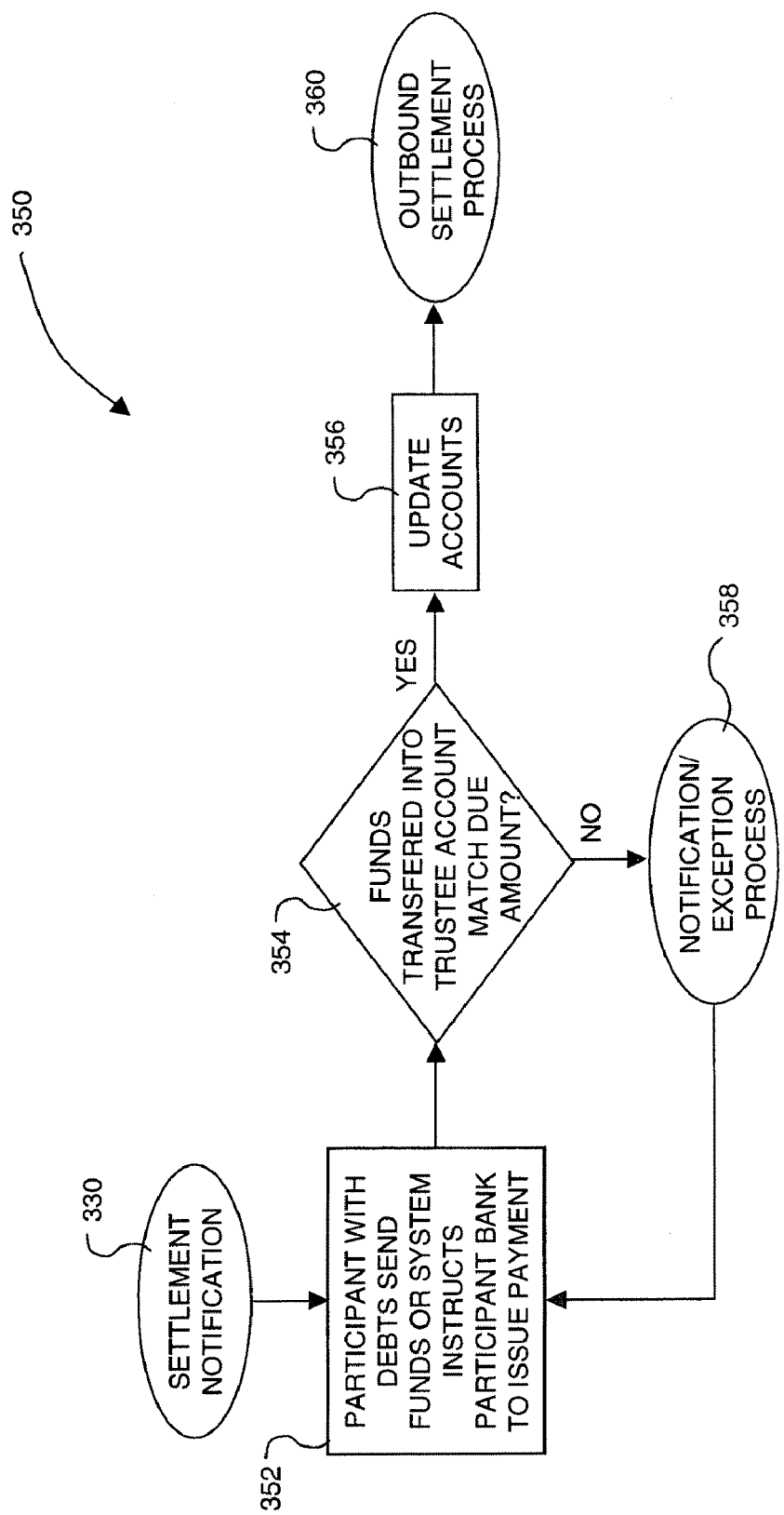
FIG. 12A is a flowchart of a process for inbound payments of the indirect settlement method of the present invention.
Figure 12B:
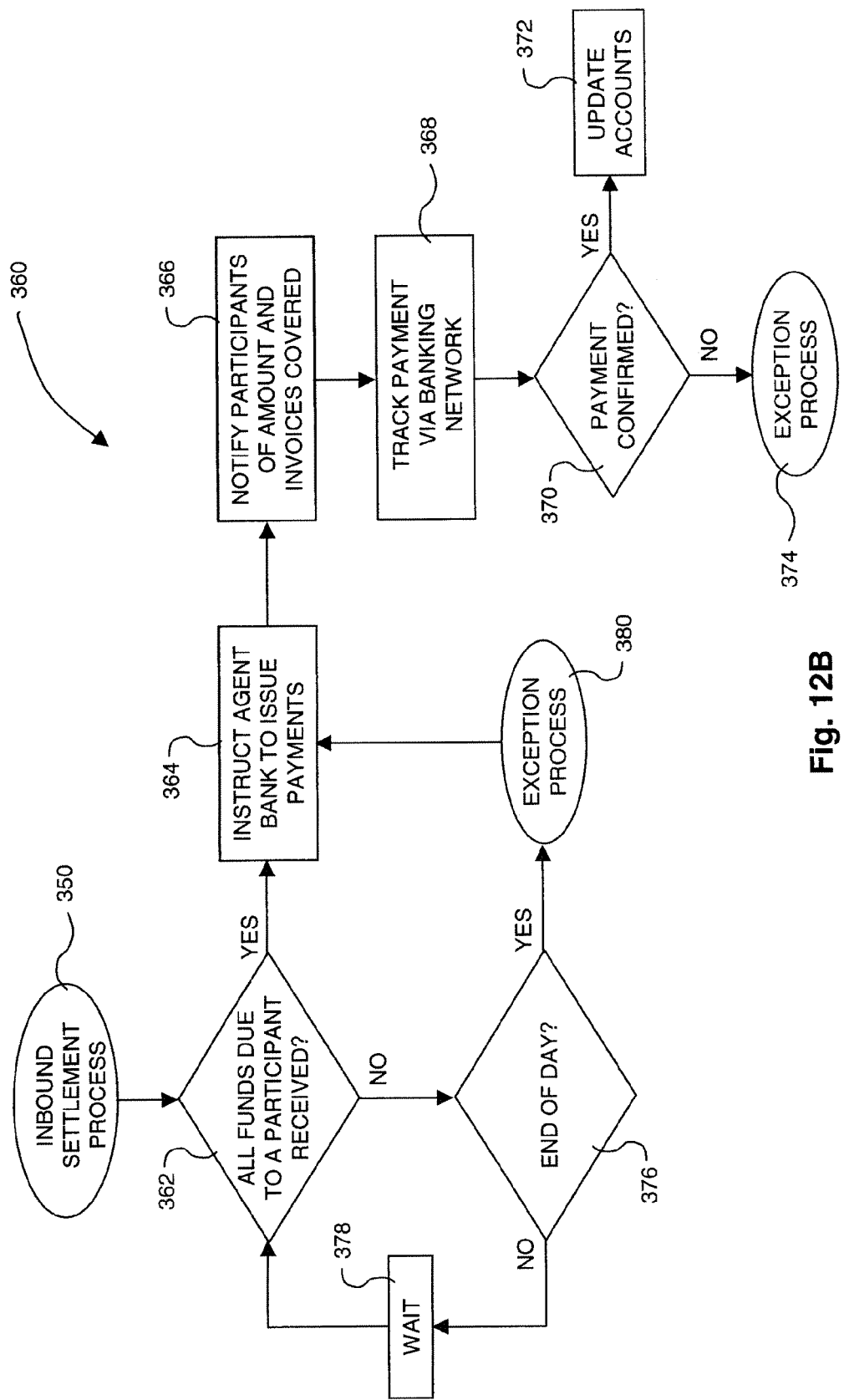
FIG. 12B is a flowchart of a process for outbound payments of the indirect settlement method of the present invention.
Figure 13:
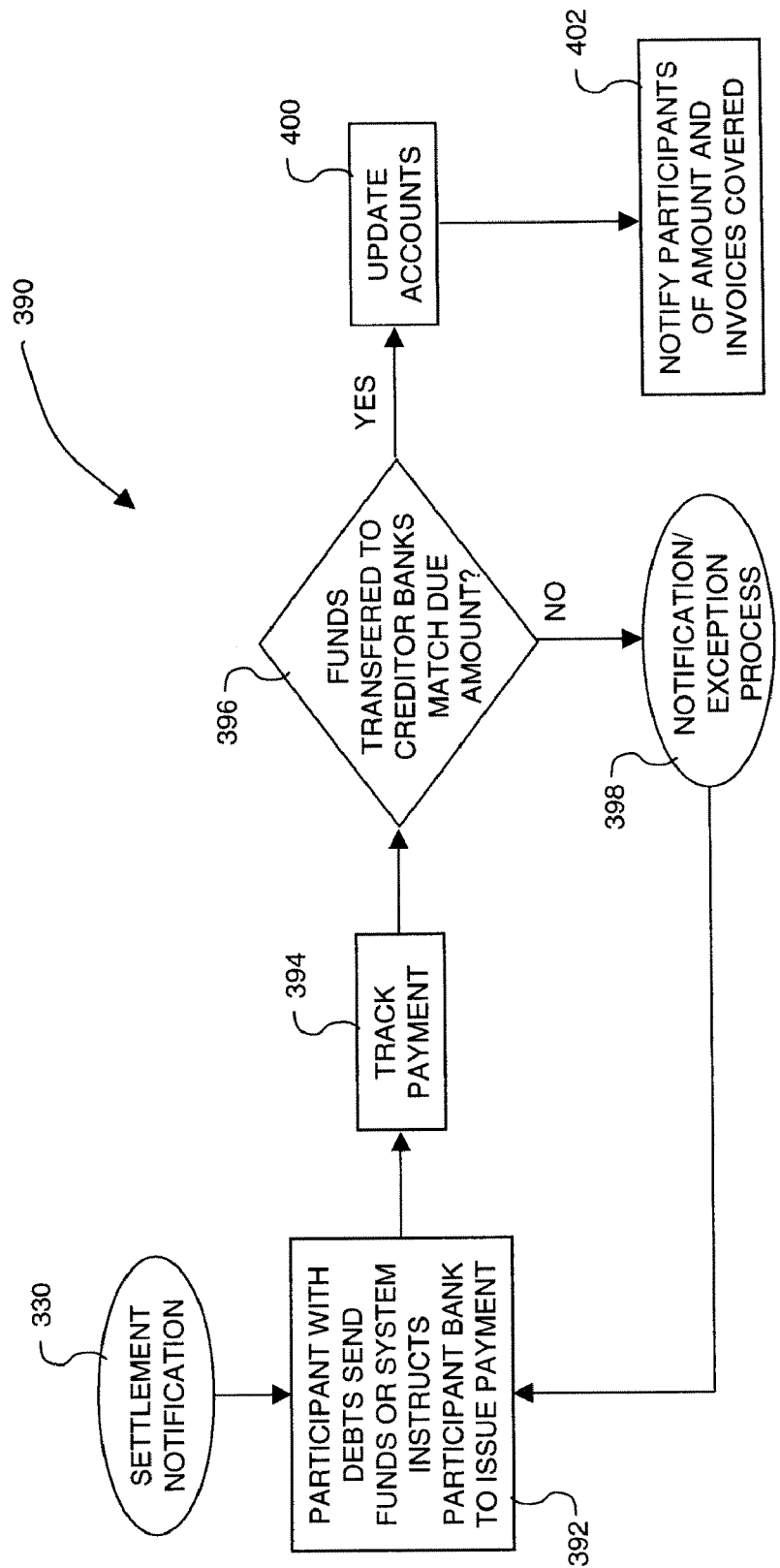
FIG. 13 is a flowchart of a process for direct settlement method of the present invention.

The steps for the settlement notification process are shown in FIG. 11, the steps for the indirect settlement method are shown in FIGS. 12A–B, and the steps for the direct settlement method are shown in FIG. 13. The settlement notification process can be used for both indirect settlement method and direct settlement method.

In the settlement notification process as shown in FIG. 11, the system uses the final settlement table from the aggregation and netting process 300, where the aggregated and netted amounts in the final settlement table reflect debts and credits for a given value date in the currencies specified by the participants, as shown at step 332. The system determines, for each participant, whether the participant has a debt position at step 334. If a participant has a debt position, the participant is notified of the amount due at step 336. The notification of amount due typically occurs several days prior to value date, depending on the payment method and jurisdiction of the particular participant. The system then determines, for each participant, if the participant has a credit position at step 338 and 344, and notifies of the amount expected, if any, in each currency at step 340. If the participant is either required to make a payment or expects a payment, the payments are settled in the settlement tracking process at step 342. If the participant is neither required to make a payment nor expects a payment, the system can notify participant of no activity at step 346.

The indirect settlement process depicted in FIGS. 12A–B shows settlement using an indirect agent bank network. FIG. 12A depicts the steps of the inbound indirect settlement process 350. Following notification of the payment required to be made by the settlement notification process 330, the payment is made from the debtor participant's bank account into the trust account at step 352. The payment can be issued by manual-debit mechanism or auto-debit mechanism. In the manual-debit mechanism, the debtor participant instructs its bank to issue the payment, while in the auto-debit mechanism, the system instructs the debtor participant's bank to issue the payment. The system determines if the debtor participant has remitted the correct amount at step 354 as set forth in the final settlement table. If the system participant has not remitted the correct amount, the system participant is advised of the incorrect amount and possibly enters an exception process to resolve the issue at step 358. If the system participant has remitted the correct amount, the system updates the general ledger of the system and the final settlement table at step 356. As each payment is received, the outbound indirect settlement process 360 monitors such payment receipts to determine if payments can be issued from the trust accounts to the creditors.

FIG. 12B depicts steps of the outbound indirect settlement process 360. For the given value date in question and for each participant, the system determines at step 362 whether all payments due to a creditor participant have been received through the inbound direct settlement process 350. If all the payments have not yet been received for a particular creditor, the system waits for further payments at step 378, unless it is end of the day (or the relevant payment cutoff time in a given jurisdiction) as determined at step 376. If it is end of day, then the exception process 380 determines the subset of payments that may be issued to the particular creditor and resolves the deficient payments separately. As soon as it has been determined at step 214 that all payments have been received for a particular creditor, the agent bank is instructed to issue payments to the creditors at step 364. The system then notifies the creditor participants of the payment amount and accounts receivable covered at step 366. The system then tracks the payments via the agent bank network at step 368, until the creditor banks confirm payments at step 370. For confirmed payments, the system then updates the general ledger of the system and the final settlement table at step 372. At step 374, any failures associated with the payments are handled through conventional exception processes, including clearinghouse unwind and exception process for multilateral payments involving multilateral debt and credits.

FIG. 13 depicts the steps of the direct settlement process 390. Following notification of the payment required to be made by the settlement notification process 330, the payment is made from the debtor participant bank account to the creditor bank account at step 392. The payment can be issued by manual-debit mechanism or auto-debit mechanism. In the manual-debit mechanism, the debtor participant instructs its bank to issue the payment, while in the auto-debit mechanism, the system instructs the debtor participant's bank to issue the payment. The system then tracks, if possible, the payments via the bank network at step 394, until the creditor bank verifies at step 396 that the debtor participant has remitted the correct amount as set forth in the final settlement table. For verified payments, the system then updates the general ledger of the system and the final settlement table at step 400. At step 402, the system can then notify the debtor participant of the accounts payable covered and the creditor participant of the accounts receivable covered. At step 398, any failures associated with the payments are handled through exception processes, including clearinghouse unwind and exception process for multilateral payments involving multilateral debt and credits. While it is technically possible for the direct settlement method to incorporate multilateral netting, this requires a complex allocation process, thus making the indirect settlement method preferable when multilateral netting is employed.

The accounts receivable and accounts payable system of the present invention also performs the useful feature of allowing system participants to track the settlement process. This is accomplished through the use of electronic information or documents that advise the parties to the settlement transaction and the agent banks, for indirect settlement method, of the progress of the settlement process. For example, at the beginning of the settlement process, after the debtor participant has made payment to the trustee account at the agent bank, the debtor participant or the system would use a debtor participant verification means to create an electronic remittance confirmation document, and use a debtor participant payment remittance presentment means to present the document to the creditor participant and the trustee of the trust account at the agent bank. The document advises them that payment has been made by the debtor system participant. The creation of remittance information also could be accomplished by the bank of the debtor participant. The system also would record this information using the debtor participant payment remittance update means so that this information would be available to the system participants.

The trustee of the trust account at the agent bank would use a trust account payment receipt verification means to construct an electronic trust account payment receipt, and a trust account payment receipt presentment means for presenting the payment receipt to the creditor participant and the debtor participant. The payment receipt advises them that the trustee verifies that the debtor participant has made payment into the trust account at the agent bank in the amount due on the agreed-to date and in the agreed-to currency. As in the case of the debtor participant payment remittance, the system also comprises a trust account payment receipt update means for recording this receipt information. When the trustee of the trust account transfers an amount equal to the amount received from the debtor participant into an account of the creditor participant at the creditor participant's bank, the trustee of the trust account would advise the creditor and debtor participants of this step by using the trust account payment remittance means to create a trustee account payment remittance document. The trustee would then use a trust account payment remittance presentment means to present the remittance document to the creditor participant and the debtor participant advising them that an amount equal to the amount paid by the debtor participant has been transferred into an account of the creditor participant. A trust account payment remittance update means then updates the data stored on the system with the trustee remittance information.

The creditor participant may advise the debtor participant and trustee of the trust account at the agent bank that the creditor participant acknowledges the transfer, into the account of the creditor participant, of an amount equal to the amount paid by the debtor participant into the trust account. This is accomplished by the creditor participant, or the system on behalf of the creditor participant, using the creditor participant payment receipt verification means to construct an electronic payment receipt, and the creditor participant payment receipt presentment means for presenting the receipt information to the debtor participant and the trustee of the trust account. In such receipt, the creditor participant acknowledges transfer, into the account of the creditor, of an amount equal to the amount paid by the debtor into the trust account at the agent bank. These various notification procedures can be implemented in many ways, for example, by accessing and viewing using a GUI notification information stored on the system; by e-mail; by paper mail; or by speech-synthesized voice mail notification.

G. Foreign Exchange Pooling Process

The accounts receivable and accounts payable system allows system participants to settle debt obligations in numerous currencies. To minimize for the system foreign exchange risks introduced through allowing participants to settle debt obligations in multiple currencies, the foreign exchange pooling means of the present system calculates and monitor risks to the system associated with volatility and relative price movements in the foreign exchange market. As background, in the indirect settlement method of the present invention, foreign exchange risks are introduced as an agent bank, or a third party institution, accepts payment in one currency and issues payment in a different currency in the process of settling a multi-currency debt obligation. For example, the system instructs the debtor participant to issue a payment for a specific amount in the debtor participant-specified currency several days prior to the value-date of the invoice(s) covered by the payment. The payment from the debtor participant ideally arrives on value-date, several days after the system advises the debtor participant of the amount. Between the time the debtor participant is advised of the payment amount to the time when the payment is received by the agent bank, the relative value (exchange rate) of the currency in which the payment was made may have changed. Since the system is responsible for issuing to a creditor a specific payment amount in the invoice-specified (or creditor participant-specified) currency, the system must purchase the specified currency using the payment received from the debtor participant. If the relative value of the debtor payment currency has decreased, then the system would not have enough to purchase the amount needed for issuing payment to the creditor. To significantly minimize this risk, the system calculates foreign exchange needs and purchases foreign exchange forwards (contracts for purchasing currency at the specified exchange rate a specified number of days before the purchase) to lock in ahead of time (e.g., at time of the payment advise to debtor participants) a foreign exchange rate and therefore obtain the necessary amount of currency needed at value-date. The foreign exchange pooling means of the current invention performs the steps necessary for system foreign currency risk management.

Figure 14:
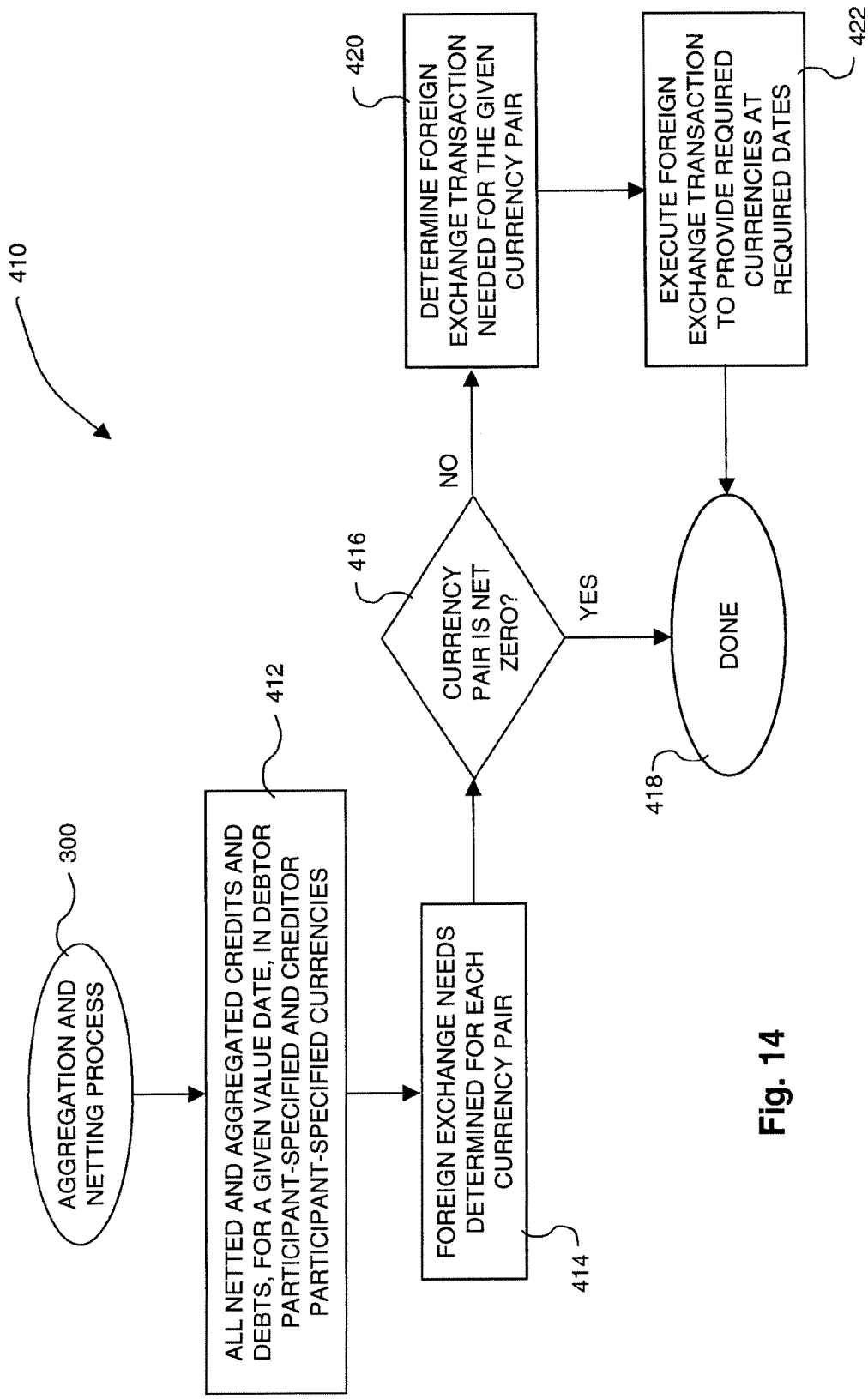
FIG. 14 is a flowchart of a process for foreign exchange pooling of the present invention.

The steps performed by the foreign exchange pooling means 410 are depicted in FIG. 14. At step 412, the system obtains, from the aggregation and netting process 300, the netted and aggregated debts and credits of all the participants for a given value date, in the currencies specified by the debtor participants and creditor participants. The aggregation and netting process 300 may perform netting, for use by the foreign exchange pooling means 410, on a bilateral basis, multilateral basis, or both. As previously shown in FIG. 9A to FIG. 9D, a creditor participant may specify a new currency different from the invoice currency to receive as payment, and a debtor participant may likewise specify a new currency different from the invoice currency to issue payment. As the foreign exchange pooling means concerns the payments received and issued by the agent bank of the system, the netted and aggregated amounts are to be determined from the debts and credits in the debtor participant and creditor participant specified currencies. Furthermore, as the netting and aggregation process involves all the debts and credits of all the participants for a given value date, the netted and aggregated amounts are typically reduced further than the sum of the individually netted and aggregated debts and credits of the individual participants. For example, if the netted and aggregated amount between two participants as shown in FIG. 9D is assumed to represent sums of numerous individual participants' debts and credits (rather than between two participants), two foreign exchange transactions involving a total of US $200 are present from the participants' views; one for Yen 200 to US $100 (debtor participant perspective) and another for US $100 to Euro 150 (creditor participant perspective). The foreign exchange pooling process reduces the two foreign exchange transactions to one transaction, Yen 200 to Euro 150 (US $100 equivalent).

At step 414, the netted and aggregated debts and credits are shown as net debt or credit between each currency pair. At step 416, the system determines if there is more of a given currency being paid out by the system than is being paid in for a given currency pair. If this is the case, the system determines at step 420 the foreign exchange transaction needed for the given currency pair. At step 422, the system then executes foreign exchange transactions, typically forward contracts, to provide the required foreign currencies for the value date. The forward contracts are executed on value-date to provide the necessary foreign currencies on value-date. At step 416, if the net amount between a given currency pair is zero, then no foreign exchange transaction is required for the given currency pair.

H. Workflow Management

The present invention streamlines management and execution of tasks associated with invoicing, dispute resolution and settlement through a workflow management feature. The basic tasks performed on the system comprise: invoice creation, dispute resolution, and settlement monitoring from the creditor's perspective; and invoice review, invoice approval, authorization and confirmation, dispute resolution, payment authorization and settlement monitoring from the debtor's perspective. The system implements an intuitive workflow management feature that can be adapted and customized to the specific needs of system participants, to enable the participants to institute and enhance existing workflow strategies.

A preferred embodiment of the present invention automates workflow management through an automatic and hierarchical allocation of responsibility. Through a GUI such as one shown in FIG. 15A and FIG. 15B, an administrative user of the participant ("participant administrator") accesses the electronic workflow management means to specify for each user and user types tasks and access rights to accounts receivable and accounts payable information. These user permissions and responsibilities are checked by the system each time a task is performed by a particular user, and the system allows or limits activities accordingly. The role definitions screen 430 of the electronic workflow management means allows the participant administrator to define roles and assign specific tasks allowed by the particular roles. While the screen 430 shows four tasks, it is well within the scope of the current invention to include many more tasks (e.g., goods inspection, reconciliation without authorization, etc.), and also to allow the participant administrator to define and add custom tasks (e.g., multiple levels of approval). The screen 430 also allows a participant administrator to define a role to automatically perform the tasks assigned. For example, the 'AP Auto Confirmation' role will have the system automatically perform invoice confirmation.

Once the roles are defined, the user definition screen 432 of the electronic workflow management means allows the system participant administrator to define users and assign specific roles. The user may be an actual employee of the participant, or a system-controlled user, for example "Auto $1000" as shown in FIG. 15B. In addition to the role assigned, certain thresholds are set to narrow the type of information accessible by the particular user. As shown on screen 432, thresholds such as the amount of the invoice, specific debtor or creditor on the invoice, or other custom characteristics of the invoice can be set. As setting thresholds can introduce subsets of information that may not be covered by any user (which is allowed), the system assists the system participant administrator by notification of subsets not covered so that new users can be created or thresholds relaxed to cover the uncovered subsets. Also, there may be overlaps in coverage between two users. While this is allowed, the system will also notify the system participant administrator of coverage overlaps.

The workflow management feature allows the participant to institute workflow strategies such as automatically approving small-value transactions. For example, in FIG. 15B, the "Auto $1000" user is assigned the "AP Auto Confirmation" role, which permits the system to automatically confirm invoices. The threshold set for "Auto $1000" user is "$1,000" and "Non-DR", which means that the system will automatically confirm invoices that have not been through dispute resolution and with amount less than $1,000. This enhancement to traditional workflow strategies significantly improves the efficiency of processing accounts receivable and accounts payable.

Furthermore, as the current invention can be accessed regardless of user location, it allows participants to simultaneously manage accounts receivable and accounts payable on a single system, but still have distributed management and responsibilities throughout the company and geography. This significantly reduces the need for the participant to build up infrastructure to support accounts receivable and accounts payable operations, and eliminates paper-based processes routing invoices and other financial information to various departments and users for each step of the process.

I. Lending on Cash Flow and Confirmed Invoices

A feature of the accounts receivable and accounts payable system of the present invention is that it significantly enhances the ability of system participants to gain access to lending based on cash flows arising from accounts receivable. The system accomplishes this by encouraging trading partners to use a centralized system for accounts receivable and accounts payable, and for authorizing and confirming accounts receivable and accounts payable. During the ordinary operation of the system, substantial information is collected concerning cash flows generated by system participants. This information will significantly lower the risk associated with lending money to system participants based on cash flows arising from accounts receivable, as well as assist lenders in anticipating and monitoring outbound accounts payable cash flows.

Figure 16A:
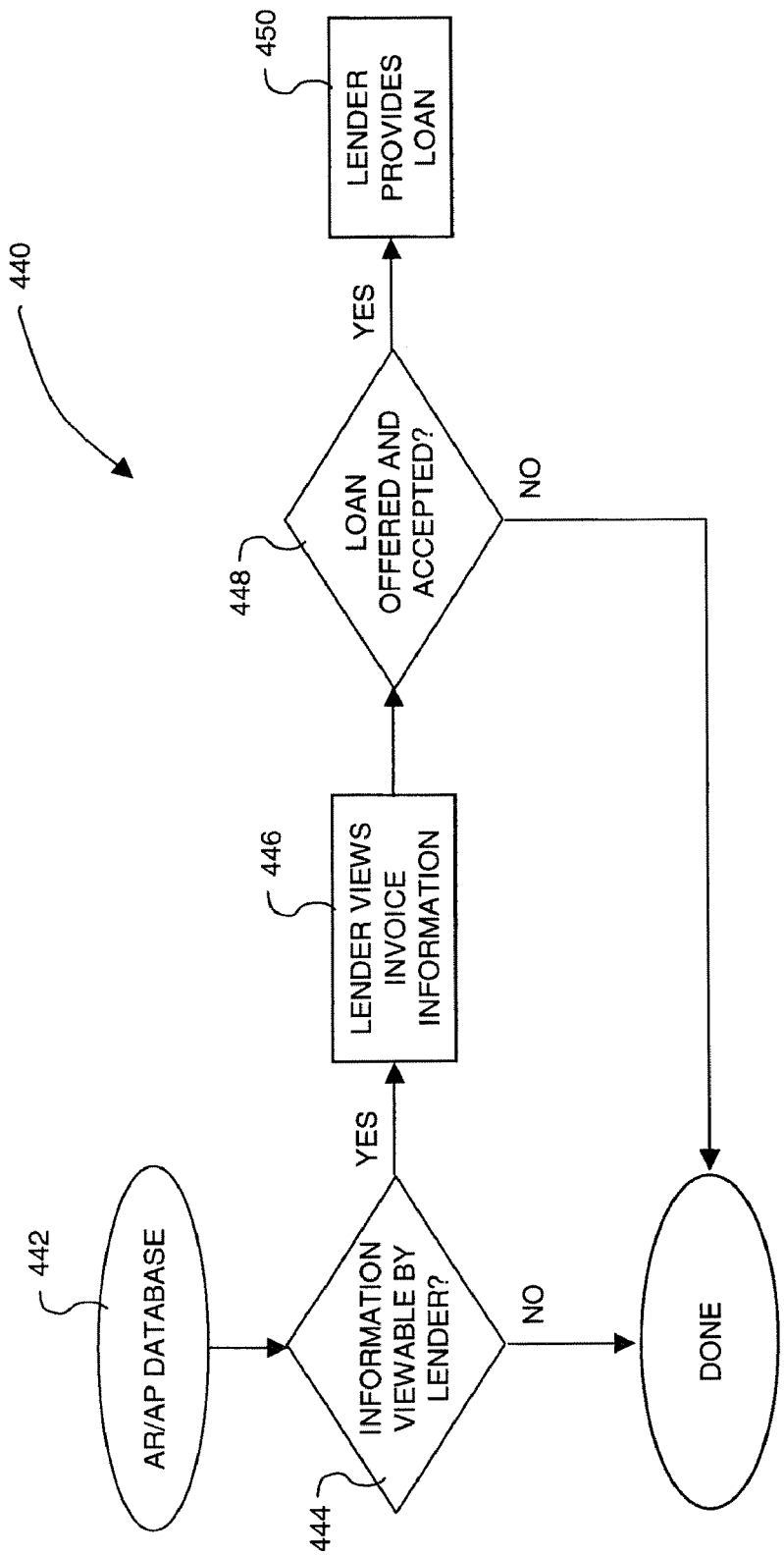
FIG. 16A is a flowchart of a process for financial review for authorizing third parties to review participant accounts receivable and accounts payable information.

The financial information viewing means 440 accomplishes this by allowing both creditor participants and debtor participants to permit third parties (e.g., banks) to review financial information stored in the system accounts receivable and accounts payable database 442, as shown in FIG. 16A. The system allows participants using the system as creditors to permit financial institutions such as banks or other potential lenders to view information. The financial information viewing means may be implemented as a GUI accessible by a system participant to specify various access rights for third parties. The financial information viewing means allows a participant to specify what third parties may have access to system information; what system information the third parties have access to; and for how long third parties have access to system information. At step 444, the system checks whether the information is permitted for viewing by the particular bank or other potential lender. The lenders will find such information valuable in assessing creditors' receivables and cash flow prospects. They may also find such information valuable in monitoring debtors' outbound cash flow profiles and anticipated payments. If the information is not permitted for viewing, it is hidden from view of the lenders, and possibly the system participant or lender is notified. If the information is viewable, the lenders may view the information at step 446 directly via authorized access to the system, or via data provided by the participants. The system may also provide lenders with verification or authentication of such data. Based on this information, lenders make a decision at step 448 whether to offer funds to the particular participant under such terms and conditions as are undertaken for such transactions. If such funds are accepted, the lender provides the funds at step 450 and may continue to use the system to monitor cash flows.

Figure 16B:
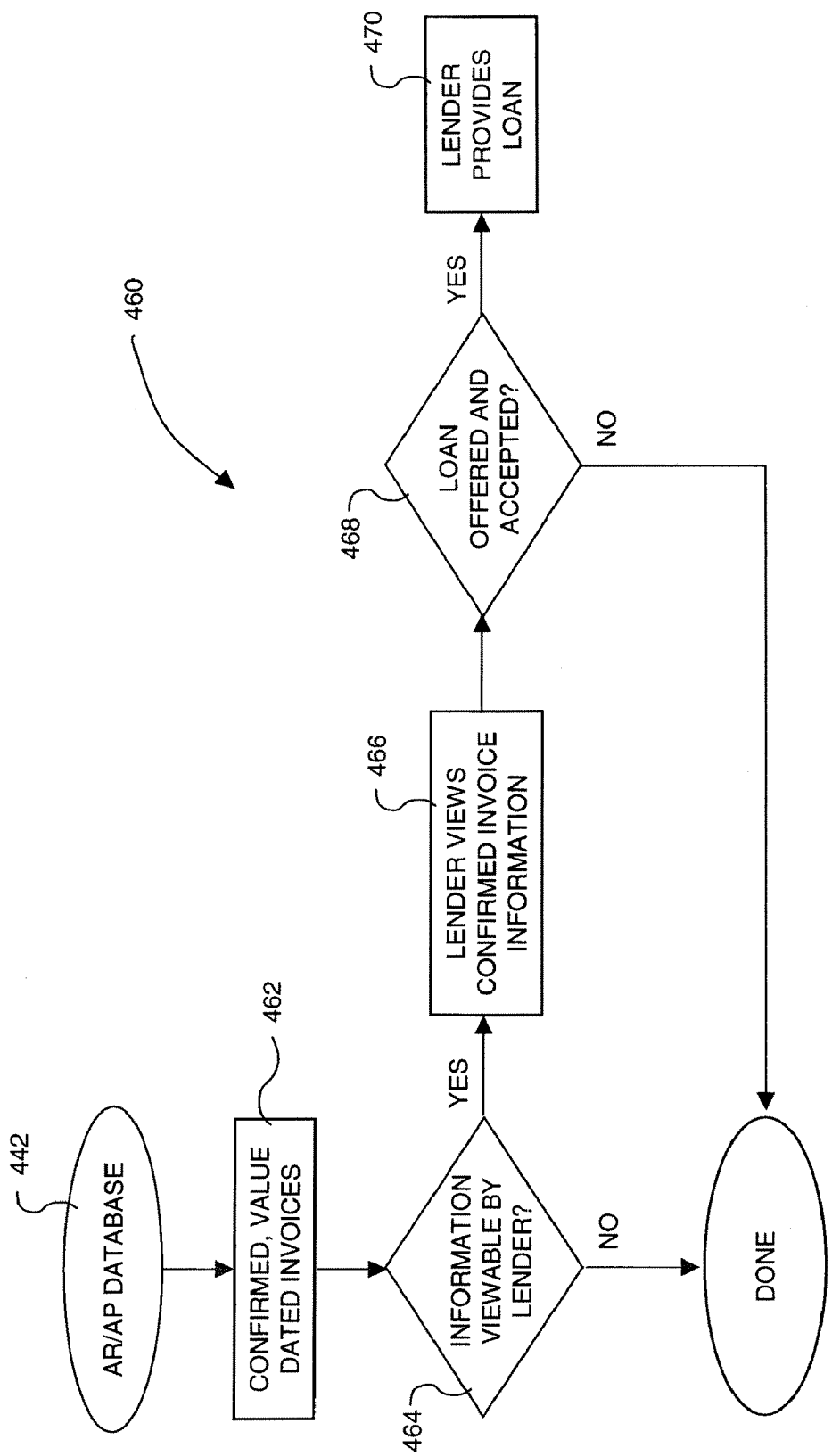
FIG. 16B is a flowchart of a process for financial review for authorizing third parties to review confirmed participant accounts receivable and accounts payable information.

Using the financial information viewing means 460, system participants may also permit potential lenders to view authorized or confirmed accounts receivable and accounts payable information, which potentially offers better certainty of payments than unauthorized or unconfirmed payments. This information can be used by the participants to obtain a more favorable lending rate than loans based on unauthorized or unconfirmed payments. As shown in FIG. 16B, the system acts as a repository of information on confirmed receivables and payables in the accounts receivable and accounts payable database 442. The system allows participants using the system as creditors to authorize financial institutions such as banks or other potential lenders to view the information. At step 462, the system limits information viewable to confirmed accounts receivable and accounts payable. At step 464, the system checks whether the information is viewable by the particular bank or other potential lender. The lenders will find such information valuable in assessing creditors' receivables and cash flow prospects. They may also find such information valuable in monitoring debtors' outbound cash flow profiles and anticipated payments. If the information is not viewable, it is hidden from view of the lenders, and possibly the system participant or lender is notified. If the information is viewable, the lenders may view the information at step 466 directly via authorized access to the system, or via data provided by the participants. The system may also provide lenders with verification or authentication of such data. Based on this information, lenders make a decision at step 468 whether to offer funds to the particular participant under such terms and conditions as are undertaken for such transactions. If such funds are accepted, the lender provides the funds at step 470 and may continue to use the system to monitor cash flows.

J. Confirmed Accounts Receivable and Electronic Promissory Notes

The present invention also facilitates transactions in accounts receivable in two ways. In the first system, a debtor participant may use the independent payment obligation sale authorization means to allow a creditor participant to sell independent payment obligations created by the confirmation means. The independent payment obligation sale authorization means facilitates many commercial arrangements between the participants; for example, the debtor-participant may indicate that the independent payment obligation may be sold to a specific third party, or to a predetermined group of third parties, or to any third party.

The second system allows system participants to designate as electronic promissory notes confirmed electronic invoices. Upon confirmation, confirmed invoices can become a new bilateral electronic contract between the participants with respect to such payments and remain as such, or they can be converted into electronic promissory notes. Under the UETA, an electronic promissory note is known as a "transferable record" and must strictly meet certain criteria in order to achieve the "negotiability" that a paper-based negotiable instrument would have. The system of the present invention provides functionality that meets requirements set forth by such regulations, so that the electronic promissory notes created by the system participants will be accorded the same status as paper-based negotiable instruments. The system can also be implemented to facilitate dealings in different electronic transferable records, such as electronic bills of exchange and electronic drafts.

In addition, the system of the present invention accommodates and facilitates a wide range of commercial arrangements between system participants concerning the conversion of debt obligations into electronic promissory notes. For example, a creditor on an electronic invoice can specify that confirmation causes the invoice to become automatically an electronic promissory note, which is freely transferable; a creditor and debtor on an electronic invoice can agree that confirmation causes an electronic invoice to become automatically an electronic promissory note; or a debtor and creditor can agree that after confirmation the electronic invoice remains a bilateral contract pursuant to which an electronic promissory note can be issued only after the debtor participant gives an additional consent. The rulebook should state which of the modes will be used in practice and create the necessary legal framework (e.g., by making reference to the UETA).

Figure 16C:
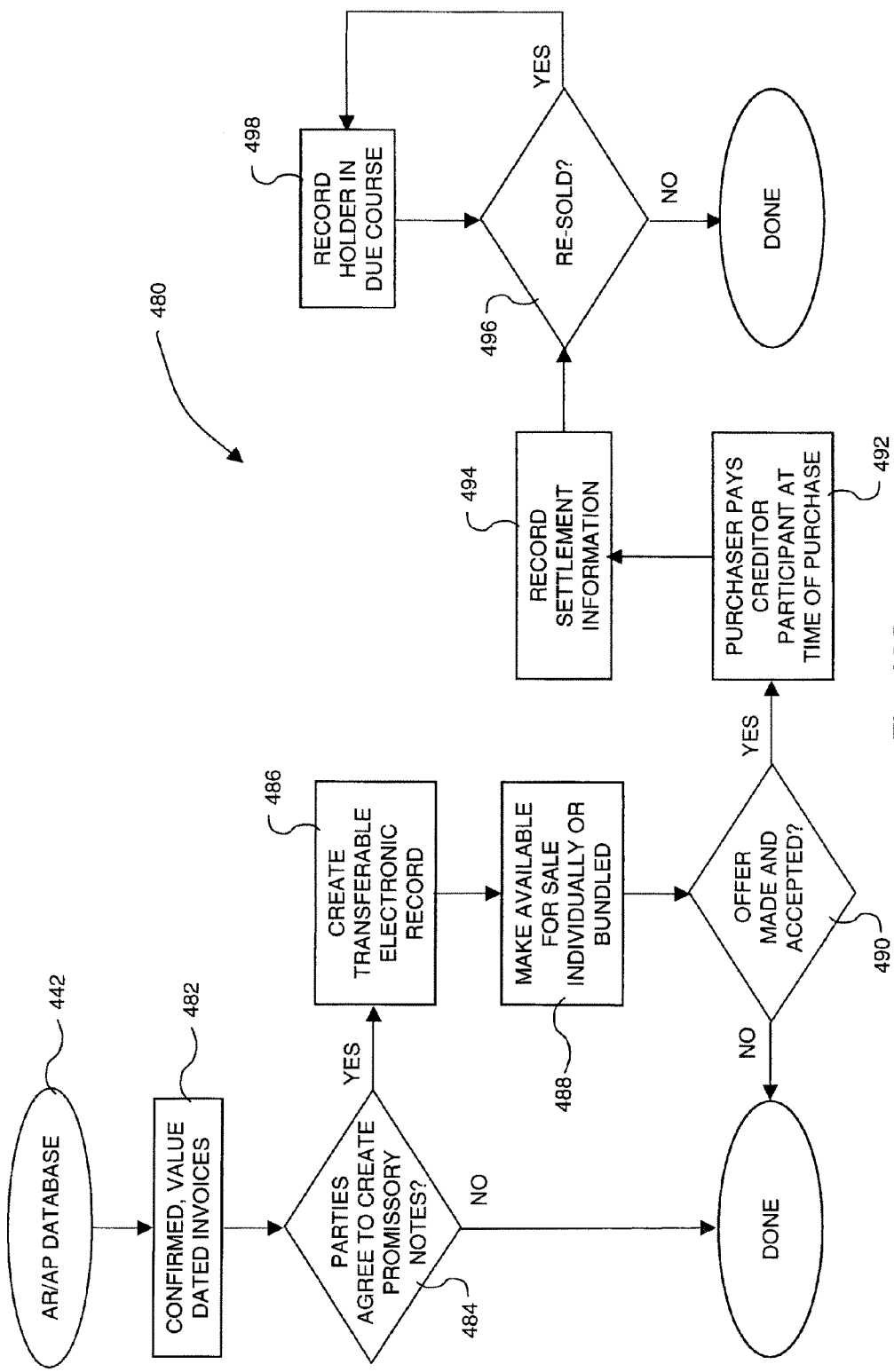
FIG. 16C is a flowchart of a process for creating, offering for sale, and selling an electronic promissory note in accordance with the present invention.

The operation of the electronic promissory note feature 480 of the accounts receivable and accounts payable system of the present invention is shown generally in FIG. 16C. The system acts as a repository of information on confirmed receivables and payables in the accounts receivable and accounts payable database 442. At step 482, the system identifies and creates an electronic record reflecting all such confirmed accounts receivable and accounts payable. The system then determines if both participants to the invoice have agreed that the electronic promissory note can be converted into an electronic promissory note at step 484. A creditor participant holding a confirmed electronic invoice can designate the confirmed electronic invoice as an electronic promissory note at step 486. The electronic promissory note designation means is preferably a GUI which lists all confirmed electronic invoices held by the creditor participant, and allows the creditor participant to easily highlight and select an individual confirmed invoices or groups of confirmed invoices to designate as electronic promissory notes.

A creditor participant holding electronic promissory notes may decide to discount them to third parties as a source of working capital by using the electronic promissory note sale availability means at step 488. Preferably, the electronic promissory note sale availability means comprises another web screen comprising a GUI for easily selecting and designating, from a list of electronic promissory notes, individual or groups of electronic promissory notes to be made available for sale to third parties. The system automatically updates the electronic record of all electronic promissory notes available for discounting with those identified by the creditor system participant. Preferably, this electronic record can be accessed over the web through a GUI by third parties interested in discounting electronic promissory notes available on the system, and the electronic record of all electronic promissory notes are made available for review. An interested third party can peruse the list of available electronic promissory notes and select electronic promissory notes for purchase.

Alternatively, the electronic promissory note bid solicitation means of the present system allows the creditor participant holding an electronic promissory note to solicit bids from other system participants or third parties. In cases where the electronic promissory note is sold to another system participant, the creditor participant holding the electronic promissory note may use the sale to settle debt obligations owed to the other system participant to whom the electronic promissory note is sold.

After the third party has determined the electronic promissory notes desired for purchase, the electronic bid means of the present invention at step 490 can be used to transmit an electronic bid to creditor participants holding electronic promissory notes. The electronic bid means preferably is a GUI on the system, where a standardized electronic document requests information from the third party. Once the electronic promissory note bid is completed, it is presented to the creditor system participant on the system. The system allows for numerous other means for perusing the list of available electronic promissory notes and bidding on them, such as email, fax and phone, as well as linkages to other securities trading systems (e.g., Reuters, Bloomberg, ECNs, etc.).

If the bid is acceptable to the creditor system participant, the creditor system participant can so indicate using the electronic promissory note bid acceptance means. The electronic promissory note bid acceptance means comprises another web page accessible by the creditor system participant, through which the creditor participant can access electronic bid acceptance documents that are transmitted back to the third party after completion. Once an agreement has been reached, at step 492, the third party who purchased the electronic promissory note pays the creditor participant, and the electronic signature of the creditor participant is requested so that the electronic promissory note may be endorsed in favor of the third party and delivered to the third party. The system is designed to comply with applicable laws regarding transferable electronic records, to provide to assignees of such records the status of holders in due course, and to ensure the recognition of such status under the laws applicable to system participants.

As a final step in the basic process, the accounts receivable and accounts payable system of the present invention through its third party settlement information means collects settlement information from the third party at step 494. Preferably, the third party settlement information means takes the form of a web page accessible over the Internet which allows access by the third party to electronic documents that request standard settlement information. Once this information is entered, the third party settlement information update means updates the comprehensive settlement database of the system with the identity of the third party and the settlement information provided by the third party. The electronic promissory note can be resold on the system or in secondary markets as shown at steps 496 and 498.

In alternate embodiments of the present invention, the accounts receivable and accounts payable system provides other purchase options for the third party. For example, through a third party preference specification means, a third party may structure more complex electronic promissory note purchase transactions. For example, the third party may wish to purchase all of the electronic promissory notes identifying a particular debtor participant. Alternatively, the third party may wish to purchase a certain monetary value of all electronic promissory notes identifying debtor participants having credit ratings acceptable to the third party. The system is capable of implementing all of these purchase transactions, as well as other combinations based on accounts receivable or accounts payable characteristics captures by the system.

By creating a new financial instrument representing confirmed accounts receivable, the present invention makes these accounts available immediately upon confirmation as sources of working capital. This innovation will both increase the working capital available to system participants, and significantly lower the cost of working capital to system participants.

Thus, it is seen that an accounts receivable and accounts payable system for invoicing, invoice reconciliation, dispute resolution, invoice authorization, invoice confirmation, same currency and multi-currency settlement and tracking, financial information viewing, and creation of electronic transferable records and electronic promissory notes is provided. One skilled in the art will appreciate that the present invention can be practiced in other applications where similar features are desired. Further, one skilled in the art will appreciate that the present invention can be practiced by other than the described embodiments; that these described embodiments are presented for the purposes of illustration and not of limitation; and that the present invention is therefore limited only by the claims which follow.

What is claimed is:

1. An electronic multiparty accounts receivable and accounts payable system for use by at least two system participants who have contracted with one another and who may owe debts to one another under one or more underlying contracts, the said system comprising:

electronic data storage means for storing accounts receivable and accounts payable information concerning the system participants;

data entry means for entering accounts receivable and accounts payable information reflecting debts owed to a creditor participant by a debtor participant into the electronic data storage means of the electronic multiparty accounts receivable and accounts payable system;

electronic invoicing means for constructing an electronic invoice reflecting amounts owed to the creditor participant by the debtor participant on one or more underlying contracts;

electronic invoice presentment means for presenting the electronic invoice reflecting amounts owed to the creditor participant by the debtor participant for acceptance or rejection;

authorization means for allowing the debtor participant to authorize the electronic invoice, wherein the authorization signifies the debt reflected in the electronic invoice has become a payment obligation due on a date certain; and confirmation means for allowing the debtor participant to confirm the electronic invoice without modification, wherein the confirmation transforms the debt reflected in the electronic invoice owed by the debtor participant into an independent payment obligation due on a date certain for a sum certain and free of defenses to the underlying contract;

wherein the creditor participant transfers the independent payment obligation due on the date certain for the sum certain to a third party entity as an electronic promissory note for settling a separate obligation between the creditor participant and the third party entity.

2. The electronic multiparty accounts receivable and accounts payable system of claim 1 wherein the electronic invoicing means allows an electronic invoice to be created from accounts receivable information stored in the electronic data storage means reflecting one or more accounts receivable owed to a creditor by a debtor participant on one or more underlying contracts.

3. The electronic multiparty accounts receivable and accounts payable system of claim 1 wherein the electronic invoicing means allows an electronic invoice to be created from accounts payable information stored in the electronic data storage means reflecting one or more accounts payable owed to a creditor by a debtor participant on one or more underlying contracts.

4. The electronic multiparty accounts receivable and accounts payable system of claim 1 further comprising:
information presentment means for allowing the system participants to present and transmit information stored in the electronic data storage means.

5. The electronic multiparty accounts receivable and accounts payable system of claim 1 wherein the confirmation means further comprises an electronic confirmation document creation means for allowing the debtor participant to construct an electronic confirmation document.

6. The electronic multiparty accounts receivable and accounts payable system of claim 1 further comprising:
selective designation means for allowing the debtor participant and recipient of the electronic invoice reflecting amounts owed by the debtor participant to the creditor participant to designate the electronic invoice as having a specific status.

7. The electronic multiparty accounts receivable and accounts payable system of claim 6 wherein the selective designation means allows the debtor participant to designate the electronic invoice as having a reconciled status.

8. The electronic multiparty accounts receivable and accounts payable system of claim 6 wherein the selective designation means allows the debtor participant to designate the electronic invoice as having an approved status.

9. The electronic multiparty accounts receivable and accounts payable system of claim 1 further comprising:
credit note creation means for allowing the creditor participant to construct a credit note reflecting an agreed-to credit; and
credit note presentment means for presenting the credit note to the debtor participant.

10. The electronic multiparty accounts receivable and accounts payable system of claim 9 wherein the credit note creation means allows the creditor participant to associate the credit note created by the creditor participant to an electronic invoice previously presented by the creditor participant to the debtor participant.

11. The electronic multiparty accounts receivable and accounts payable system of claim 9 further comprising:
credit note authorization means for allowing the debtor participant to authorize the credit note presented by the creditor participant, whereby the authorization signifies the credit reflected in the electronic credit note has become a payment obligation due on a date certain.

12. The electronic multiparty accounts receivable and accounts payable system of claim 9 further comprising:
credit note confirmation means for the debtor participant to confirm the credit note presented by the creditor participant, whereby the confirmation signifies the credit reflected in the electronic credit note has become an independent payment obligation due on a date certain and free of any defenses to the underlying contract.

13. The electronic multiparty accounts receivable and accounts payable system of claim 1 further comprising:
information access control means for allowing each system participant to selectively control access to information stored in the electronic data storage means concerning system participants' transactions.

14. The electronic multiparty accounts receivable and accounts payable system of claim 12 wherein the information access control means further allows each system participant to selectively control access to information in dependence on category of information.

15. The electronic multiparty accounts receivable and accounts payable system of claim 12 wherein the information access control means further allows each system participant to selectively control access to information in dependence on date.

16. The electronic multiparty accounts receivable and accounts payable system of claim 1 further comprising:
electronic workflow management means for allowing each participant to institute electronic workflow management strategies that selectively allocate or perform accounts receivable or accounts payable management work.

17. The electronic multiparty accounts receivable and accounts payable system of claim 16 wherein the electronic workflow management means allows the system participant to institute workflow management rules based on the characteristics of the electronic invoice or credit note.

18. The electronic multiparty accounts receivable and accounts payable system of claim 16 further comprising:
automatic workflow allocation means for allowing each participant to institute workflow management strategies that include automatic, system-initiated actions that do not require participant intervention.

19. The electronic multiparty accounts receivable and accounts payable system of claim 1 wherein the data entry means allows a creditor participant to manually or automatically enter accounts receivable information in the electronic data storage means.

20. The electronic multiparty accounts receivable and accounts payable system of claim 1 wherein the data entry means allows third parties to manually or automatically enter on behalf of a creditor participant accounts receivable information in the electronic data storage means.

21. The electronic multiparty accounts receivable and accounts payable system of claim 1 wherein the data entry means allows a debtor participant to manually or automatically enter accounts payable information in the electronic data storage means.

22. The electronic multiparty accounts receivable and accounts payable system of claim 1 wherein the data entry means allows third parties to manually or automatically enter on behalf of a debtor participant accounts payable information in the electronic data storage means.

23. The electronic multiparty accounts receivable and accounts payable system of claim 1 wherein the data entry means allows a creditor participant to manually or automatically enter other information in the electronic data storage means.

24. The electronic multiparty accounts receivable and accounts payable system of claim 1 wherein the data entry means allows a debtor participant to manually or automatically enter other information in the electronic data storage means.

25. The electronic multiparty accounts receivable and accounts payable system of claim 1 wherein the data entry means allows third parties to manually or automatically enter on behalf of a system participant other information in the electronic data storage means.

26. The electronic multiparty accounts receivable and accounts payable system of claim 1 further comprising:
  template customization means for allowing each participant to customize the design of the invoice or credit note templates used for generating invoices or credit notes.

27. The electronic multiparty accounts receivable and accounts payable system of claim 1 wherein the electronic invoice created by the electronic invoicing means includes the name of the creditor.

28. The electronic multiparty accounts receivable and accounts payable system of claim 1 wherein the electronic invoice created by the electronic invoicing means includes the name of the debtor.

29. The electronic multiparty accounts receivable and accounts payable system of claim 1 wherein the electronic invoice created by the electronic invoicing means describes the transaction creating the debt reflected in the electronic invoice.

30. The electronic multiparty accounts receivable and accounts payable system of claim 1 wherein the electronic invoice created by the electronic invoicing means sets forth the taxes payable on the transaction reflected in the electronic invoice.

31. The electronic multiparty accounts receivable and accounts payable system of claim 1 wherein the electronic invoice created by the electronic invoicing means includes line items listing the component elements of debts owed to the creditor by the debtor, and evidenced by such invoice.

32. The electronic multiparty accounts receivable and accounts payable system of claim 1 further comprising:
  electronic invoice information addition means for including additional information or graphics in an electronic invoice created on the system.

33. The electronic multiparty accounts receivable and accounts payable system of claim 1 further comprising:
  financial data reporting means for analyzing and creating reports concerning participants' financial information generated during operation of the electronic multiparty accounts receivable and accounts payable system.

34. The electronic multiparty accounts receivable and accounts payable system of claim 33 wherein the financial data reporting means allows each participant to perform cash flow analysis and reporting for analyzing cash flows into, and out of, the participant's system account.

35. The electronic multiparty accounts receivable and accounts payable system of claim 33 wherein the financial data reporting means allows each participant to perform other analysis and reporting.

36. The electronic multiparty accounts receivable and accounts payable system of claim 33 wherein the financial data reporting means allows each participant to specify the category of data, the particular analysis to be performed, and the format of the report to be generated.

37. The electronic multiparty accounts receivable and accounts payable system of claim 33 wherein the financial data reporting means allows each participant to create a list of analysis reports used by the participant.

38. The electronic multiparty accounts receivable and accounts payable system of claim 33 wherein the financial data reporting means allows the system to perform analysis and reporting.

39. The electronic multiparty accounts receivable and accounts payable system of claim 33
  wherein the financial data reporting means allows the system to track individual participants' credit risks.

40. An electronic multiparty accounts receivable and accounts payable system for use by at least two system participants who have contracted with one another and who may owe debts to one another under one or more underlying contracts, the said system comprising:
  electronic data storage means for storing accounts receivable and accounts payable information concerning the system participants;
  data entry means for entering accounts receivable and accounts payable information reflecting debts owed to a creditor participant by a debtor participant into the electronic data storage means of the electronic multiparty accounts receivable and accounts payable system;
  electronic invoicing means for constructing an electronic invoice reflecting amounts owed to the creditor participant by the debtor participant on one or more underlying contracts;
  electronic invoice presentment means for presenting the electronic invoice reflecting amounts owed to the creditor participant by the debtor participant for acceptance or rejection;
  authorization means for allowing the debtor participant to authorize the electronic invoice, wherein the authorization signifies the debt reflected in the electronic invoice has become a payment obligation due on a date certain;
  confirmation means for allowing the debtor participant to confirm the electronic invoice without modification, wherein the confirmation transforms the debt reflected in the electronic invoice owed by the debtor participant into an independent payment obligation due on a date certain for a sum certain and free of defenses to the underlying contract;
  wherein the creditor participant transfers the independent payment obligation due on the date certain for the sum certain to a third party entity as an electronic promissory note for settling a separate obligation between the creditor participant and the third party entity; and
  payment receipt currency designation means for allowing the creditor participant to designate a currency for payment receipt for a specific invoice irrespective of the currency specified on such electronic invoice.

41. An electronic multiparty accounts receivable and accounts payable system for use by at least two system participants who have contracted with one another and who may owe debts to one another under one or more underlying contracts, the said system comprising:
  electronic data storage means for storing accounts receivable and accounts payable information concerning the system participants;
  data entry means for entering accounts receivable and accounts payable information reflecting debts owed to a creditor participant by a debtor participant into the electronic data storage means of the electronic multiparty accounts receivable and accounts payable system;
  electronic invoicing means for constructing an electronic invoice reflecting amounts owed to the creditor participant by the debtor participant on one or more underlying contracts;
  electronic invoice presentment means for presenting the electronic invoice reflecting amounts owed to the creditor participant by the debtor participant for acceptance or rejection;
  authorization means for allowing the debtor participant to authorize the electronic invoice, wherein the authorization transforms the debt reflected in the electronic invoice owed by the debtor participant into an independent payment obligation due on a date certain for a sum certain and free of defenses to the underlying contract; wherein the creditor participant transfers the independent payment obligation due on the date certain for the sum certain to a third party entity as an electronic promissory note for settling a separate obligation between the creditor participant and the third party entity;

electronic rejection means for allowing the debtor participant and recipient of the electronic invoice presented by the creditor participant to construct an electronic response document for presentment to the creditor participant setting forth the basis of rejection of the electronic invoice; and electronic rejection presentment means for presenting the electronic response document created by the debtor participant to the creditor participant.

42. The electronic multiparty accounts receivable and accounts payable system of claim 41 further comprising:

amendment proposal means for allowing the debtor participant to include a proposed amendment in the electronic response document to the electronic invoice presented by the creditor participant.

43. The electronic multiparty accounts receivable and accounts payable system of claim 42 wherein the amendment proposal means allows the debtor participant to propose a new payment amount.

44. The electronic multiparty accounts receivable and accounts payable system of claim 42 wherein the amendment proposal means allows the debtor participant to propose a new payment date.

45. The electronic multiparty accounts receivable and accounts payable system of claim 42 wherein the amendment proposal means allows the debtor participant to propose a new payment currency.

46. The electronic multiparty accounts receivable and accounts payable system of claim 42 wherein the amendment proposal means allows the debtor participant to propose changes to information reflected in the electronic invoice presented by the creditor participant.

47. The electronic multiparty accounts receivable and accounts payable system of claim 42 further comprising:

amended electronic invoice approval means for allowing the creditor participant to approve the amended electronic invoice proposed by the debtor participant.

48. The electronic multiparty accounts receivable and accounts payable system of claim 47 further comprising:

approved amended electronic invoice authorization means for allowing the debtor participant to authorize the amended electronic invoice approved by the creditor participant, whereby the authorization signifies the debt reflected in the electronic invoice has become a payment obligation due on a date certain.

49. The electronic multiparty accounts receivable and accounts payable system of claim 47 further comprising:

approved amended electronic invoice confirmation means for allowing the debtor participant to confirm the amended electronic invoice approved by the creditor participant, whereby the confirmation signifies the debt reflected in the electronic invoice has become an independent payment obligation due on a date certain and free of any defenses to the underlying contract.

50. An electronic multiparty accounts receivable and accounts payable system for use by at least two system participants who have contracted with one another and who may owe debts to one another under one or more underlying contracts, the said system comprising:

electronic data storage means for storing accounts receivable and accounts payable information concerning the system participants;

data entry means for entering accounts receivable and accounts payable information reflecting debts owed to a creditor participant by a debtor participant into the electronic data storage means of the electronic multiparty accounts receivable and accounts payable system;

electronic invoicing means for constructing an electronic invoice reflecting amounts owed to the creditor participant by the debtor participant on one or more underlying contracts;

electronic invoice presentment means for presenting the electronic invoice reflecting amounts owed to the creditor participant by the debtor participant for acceptance or rejection;

authorization means for allowing the debtor participant to authorize the electronic invoice, wherein the authorization transforms the debt reflected in the electronic invoice owed by the debtor participant into an independent payment obligation due on a date certain for a sum certain and free of defenses to the underlying contract; wherein the creditor participant transfers the independent payment obligation due on the date certain for the sum certain to a third party entity as an electronic promissory note for settling a separate obligation between the creditor participant and the third party entity;

amended electronic invoice creation means for allowing the creditor participant to construct an amended electronic invoice reflecting amendments to an electronic invoice previously presented by the creditor participant to the debtor participant; and amended electronic invoice presentment means for presenting the amended electronic invoice constructed by the creditor participant to the debtor participant.

51. The electronic multiparty accounts receivable and accounts payable system of claim 50 wherein the amended electronic invoice creation means allows the creditor participant to propose a new payment amount.

52. The electronic multiparty accounts receivable and accounts payable system of claim 50 wherein the amended electronic invoice creation means allows the creditor participant to propose a new payment date.

53. The electronic multiparty accounts receivable and accounts payable system of claim 50 wherein the amended electronic invoice creation means allows the creditor participant to propose a new payment currency.

54. The electronic multiparty accounts receivable and accounts payable system of claim 50 wherein the amended electronic invoice creation means allows the creditor participant to propose changes to information reflected in the previously presented electronic invoice.

55. The electronic multiparty accounts receivable and accounts payable system of claim 50 further comprising:

amended electronic invoice authorization means for allowing the debtor participant to authorize the amended electronic invoice presented by the creditor participant, whereby the authorization signifies the debt reflected in the electronic invoice has become a payment obligation due on a date certain.

56. The electronic multiparty accounts receivable and accounts payable system of claim 50 further comprising:

amended electronic invoice confirmation means for allowing the debtor participant to confirm the amended electronic invoice presented by the creditor participant, whereby the confirmation signifies the debt reflected in the electronic invoice has become an independent payment obligation due on a date certain and free of any defenses to the underlying contract.

57. The electronic multiparty accounts receivable and accounts payable system of claims 1, 49, 56, or 12 further comprising:
accounts payable aggregation means for aggregating authorized or confirmed accounts payable reflected in authorized or confirmed debt obligations owed by the debtor participant.

58. The electronic multiparty accounts receivable and accounts payable system of claim 57 wherein the authorized or confirmed accounts payable are aggregated by currency.

59. The electronic multiparty accounts receivable and accounts payable system of claim 57 wherein the authorized or confirmed accounts payable are aggregated by date.

60. The electronic multiparty accounts receivable and accounts payable system of claim 57 wherein the authorized or confirmed accounts payable are aggregated according to creditor of the accounts payable.

61. The electronic multiparty accounts receivable and accounts payable system of claim 57 wherein the authorized or confirmed accounts payable are aggregated by other specific criteria.

62. The electronic multiparty accounts receivable and accounts payable system of claim 57 wherein the authorized or confirmed accounts payable are aggregated excluding authorized or confirmed debt obligations that have become subject of electronic promissory notes.

63. The electronic multiparty accounts receivable and accounts payable system of claims 1, 49, 56 or 12 further comprising:
accounts receivable aggregation means for aggregating authorized or confirmed accounts receivable reflected in authorized or confirmed debt obligations owed to the creditor participant.

64. The electronic multiparty accounts receivable and accounts payable system of claim 63 wherein the authorized or confirmed accounts receivable are aggregated by currency.

65. The electronic multiparty accounts receivable and accounts payable system of claim 63 wherein the authorized or confirmed accounts receivable are aggregated by date.

66. The electronic multiparty accounts receivable and accounts payable system of claim 63 wherein the authorized or confirmed accounts receivable are aggregated according to debtor of the accounts receivable.

67. The electronic multiparty accounts receivable and accounts payable system of claim 63 wherein the authorized or confirmed accounts receivable are aggregated by other specific criteria.

68. The electronic multiparty accounts receivable and accounts payable system of claim 63 wherein the authorized or confirmed accounts receivable are aggregated excluding authorized or confirmed debt obligations that have become subject of electronic promissory notes.

69. The electronic multiparty accounts receivable and accounts payable system of claims 1, 49, 56 or 12 further comprising:
bilateral netting means for netting the amount due to the creditor participant under authorized or confirmed debt obligations by any amounts owed to the debtor participant by the creditor participant in respect of amounts due on a specified payment date in a specified currency.

70. The electronic multiparty accounts receivable and accounts payable system of claim 69 wherein the bilateral netting means allows excluding authorized or confirmed debt obligations that have become subject of electronic promissory notes.

71. The electronic multiparty accounts receivable and accounts payable system of claims 1, 49, 56 or 12 further comprising:
multilateral netting means for netting the amount due to a plurality of creditor participants under authorized or confirmed debt obligations by any amounts owed to the debtor participant by the plurality of creditor participant in respect of amounts due on a specified payment date in a specified currency.

72. The electronic multiparty accounts receivable and accounts payable system of claim 71 wherein the multilateral netting means allows excluding authorized or confirmed debt obligations that have become subject of electronic promissory notes.

73. An electronic multiparty accounts receivable and accounts payable system for use by at least two system participants who have contracted with one another and who may owe debts to one another under one or more underlying contracts, the said system comprising:
electronic data storage means for storing accounts receivable and accounts payable information concerning the system participants;
data entry means for entering accounts receivable and accounts payable information reflecting debts owed to the creditor participant by a debtor participant into the electronic data storage means of the electronic multiparty accounts receivable and accounts payable system;
electronic invoicing means for constructing an electronic invoice reflecting amounts owed to the creditor participant by the debtor participant on one or more underlying contracts;
electronic invoice presentment means for presenting the electronic invoice reflecting amounts owed to the creditor participant by the debtor participant to the debtor participant for acceptance or rejection;
authorization means for allowing the debtor participant to authorize the electronic invoice, wherein the authorization transforms the debt reflected in the electronic invoice owed by the debtor participant into an independent payment obligation due on a date certain for a sum certain and free of defenses to the underlying contract; wherein the creditor participant transfers the independent payment obligation due on the date certain for the sum certain to a third party entity as an electronic promissory note for settling a separate obligation between the creditor participant and the third party entity;
credit note creation means for allowing the creditor participant to construct a credit note reflecting an agreed-to credit;
credit note presentment means for presenting the credit note to the debtor participant; and
credit note confirmation means for the debtor participant to confirm the credit note presented by the creditor participant, whereby the confirmation signifies the credit reflected in the electronic credit note has become an independent payment obligation due on a date certain and free of any defenses to the underlying contract;
wherein the information access control means further allows each system participant to selectively control access to information in dependence on the identity of the party seeking access to the information.

74. An electronic multiparty accounts receivable and accounts payable system for use by at least two system participants who have contracted with one another and who may owe debts to one another under one or more underlying contracts, the said system comprising:

- electronic data storage means for storing accounts receivable and accounts payable information concerning the system participants;
- data entry means for entering accounts receivable and accounts payable information reflecting debts owed to a creditor participant by a debtor participant into the electronic data storage means of the electronic multiparty accounts receivable and accounts payable system;
- electronic invoicing means for constructing an electronic invoice reflecting amounts owed to the creditor participant by the debtor participant on one or more underlying contracts;
- electronic invoice presentment means for presenting the electronic invoice reflecting amounts owed to the creditor participant by the debtor participant for acceptance or rejection;
- authorization means for allowing the debtor participant to authorize the electronic invoice, wherein the authorization transforms the debt reflected in the electronic invoice owed by the debtor participant into an independent payment obligation due on a date certain for a sum certain and free of defenses to the underlying contract; wherein the creditor participant transfers the independent payment obligation due on the date certain for the sum certain to a third party entity as an electronic promissory note for settling a separate obligation between the creditor participant and the third party entity; and
- financial information viewing means for allowing each system participant to designate financial information stored in the electronic data storage means as available for review by selected third parties.

75. The electronic multiparty accounts receivable and accounts payable system of claim 74 wherein the financial information viewing means allows the creditor participant to designate accounts receivable stored in the electronic data storage means as available for review by potential lenders from whom the participant desires to borrow money.

76. The electronic multiparty accounts receivable and accounts payable system of claim 74 wherein the financial information viewing means allows the debtor participant to designate accounts payable stored in the electronic data storage means as available for review by potential lenders from whom the participant desires to borrow money.

77. The electronic multiparty accounts receivable and accounts payable system of claim 74 wherein the financial information viewing means allows the creditor participant to designate authorized accounts receivable stored in the electronic data storage means as available for review by potential lenders from whom the participant desires to borrow money.

78. The electronic multiparty accounts receivable and accounts payable system of claim 74 wherein the financial information viewing means allows the debtor participant to designate authorized accounts payable stored in the electronic data storage means as available for review by potential lenders from whom the participant desires to borrow money.

79. The electronic multiparty accounts receivable and accounts payable system of claim 74 wherein the financial information viewing means allows the creditor participant to designate confirmed accounts receivable stored in the electronic data storage means as available for review by potential lenders from whom the participant desires to borrow money.

80. The electronic multiparty accounts receivable and accounts payable system of claim 74 wherein the financial information viewing means allows the debtor participant to designate confirmed accounts payable stored in the electronic data storage means as available for review by potential lenders from whom the participant desires to borrow money.

81. An electronic multiparty accounts receivable and accounts payable system for use by at least two system participants who have contracted with one another and who may owe debts to one another under one or more underlying contracts, the said system comprising:

- electronic data storage means for storing accounts receivable and accounts payable information concerning the system participants;
- data entry means for entering accounts receivable and accounts payable information reflecting debts owed to a creditor participant by a debtor participant into the electronic data storage means of the electronic multiparty accounts receivable and accounts payable system;
- electronic invoicing means for constructing an electronic invoice reflecting amounts owed to the creditor participant by the debtor participant on one or more underlying contracts;
- electronic invoice presentment means for presenting the electronic invoice reflecting amounts owed to the creditor participant by the debtor participant for acceptance or rejection;
- authorization means for allowing the debtor participant to authorize the electronic invoice, wherein the authorization signifies the debt reflected in the electronic invoice has become a payment obligation due on a date certain;
- confirmation means for allowing the debtor participant to confirm the electronic invoice without modification, wherein the confirmation transforms the debt reflected in the electronic invoice owed by the debtor participant into an independent payment obligation due on a date certain for a sum certain and free of defenses to the underlying contract;
- wherein the creditor participant transfers the independent payment obligation due on the date certain for the sum certain to a third party entity as an electronic promissory note for settling a separate obligation between the creditor participant and the third party entity; and
- independent payment obligation sale authorization means for allowing the debtor participant to agree to allow the creditor participant to sell to third parties the independent payment obligation created by confirmation of an electronic invoice or credit note.

82. The electronic multiparty accounts receivable and accounts payable system of claim 81 wherein the independent payment obligation sale authorization means further allows the debtor participant to indicate that the debtor participant agrees to allow the creditor participant to offer for sale the independent payment obligation to a predetermined group of third parties.

83. The electronic multiparty accounts receivable and accounts payable system of claim 81 wherein the independent payment obligation sale authorization means further allows the debtor participant to indicate that the debtor participant agrees to allow the creditor participant to offer for sale the independent payment obligation to any third party.

84. The electronic multiparty accounts receivable and accounts payable system of claim 81 wherein the independent payment obligation sale authorization means further allows the debtor participant to indicate that the debtor participant agrees to allow the creditor participant to offer the independent payment obligation to a third system participant in settlement of debt owed to a third system participant by the creditor participant.

85. An electronic multiparty accounts receivable and accounts payable system for use by at least two system participants who have contracted with one another and who may owe debts to one another under one or more underlying contracts, the said system comprising:
- electronic data storage means for storing accounts receivable and accounts payable information concerning the system participants;
- data entry means for entering accounts receivable and accounts payable information reflecting debts owed to a creditor participant by a debtor participant into the electronic data storage means of the electronic multiparty accounts receivable and accounts payable system;
- electronic invoicing means for constructing an electronic invoice reflecting amounts owed to the creditor participant by the debtor participant on one or more underlying contracts;
- electronic invoice presentment means for presenting the electronic invoice reflecting amounts owed to the creditor participant by the debtor participant for acceptance or rejection;
- authorization means for allowing the debtor participant to authorize the electronic invoice, wherein the authorization signifies the debt reflected in the electronic invoice has become a payment obligation due on a date certain;
- confirmation means for allowing the debtor participant to confirm the electronic invoice without modification, wherein the confirmation transforms the debt reflected in the electronic invoice owed by the debtor participant into an independent payment obligation due on a date certain for a sum certain and free of defenses to the underlying contract;
- wherein the creditor participant transfers the independent payment obligation due on the date certain for the sum certain to a third party entity as an electronic promissory note for settling a separate obligation between the creditor participant and the third party entity; and
- electronic transferable record designation means for designating as an electronic transferable record confirmed electronic invoices constituting independent payment obligations of the debtor participant to the creditor participant.

86. An electronic multiparty accounts receivable and accounts payable system for use by at least two system participants who have contracted with one another and who may owe debts to one another under one or more underlying contracts, the said system comprising:
- electronic data storage means for storing accounts receivable and accounts payable information concerning the system participants;
- data entry means for entering accounts receivable and accounts payable information reflecting debts owed to a creditor participant by a debtor participant into the electronic data storage means of the electronic multiparty accounts receivable and accounts payable system;
- electronic invoicing means for constructing an electronic invoice reflecting amounts owed to the creditor participant by the debtor participant on one or more underlying contracts;
- electronic invoice presentment means for presenting the electronic invoice reflecting amounts owed to the creditor participant by the debtor participant for acceptance or rejection;
- authorization means for allowing the debtor participant to authorize the electronic invoice, wherein the authorization signifies the debt reflected in the electronic invoice has become a payment obligation due on a date certain;
- confirmation means for allowing the debtor participant to confirm the electronic invoice without modification, wherein the confirmation transforms the debt reflected in the electronic invoice owed by the debtor participant into an independent payment obligation due on a date certain for a sum certain and free of defenses to the underlying contract;
- wherein the creditor participant transfers the independent payment obligation due on the date certain for the sum certain to a third party entity as an electronic promissory note for settling a separate obligation between the creditor participant and the third party entity; and
- electronic bill of exchange designation means for designating as an electronic bill of exchange confirmed electronic invoices constituting independent payment obligations of the debtor participant to the creditor participant.

87. An electronic multiparty accounts receivable and accounts payable system for use by at least two system participants who have contracted with one another and who may owe debts to one another under one or more underlying contracts, the said system comprising:
- electronic data storage means for storing accounts receivable and accounts payable information concerning the system participants;
- data entry means for entering accounts receivable and accounts payable information reflecting debts owed to a creditor participant by a debtor participant into the electronic data storage means of the electronic multiparty accounts receivable and accounts payable system;
- electronic invoicing means for constructing an electronic invoice reflecting amounts owed to the creditor participant by the debtor participant on one or more underlying contracts;
- electronic invoice presentment means for presenting the electronic invoice reflecting amounts owed to the creditor participant by the debtor participant for acceptance or rejection;
- authorization means for allowing the debtor participant to authorize the electronic invoice, wherein the authorization signifies the debt reflected in the electronic invoice has become a payment obligation due on a date certain;
- confirmation means for allowing the debtor participant to confirm the electronic invoice without modification, wherein the confirmation transforms the debt reflected in the electronic invoice owed by the debtor participant into an independent payment obligation due on a date certain for a sum certain and free of defenses to the underlying contract;
- wherein the creditor participant transfers the independent payment obligation due on the date certain for the sum certain to a third party entity as an electronic promissory note for settling a separate obligation between the creditor participant and the third party entity; and electronic promissory note designation means for designating as electronic promissory notes confirmed electronic invoices constituting independent payment obligations of the debtor participant to the creditor participant.

88. An electronic multiparty accounts receivable and accounts payable system for use by at least two system participants who have contracted with one another and who may owe debts to one another under one or more underlying contracts, the said system comprising:

electronic data storage means for storing accounts receivable and accounts payable information concerning the system participants;

data entry means for entering accounts receivable and accounts payable information reflecting debts owed to a creditor participant by a debtor participant into the electronic data storage means of the electronic multiparty accounts receivable and accounts payable system;

electronic invoicing means for constructing an electronic invoice reflecting amounts owed to the creditor participant by the debtor participant on one or more underlying contracts;

electronic invoice presentment means for presenting the electronic invoice reflecting amounts owed to the creditor participant by the debtor participant for acceptance or rejection;

authorization means for allowing the debtor participant to authorize the electronic invoice, wherein the authorization signifies the debt reflected in the electronic invoice has become a payment obligation due on a date certain;

confirmation means for allowing the debtor participant to confirm the electronic invoice without modification, wherein the confirmation transforms the debt reflected in the electronic invoice owed by the debtor participant into an independent payment obligation due on a date certain for a sum certain and free of defenses to the underlying contract;

wherein the creditor participant transfers the independent payment obligation due on the date certain for the sum certain to a third party entity as an electronic promissory note for settling a separate obligation between the creditor participant and the third party entity; and electronic draft designation means for designating as an electronic draft confirmed electronic invoices constituting independent payment obligations of the debtor participant to the creditor participant.

89. The electronic multiparty accounts receivable and accounts payable system of claim 87 further comprising:

electronic promissory note tracking means for tracking electronic promissory notes that have been pledged as collateral.

90. The electronic multiparty accounts receivable and accounts payable system of claim 87 wherein the electronic promissory note designation means allows a participant to selectively bundle multiple confirmed electronic invoices into an electronic promissory note.

91. The electronic multiparty accounts receivable and accounts payable systems of claim 87 further comprising:

electronic promissory note sale designation means for allowing the creditor participant to designate electronic promissory notes held by the creditor participant as being available for discounting.

92. The electronic multiparty accounts receivable and accounts payable system of claim 90 further comprising:

electronic promissory note sale availability identification means for identifying the electronic promissory notes held by the creditor participant that have been designated as available for discounting and for creating electronic records reflecting all or subset of all such electronic promissory notes.

93. The electronic multiparty accounts receivable and accounts payable system of claim 92 further comprising:

electronic promissory note bid solicitation means for electronically soliciting bids from other participants or third parties for electronic promissory notes designated as available for sale.

94. The electronic multiparty accounts receivable and accounts payable system of claim 92 further comprising:

electronic promissory note sale availability notification means for electronically advising third parties of the availability for sale of electronic promissory notes reflected in the electronic record created by the electronic promissory note sale availability identification means.

95. The electronic multiparty accounts receivable and accounts payable system of claim 94 further comprising:

electronic promissory note bid means for allowing third parties interested in discounting electronic promissory notes available for sale to construct electronic bids for presentation to the creditor participant holding the electronic promissory notes; and electronic promissory note bid presentment means for presenting the electronic bid to the creditor participant.

96. The electronic multiparty accounts receivable and accounts payable system of claim 95 further comprising:

electronic promissory note bid acceptance means for allowing the creditor participant holding bid-upon electronic promissory notes to construct an electronic promissory note bid acceptance document for presentment to the third party bidding upon the electronic promissory notes held by the creditor participant; and electronic promissory note bid acceptance presentment means for the creditor participant to present the bid acceptance document to the third party.

97. The electronic multiparty accounts receivable and accounts payable system of claim 96 further comprising:

electronic promissory note transference means for transferring the successfully bid-upon electronic promissory notes to the third party who successfully bid on the electronic promissory notes.

98. The electronic multiparty accounts receivable and accounts payable system of claim 97 further comprising:

third party settlement information collection means for collecting settlement information from the third party who successfully bid upon the electronic promissory notes held by the creditor participant.

99. The electronic multiparty accounts receivable and accounts payable system of claim 98 further comprising:

third party settlement information advise means for providing the debtor participant owing the debt reflected in the electronic promissory notes with the settlement information collected from the third party.

100. The electronic multiparty accounts receivable and accounts payable system of claim 99 further comprising:

electronic promissory note settlement means for settling debt obligations associated with the electronic promissory notes; and electronic promissory note settlement update means for updating system accounts concerning the settlement of such electronic promissory notes.

101. The electronic multiparty accounts receivable and accounts payable system of claim 99 further comprising:

electronic promissory note secondary market transference means for allowing the electronic promissory notes to be sold and transferred in secondary markets; and electronic promissory note secondary market transference update means for updating information concerning the transfer of such electronic promissory notes.

102. The electronic multiparty accounts receivable and accounts payable system of claim 94 further comprising:

third party preference specification means for the third party to identify purchase preferences.

103. The electronic multiparty accounts receivable and accounts payable system of claim 102 wherein the third party preference specification means allows the third party to specify a monetary value of electronic promissory notes for purchasing and wherein the electronic multiparty accounts receivable and discounting system further comprises:

electronic promissory note bundling means for bundling a number of electronic promissory notes available for discounting corresponding to the monetary value specified by the third party.

104. The electronic multiparty accounts receivable and accounts payable system of claim 102 wherein the third party preference specification means allows the third party to specify the debtor participant on the electronic promissory notes for purchasing and wherein the electronic multiparty accounts receivable and discounting system further comprises:

electronic promissory note debtor participant selection means for selecting all the electronic promissory notes held by creditor participants which name the debtor participant specified by the third party, and for organizing those electronic promissory notes into an electronic record for review by the third party.

105. The electronic multiparty accounts receivable and accounts payable system of claim 102 wherein the third party preference specification means allows the third party to specify an acceptable credit rating for debtor participants on electronic promissory notes and wherein the electronic multiparty accounts receivable and discounting system further comprises:

electronic promissory note credit rating selection means for selecting all the electronic promissory notes held by creditor participants which name debtor participants having credit ratings corresponding at least to the credit rating specified by the third party, and for organizing those electronic promissory notes into an electronic record for review by the third party.

106. An electronic multiparty accounts receivable and accounts payable system for use by at least two system participants who have contracted with one another and who may owe debts to one another under one or more underlying contracts, the said system comprising:

electronic data storage means for storing accounts receivable and accounts payable information concerning the system participants;

data entry means for entering accounts receivable and accounts payable information reflecting debts owed to a creditor participant by a debtor participant into the electronic data storage means of the electronic multiparty accounts receivable and accounts payable system;

electronic invoicing means for constructing an electronic invoice reflecting amounts owed to the creditor participant by the debtor participant on one or more underlying contracts;

electronic invoice presentment means for presenting the electronic invoice reflecting amounts owed to the creditor participant by the debtor participant for acceptance or rejection;

authorization means for allowing the debtor participant to authorize the electronic invoice, wherein the authorization transforms the debt reflected in the electronic invoice owed by the debtor participant into an independent payment obligation due on a date certain for a sum certain and free of defenses to the underlying contract; wherein the creditor participant transfers the independent payment obligation due on the date certain for the sum certain to a third party entity as an electronic promissory note for settling a separate obligation between the creditor participant and the third party entity;

settlement determination means for determining payments a debtor participant must make on accounts payable reflected in authorized or confirmed electronic invoices in respect of a specified payment date and a specified currency;

trust account payment receipt verification means for verifying that payment has been received from the debtor participant and credited to a trust account at an agent bank; and trust account payment receipt presentment means for presenting the electronic trust account payment receipt information.

107. The electronic multiparty accounts receivable and accounts payable system of claim 106 further comprising:

creditor participant settlement information notification means for advising the creditor participant a predetermined number of days before the payments are due of payments to be made by the debtor participant.

108. The electronic multiparty accounts receivable and accounts payable system of claim 106 further comprising:

debtor participant settlement information notification means for advising the debtor participant a predetermined number of days before the payments are due of payments that should be made to the creditor participant.

109. The electronic multiparty accounts receivable and accounts payable system of claim 106 further comprising:

settlement verification means for advising the creditor participant and debtor participant of completion or failure of the payments due from the debtor participant to the creditor participant; and settlement verification update means for updating settlement information stored in the electronic data storage means with information regarding the completion or failure of the payments.

110. The electronic multiparty accounts receivable and accounts payable system of claim 106 further comprising:

automatic debit permission means for permitting the system to automatically create and issue payment instructions on behalf of the debtor participant to the bank of the debtor participant concerning payments due as determined by the settlement determination means.

111. The electronic multiparty accounts receivable and accounts payable system of claim 106 further comprising:

payment exception processing means for processing payment failures.

112. An electronic multiparty accounts receivable and accounts payable system for use by at least two system participants who have contracted with one another and who may owe debts to one another under one or more underlying contracts, the said system comprising:

electronic data storage means for storing accounts receivable and accounts payable information concerning the system participants;

data entry means for entering accounts receivable and accounts payable information reflecting debts owed to a creditor participant by a debtor participant into the electronic data storage means of the electronic multiparty accounts receivable and accounts payable system;

electronic invoicing means for constructing an electronic invoice reflecting amounts owed to the creditor participant by the debtor participant on one or more underlying contracts;

electronic invoice presentment means for presenting the electronic invoice reflecting amounts owed to the creditor participant by the debtor participant for acceptance or rejection;

authorization means for allowing the debtor participant to authorize the electronic invoice, wherein the authorization transforms-the debt reflected in the electronic invoice owed by the debtor participant into an independent payment obligation due on a date certain for a sum certain and free of defenses to the underlying contract; wherein the creditor participant transfers the independent payment obligation due on the date certain for the sum certain to a third party entity as an electronic promissory note for settling a separate obligation between the creditor participant and the third party entity;

settlement determination means for determining payments a debtor participant must make on accounts payable reflected in authorized or confirmed electronic invoices in respect of a specified payment date and a specified currency;

debtor participant payment remittance verification means for verifying that a payment for the amount due has been issued from the account of the debtor participant at the debtor participant's bank to either the trust account at an agent bank or account of the creditor at the creditor's bank;

debtor participant payment remittance presentment means for presenting the electronic debtor participant payment remittance verification information; and trust account payment receipt update means for updating the information stored on the electronic data storage means with the trust account payment receipt information concerning the payment made by the debtor participant into a trust account of an agent bank.

113. The electronic multiparty accounts receivable and accounts payable system of claim 112 further comprising:
trust account payment instruction means for issuing instructions to the trustee of the trust account into which the debtor participant made payment to issue a payment from the trust account into an account of the creditor at the creditor's bank.

114. The electronic multiparty accounts receivable and accounts payable system of claim 113 further comprising:
trust account payment remittance verification means for verifying that an amount reflected in the trust account payment instruction has been transferred from the trust account at an agent bank to an account of the creditor at the creditor's bank; and
trust account payment remittance presentment means for presenting the electronic trust account payment remittance information.

115. The electronic multiparty accounts receivable and accounts payable system of claim 114 further comprising:

creditor payment receipt verification means for verifying that the creditor's bank verifies receipt of the payment from the trust account at an agent bank into the account of the creditor at the creditor's bank; and
creditor payment receipt presentment means for presenting the creditor payment receipt information.

116. The electronic multiparty accounts receivable and accounts payable system of claim 115 further comprising:
creditor payment receipt update means for updating the information stored on the electronic data storage means with information concerning the payment made from the trust account at an agent bank into the account of the creditor at the creditor's bank.

117. An electronic multiparty accounts receivable and accounts payable system for use by at least two system participants who have contracted with one another and who may owe debts to one another under one or more underlying contracts, the said system comprising:

electronic data storage means for storing accounts receivable and accounts payable information concerning the system participants;

data entry means for entering accounts receivable and accounts payable information reflecting debts owed to a creditor participant by a debtor participant into the electronic data storage means of the electronic multiparty accounts receivable and accounts payable system;

electronic invoicing means for constructing an electronic invoice reflecting amounts owed to the creditor participant by the debtor participant on one or more underlying contracts;

electronic invoice presentment means for presenting the electronic invoice reflecting amounts owed to the creditor participant by the debtor participant for acceptance or rejection;

authorization means for allowing the debtor participant to authorize the electronic invoice, wherein the authorization transforms the debt reflected in the electronic invoice owed by the debtor participant into an independent payment obligation due on a date certain for a sum certain and free of defenses to the underlying contract; wherein the creditor participant transfers the independent payment obligation due on the date certain for the sum certain to a third party entity as an electronic promissory note for settling a separate obligation between the creditor participant and the third party entity;

settlement determination means for determining payments a debtor participant must make on accounts payable reflected in authorized or confirmed electronic invoices in respect of a specified payment date and a specified currency; and automatic debtor participant payment instruction creation means for automatically creating and submitting a payment instruction to the bank of the debtor participant to issue a payment for the amount due from the account of the debtor participant into a trust account at an agent bank.

118. The electronic multiparty accounts receivable and accounts payable system of claim 117 further comprising:
debtor participant payment remittance verification means for verifying that a payment for the amount due has been issued from the account of the debtor participant at the debtor participant's bank to the trust account at an agent bank; and
debtor participant payment remittance presentment means for presenting the electronic debtor participant payment remittance verification information.

119. The electronic multiparty accounts receivable and accounts payable system of claim 118 further comprising:
trust account payment receipt verification means for verifying that payment has been received from the debtor participant and credited to a trust account at an agent bank; and
trust account payment receipt presentment means for presenting the electronic trust account payment receipt information.

120. The electronic multiparty accounts receivable and accounts payable system of claim 119 further comprising:
trust account payment receipt update means for updating the information stored on the electronic data storage means with the trust account payment receipt information concerning the payment made by the debtor participant into a trust account of an agent bank.

121. The electronic multiparty accounts receivable and accounts payable system of claim 119 further comprising:
trust account payment instruction means for issuing instructions to the trustee of the trust account into which the debtor participant made payment to issue a payment from the trust account into an account of the creditor at the creditor's bank.

122. The electronic multiparty accounts receivable and accounts payable system of claim 121 further comprising:
trust account payment remittance verification means for verifying that an amount reflected in the trust account payment instruction has been transferred from the trust account at an agent bank to an account of the creditor at the creditor's bank; and
trust account payment remittance presentment means for presenting the electronic trust account payment remittance information.

123. The electronic multiparty accounts receivable and accounts payable system of claim 122 further comprising:
creditor payment receipt verification means for verifying that the creditor's bank verifies receipt of the payment from the trust account at an agent bank into the account of the creditor at the creditor's bank; and
creditor payment receipt presentment means for presenting the creditor payment receipt information.

124. The electronic multiparty accounts receivable and accounts payable system of claim 123 further comprising:
creditor payment receipt update means for updating the information stored on the electronic data storage means with information concerning the payment made from the trust account at an agent bank into the account of the creditor at the creditor's bank.

125. The electronic multiparty accounts receivable and accounts payable system of claim 106 further comprising:
creditor participant payment receipt means for confirming that the bank of the creditor participant confirms receipt of the payment from the bank of the debtor participant; and
creditor participant electronic payment receipt presentment means for presenting the creditor participant payment receipt information to the debtor participant.

126. The electronic multiparty accounts receivable and accounts payable system of claim 125 further comprising:
creditor participant payment receipt update means for updating the information stored on the electronic data storage means with information concerning the payment made by the debtor participant into the account of the creditor participant.

127. The electronic multiparty accounts receivable and accounts payable system of claim 106 further comprising:
creditor account automatic payment authorization means for automatically issuing payment instructions to a bank of the debtor participant authorizing the bank of the debtor participant to transfer an amount equal to the payment due into an account of the creditor participant at a creditor participant's bank.

128. The electronic multiparty accounts receivable and accounts payable system of claim 127 further comprising:
creditor account payment authorization update means for updating the information stored on the electronic data storage means with the creditor participant account payment authorization information concerning the payment made on behalf of the debtor participant from the bank of the debtor participant into the account of the creditor system participant.

129. The electronic multiparty accounts receivable and accounts payable system of claim 128 further comprising:
creditor participant payment receipt means for confirming that the bank of the creditor participant confirms receipt of the payment from the bank of the debtor participant; and
creditor participant electronic payment receipt presentment means for presenting the creditor participant payment receipt information to the debtor participant.

130. The electronic multiparty accounts receivable and accounts payable system of claim 129 further comprising:
creditor participant payment receipt update means for updating the information stored on the electronic data storage means with information concerning the payment made by the debtor participant into the account of the creditor participant.

131. An electronic multiparty accounts receivable and accounts payable system for use by at least two system participants who have contracted with one another and who may owe debts to one another under one or more underlying contracts, the said system comprising:
electronic data storage means for storing accounts receivable and accounts payable information concerning the system participants;
data entry means for entering accounts receivable and accounts payable information reflecting debts owed to a creditor participant by a debtor participant into the electronic data storage means of the electronic multiparty accounts receivable and accounts payable system;
electronic invoicing means for constructing an electronic invoice reflecting amounts owed to the creditor participant by the debtor participant on one or more underlying contracts;
electronic invoice presentment means for presenting the electronic invoice reflecting amounts owed to the creditor participant by the debtor participant for acceptance or rejection;
authorization means for allowing the debtor participant to authorize the electronic invoice, wherein the authorization transforms the debt reflected in the electronic invoice owed by the debtor participant into an independent payment obligation due on a date certain for a sum certain and free of defenses to the underlying contract; wherein the creditor participant transfers the independent payment obligation due on the date certain for the sum certain to a third party entity as an electronic promissory note for settling a separate obligation between the creditor participant and the third party entity; and
settlement determination means for determining payments a debtor participant must make on accounts payable reflected in authorized or confirmed electronic invoices in respect of a specified payment date and a specified currency;
wherein a debtor participant holds an electronic promissory note and a creditor participant has agreed to accept the electronic promissory note for settlement of debts of the debtor participant, the electronic multiparty accounts receivable and accounts payable system further comprising:

debtor electronic promissory note settlement means for allowing the debtor participant to use the electronic promissory note in satisfaction of the payment obligations owed to the creditor participant.

132. The electronic multiparty accounts receivable and accounts payable system of claim 131 further comprising:

electronic promissory note transference means for transferring to the creditor participant electronic promissory note used by the debtor participant to settle payment obligations owed to the creditor participant.

133. The electronic multiparty accounts receivable and accounts payable system of claim 132 further comprising:

creditor participant settlement information collection means for collecting settlement information from the creditor participant who accepted the electronic promissory note in satisfaction of debt obligations owed by the debtor participant.

134. The electronic multiparty accounts receivable and accounts payable system of claim 133 further comprising:

creditor participant settlement information presentment means for presenting the settlement information collected from the creditor participant who accepted the electronic promissory note in satisfaction of debt obligations owed by the debtor participant.

135. The electronic multiparty accounts receivable and accounts payable system of claim 134 further comprising:

promissory note settlement update means for updating the information stored on the electronic data storage means with the settlement information concerning the payment made by the debtor participant using the electronic promissory note for satisfying debt obligations owed to the creditor participant by the debtor participant.

136. The electronic multiparty accounts receivable and accounts payable system of claim 132 further comprising:

unilateral settlement remittance means for allowing the debtor participant to construct an electronic remittance advice document advising that the debtor participant has made a payment different from the payment amount reflected in the electronic invoice rejected by the debtor participant; and unilateral settlement remittance information presentment means for presenting the electronic remittance document.

137. The electronic multiparty accounts receivable and accounts payable system of claim 136 further comprising:

indirect settlement unilateral payment rejection means for allowing the creditor participant to reject an unilateral payment by the debtor participant through instructing an agent bank not to transfer funds paid by the debtor participant into the account of the creditor participant at the creditor's bank; and indirect settlement unilateral payment rejection presentment means for presenting the unilateral payment rejection information.

138. The electronic multiparty accounts receivable and accounts payable system of claim 136 further comprising:

direct settlement unilateral payment rejection means for allowing the creditor participant to reject an unilateral payment by the debtor participant through instructing the creditors participant's bank not to transfer funds paid by the debtor participant into the account of the creditor participant at the creditor participant's s bank; and direct settlement unilateral payment rejection presentment means for presenting the unilateral payment rejection information.

139. The electronic multiparty accounts receivable and accounts payable system of claim 106 further comprising:

participant foreign exchange transaction means for determining and executing foreign exchange transactions for debtor participants and creditor participants concerning pairs of foreign currencies in advance of settlement of payment obligations.

140. The electronic multiparty accounts receivable and accounts payable system of claim 106 further comprising:

foreign exchange pooling means for determining the foreign exchange required by the system to cover payments to be made in different currencies from trust accounts at an agent bank into accounts of the creditors at the creditors' banks in respect of authorized or confirmed debt obligations.

141. The electronic multiparty accounts receivable and accounts payable system of claim 104 further comprising:

system foreign exchange transaction means for determining and executing foreign exchange transactions concerning pairs of foreign currencies in advance of settlement of payment obligations that require payments to be made from the trust account at an agent bank.

142. An electronic multiparty accounts receivable and accounts payable system for use by a plurality of system participants who have contracted with one another and who owe a plurality of debts to one another under a plurality of underlying contracts, and wherein certain system participants are debtor participants as a result of debts owed to other system participants, and wherein other system participants are creditor participants as a result of debts owed to them by the debtor participants, the said system comprising:

electronic data storage means for storing debt information associated with at least one invoice between the debtor participant and the creditor participant;

data entry means for entering debt information into the electronic data storage means of the electronic multiparty accounts receivable and accounts payable system; and aggregation means for electronically aggregating debt obligations reflected in the at least one invoice owed by the debtor participant or to the creditor participant by one or more characteristics associated with financial information to be aggregated;

wherein the debtor participant electronically transmits amended data associated with the invoice concerning the debtor participant and the creditor participant wherein the amended data comprises one or more of modified payment amount, modified payment date and one or more proposed changes; wherein the creditor participant electronically receives the amended data and electronically performs a decision on the amended data for confirmation wherein the confirmation indicates an agreement concerning the amended data prior to execution of the invoice; and wherein the creditor participant and the debtor participant collaborate together for reconciliation concerning the debt obligation associated with the creditor participant and the debtor participant.

* * * * *